United States Patent
Okazaki et al.

(10) Patent No.: US 7,979,582 B2
(45) Date of Patent: Jul. 12, 2011

(54) COMMUNICATION DEVICE PROVIDED WITH ARP FUNCTION

(75) Inventors: Yoshinori Okazaki, Osaka (JP); Hiroshi Kurata, Hyogo (JP); Takeshi Kokado, Kyoto (JP)

(73) Assignee: Panasonic Corporation, Osaka (JP)

( * ) Notice: Subject to any disclaimer, the term of this patent is extended or adjusted under 35 U.S.C. 154(b) by 789 days.

(21) Appl. No.: 11/915,871

(22) PCT Filed: May 30, 2006

(86) PCT No.: PCT/JP2006/310815
§ 371 (c)(1),
(2), (4) Date: Nov. 29, 2007

(87) PCT Pub. No.: WO2006/129680
PCT Pub. Date: Dec. 7, 2006

(65) Prior Publication Data
US 2009/0307371 A1 Dec. 10, 2009

(30) Foreign Application Priority Data

May 30, 2005 (JP) ................................. 2005-158134
Mar. 14, 2006 (JP) ................................. 2006-069919

(51) Int. Cl.
*G06F 15/16* (2006.01)
(52) U.S. Cl. ...................................................... 709/245
(58) Field of Classification Search .................... 709/245
See application file for complete search history.

(56) References Cited

U.S. PATENT DOCUMENTS 5,724,510 A * 3/1998 Arndt et al. .................. 709/220
6,691,165 B1 * 2/2004 Bruck et al. .................. 709/227
7,415,535 B1 * 8/2008 Kuik et al. .................... 709/245
2003/0185233 A1 * 10/2003 Ji et al. .......................... 370/466
2007/0192506 A1 * 8/2007 Gupta et al. ................... 709/238

FOREIGN PATENT DOCUMENTS

| EP | 1 349 322 | 10/2003 |
|---|---|---|
| JP | 2003-333080 | 11/2003 |

OTHER PUBLICATIONS

International Search Report issued Jul. 11, 2007 in the International (PCT) Application of which the present application is the U.S. National Stage.
David C. Plummer; Request for Comments 826 "An Ethernet Address Resolution Protocol or Converting Network Protocol Addresses to 48.bit Ethernet Address for Transmission on Ethernet Hardware", IETF, Nov. 1982, <URL:http://www.ietf.org/rfc/rfc826.txt>.
C. Perkins; Request for Comments 2002, "IP Mobility Support", IETF, Oct. 1996, <URL:http://www.ietf.org/rfc/rfc2002.txt>.

(Continued)

Primary Examiner — Firmin Backer
Assistant Examiner — Brian P. Whipple
(74) Attorney, Agent, or Firm — Wenderoth, Lind & Ponack, L.L.P.

(57) ABSTRACT

A communication device includes: an address administration unit that manages data link layer addresses; and an ARP processing unit that processes an ARP protocol. The ARP processing unit includes an ARP receiving unit, an ARP transmitting unit, a duplication detecting unit, a duplication notification generating unit and an update GARP generating unit. The update GARP generating unit transmits a GARP and thereby updates the ARP tables of the communication devices on the same network, in order to solve a problem in which communication is interrupted.

27 Claims, 71 Drawing Sheets

OTHER PUBLICATIONS

R. Droms; Request for Comments 2131 "Dynamic Host Configuration Protocol", IETF, Mar. 1997, <URL:http://www.ietf.org/rfc/rfc2131.txt>.

Partial translation of Microsoft Windows (registered trademark), 2000 Technical Reference, "TCP/IB Protocol & Service Guide", p. 74, line 1—p. 76, line 28).

* cited by examiner

FIG. 5

| IP address | DL address | Expiration time |
|---|---|---|
| 192.168.0.100 | AA:AA:AA:AA:AA:AA | N seconds |
| | | |

FIG. 8

| IP address | DL address | Expiration time |
|---|---|---|
| 192.168.0.100 | BB:BB:BB:BB:BB:BB | N seconds |
| | | |

FIG. 15

| IP address | DL address | Expiration time |
|---|---|---|
| 192.168.0.100 | AA:AA:AA:AA:AA:AA | N seconds |
| | | |

FIG. 16

| IP address | DL address | Expiration time |
|---|---|---|
| 192.168.0.100 | BB:BB:BB:BB:BB:BB | N seconds |
| | | |

FIG. 17

| IP address | DL address | Expiration time |
|---|---|---|
| 192.168.0.100 | AA:AA:AA:AA:AA:AA | N seconds |
| | | |

FIG. 21

| IP address | DL address | Expiration time | Time until the update is accepted |
|---|---|---|---|
| 192.168.0.100 | AA:AA:AA:AA:AA:AA | N seconds | 0 second |

FIG. 22

| IP address | DL address | Expiration time | Time until the update is accepted |
|---|---|---|---|
| 192.168.0.100 | BB:BB:BB:BB:BB:BB | N seconds | U seconds |

FIG. 23

| IP address | DL address | Expiration time | Time until the update is accepted |
|---|---|---|---|
| 192.168.0.100 | AA:AA:AA:AA:AA:AA | N seconds | U seconds |

FIG. 27

| IP address | DL address | Expiration time |
|---|---|---|
| 192.168.0.100 | AA:AA:AA:AA:AA:AA | N seconds |
| | | |

FIG. 28

| IP address | DL address | Expiration time | Time until the update is accepted |
|---|---|---|---|
| 192.168.0.100 | AA:AA:AA:AA:AA:AA | N seconds | 0 second |

FIG. 29

| IP address | DL address | Expiration time |
|---|---|---|
| 192.168.0.100 | BB:BB:BB:BB:BB:BB | N seconds |
| | | |

FIG. 30

| IP address | DL address | Expiration time | Time until the update is accepted |
|---|---|---|---|
| 192.168.0.100 | BB:BB:BB:BB:BB:BB | N seconds | U seconds |
| | | | |

FIG. 31

| IP address | DL address | Expiration time |
|---|---|---|
| 192.168.0.100 | AA:AA:AA:AA:AA:AA | N seconds |
| | | |

FIG. 32

| IP address | DL address | Expiration time | Time until the update is accepted |
|---|---|---|---|
| 192.168.0.100 | AA:AA:AA:AA:AA:AA | N seconds | U seconds |

FIG. 38

| IP address | DL address | Expiration time |
|---|---|---|
| 192.168.0.200 | CC:CC:CC:CC:CC:CC | N seconds |
| | | |

FIG. 39

| IP address | DL address | Expiration time |
|---|---|---|
| 192.168.0.100 | AA:AA:AA:AA:AA:AA | N seconds |
| | | |

FIG. 40

| IP address | DL address | Expiration time |
|---|---|---|
| 192.168.0.100 | BB:BB:BB:BB:BB:BB | N seconds |
| | | |

FIG. 41

| IP address | DL address | Expiration time |
|---|---|---|
|  |  |  |
|  |  |  |

FIG. 42

| IP address | DL address | Expiration time |
|---|---|---|
| 192.168.0.100 | AA:AA:AA:AA:AA:AA | N seconds |
|  |  |  |

FIG. 43

| IP address | DL address | Expiration time |
|---|---|---|
| 192.168.0.200 | CC:CC:CC:CC:CC:CC | N seconds |
|  |  |  |

FIG. 47

| IP address | DL address | Expiration time |
|---|---|---|
| 192.168.0.100 | BB:BB:BB:BB:BB:BB | N seconds |
| | | |

FIG. 48

| IP address | DL address | Expiration time |
|---|---|---|
| 192.168.0.100 | AA:AA:AA:AA:AA:AA | N seconds |
| | | |

FIG. 49

| IP address | DL address | Expiration time |
|---|---|---|
| 192.168.0.100 | BB:BB:BB:BB:BB:BB | N seconds |
| | | |

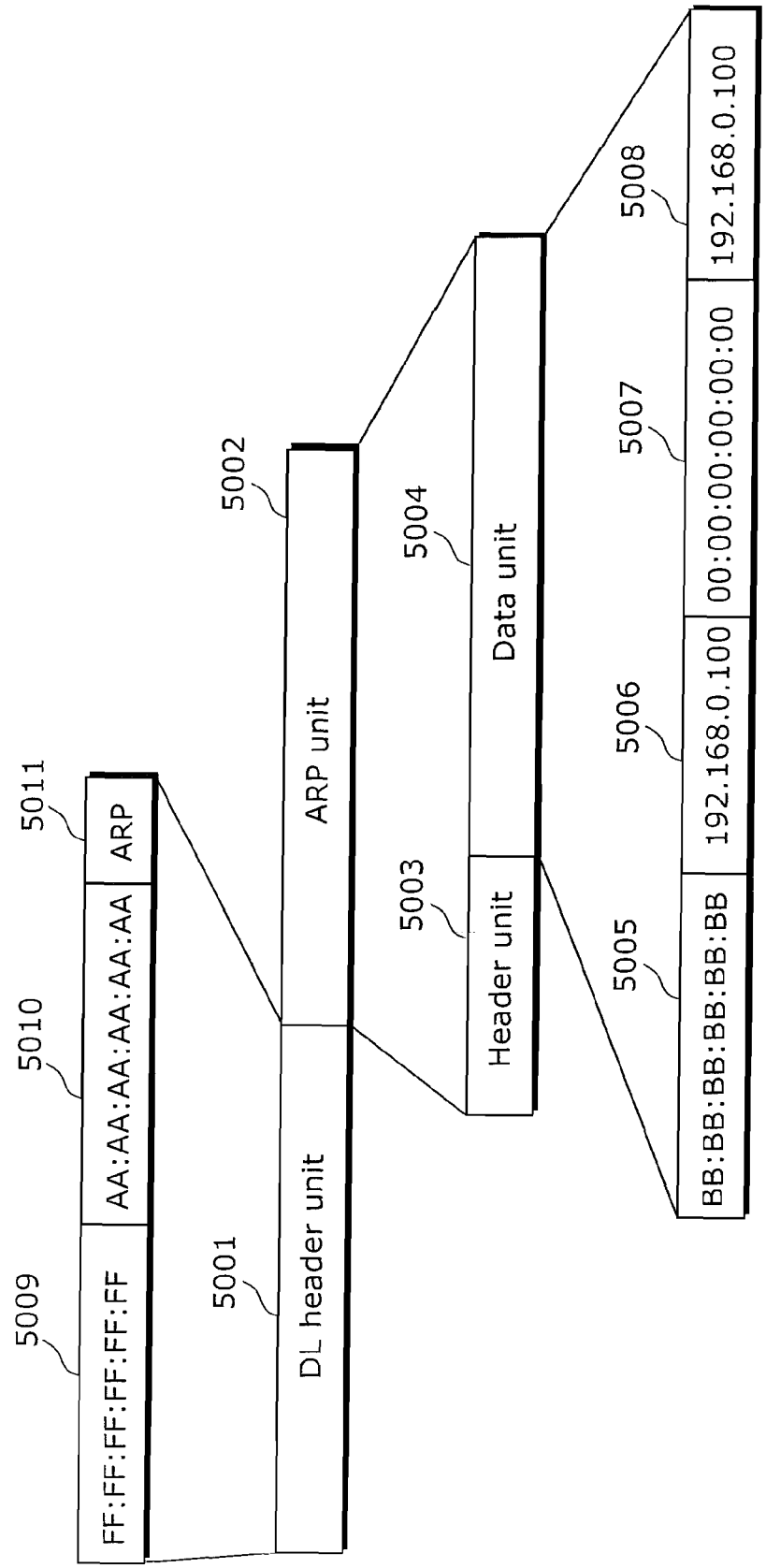

FIG. 54

| IP address | DL address | Expiration time |
|---|---|---|
| 192.168.0.100 | BB:BB:BB:BB:BB:BB | N seconds |
| | | |

FIG. 55

| IP address | DL address | Expiration time | Time until the update is accepted |
|---|---|---|---|
| 192.168.0.100 | BB:BB:BB:BB:BB:BB | N seconds | 0 second |

FIG. 56

| IP address | DL address | Expiration time |
|---|---|---|
| 192.168.0.100 | AA:AA:AA:AA:AA:AA | N seconds |
| | | |

FIG. 57

| IP address | DL address | Expiration time | Time until the update is accepted |
|---|---|---|---|
| 192.168.0.100 | AA:AA:AA:AA:AA:AA | N seconds | U seconds |

FIG. 58

| IP address | DL address | Expiration time |
|---|---|---|
| 192.168.0.100 | BB:BB:BB:BB:BB:BB | N seconds |
| | | |

FIG. 59

| IP address | DL address | Expiration time | Time until the update is accepted |
|---|---|---|---|
| 192.168.0.100 | AA:AA:AA:AA:AA:AA | N seconds | 0 second |

FIG. 60

| IP address | DL address | Expiration time | Time until the update is accepted |
|---|---|---|---|
| 192.168.0.100 | BB:BB:BB:BB:BB:BB | N seconds | U seconds |

FIG. 67

| IP address | DL address | Expiration time |
|---|---|---|
| 192.168.0.100 | AA:AA:AA:AA:AA:AA | N seconds |
| | | |

FIG. 68

| IP address | DL address | Expiration time | Time until the update is accepted |
|---|---|---|---|
| 192.168.0.100 | AA:AA:AA:AA:AA:AA | N seconds | 0 second |

FIG. 69

| IP address | DL address | Expiration time |
|---|---|---|
| 192.168.0.100 | BB:BB:BB:BB:BB:BB | N seconds |
| | | |

FIG. 70

| IP address | DL address | Expiration time | Time until the update is accepted |
|---|---|---|---|
| 192.168.0.100 | BB:BB:BB:BB:BB:BB | N seconds | U seconds |

FIG. 72

| IP address | DL address | Expiration time |
|---|---|---|
| 192.168.0.100 | AA:AA:AA:AA:AA:AA | N seconds |
| | | |

FIG. 73

| IP address | DL address | Expiration time | Time until the update is accepted |
|---|---|---|---|
| 192.168.0.100 | AA:AA:AA:AA:AA:AA | N seconds | 0 second |

FIG. 74

| IP address | DL address | Expiration time | Time until the update is accepted |
|---|---|---|---|
| 192.168.0.100 | AA:AA:AA:AA:AA:AA | N seconds | U seconds |

COMMUNICATION DEVICE PROVIDED WITH ARP FUNCTION

TECHNICAL FIELD

The present invention relates to a communication device, a program, a storage medium, and a communication method that permits communication via a network using TCP/IP protocol.

BACKGROUND ART

An operation (referred to as duplication detection, hereinafter) is present that when a network layer address (referred to as an IP address, hereinafter) is to be imparted newly to a communication device, it is checked whether the IP address to be imparted is duplicated on the same network. Among such duplication detection methods, a method is known which relates to IPv4 and in which duplication detection is performed using Address Resolution Protocol (abbreviated as ARP, hereinafter) (see, for example, Non-Patent Reference 1).

<ARP>

Supplementary explanation is given below for the ARP. The ARP is a protocol for resolving a data link layer address and a network layer address, in which packets of the format shown in FIG. 1 are exchanged between the communication devices so that the address are resolved. Further description is given below with reference to FIG. 1.

(a) DL Header Part 101

A DL header part 101 is a data link layer protocol header, and has information concerning the destination and the transmitting source in terms of the data link layer protocol address (referred to as a DL address, hereinafter) and concerning the network layer protocol type. Further, in a case that the data link layer protocol is Ethernet (registered trademark), when a packet is to be transmitted to all communication devices on the same network, "FF:FF:FF:FF:FF:FF" (referred to as an Ether broadcast address, hereinafter) is specified as the destination DL address. Further, when a packet is to be transmitted to a specific communication device, the DL address of the communication counter unit is set up as the destination DL address. At this time, the transmitting source DL address is the DL address of the transmitting source communication device.

(b) ARP Unit 102

An ARP unit 102 is further composed of a header part 103 and a data part 104.

The header part 103 has: information concerning the data link layer protocol; information concerning the network layer protocol; the lengths of the DL address and the network layer protocol address (referred to as a NW address, hereinafter) used in these protocols; and ARP identifier information indicating whether the present ARP packet is a packet (referred to as an ARP request packet, hereinafter) that requests information or a packet (referred to as an ARP reply packet, hereinafter) that provides information.

The data part 104 is composed of the following elements.

A transmitting source DL address 105 specifies the data link layer address of a transmitting source communication device. A transmitting source IP address 106 specifies the network layer address of the transmitting source communication device. A destination DL address 107 specifies the data link layer address of a communication device serving as the target of address resolution. When the address is un-resolved, "00:00:00:00:00:00" is specified in an ARP packet that requests resolution. A destination IP address 108 specifies the network layer address of the communication device serving as the target of address resolution. When the destination IP address matches the network layer address of the communication device itself in the case of an ARP request packet, an ARP reply packet is to be transmitted.

<Duplication Detection Method Using ARP>

FIG. 2 shows a simple network configuration. A network 201 is a local area network (referred to as a LAN, hereinafter), and may be cable or wireless. A communication device 202 (referred to as a device A in some cases, hereinafter), a communication device 203 (referred to as a device B in some cases, hereinafter), and communication devices 204-1, 204-2, . . . , 204-N are communication devices having a TCP/IP communication function, and are connected to the network 201. FIG. 3 describes a duplication detection processing sequence using ARP in a case that in this network environment, the communication device 203 (device B) tries to set up the same IP address as the communication device 202 (device A).

When setting up an IP address, the communication device 203 (device B) checks whether the same IP address is present on the network 201 by using the own duplication detection function. At this time, an ARP request packet concerning the IP address to be set up from now on is transmitted to all addresses of communication devices (referred to as broadcast, hereinafter) on the network 201 (#3BF). Each communication device having received this broadcast-addressed ARP request packet checks whether the IP address is the same as its own setting. In the network 201, the communication device 202 (device A) sets up the same IP address, and hence the IP address is duplicated. At this time, the communication device 202 (device A) transmits an ARP reply packet to the address of the communication device 203 (device B) (referred to as unicast, hereinafter) (#3AB). The communication device 203 (device B) having received this unicast ARP reply packet determines that the IP address to be set up is used already for a communication device on the network 201, and hence abandons the use of this IP address.

Further, as duplication detection methods using this ARP, two kinds of methods are present. The difference between the two kinds is a difference in the packet broadcasted from the communication device B203.

(1) Method that Gratuitous ARP (abbreviated as a GARP, hereinafter) is transmitted (see, for example, Non-Patent Reference 2)

(2) Method in which ARP (referred to as 0ARP, hereinafter) is broadcasted in which 0's are inserted into a transmitting source IP address (see, for example, Non-Patent Reference 3)

The method (1) is adopted in the Windows (registered trademark) OS (see, for example, Non-Patent Reference 4). Further, the method (2) is adopted in client installation of Dynamic Host Configuration Protocol (abbreviated as DHCP, hereinafter). Further, in BSD OSs', the GARP of the method (1) is transmitted at the time of address setting for a purpose other than the duplication detection. Here, also in a home network, since the possibility is not negligible that the two duplication detection methods are used in a mixed manner, a it should be expected that a method using the GARP of the method (1) is adopted.

<GARP>

Supplementary explanation is given below for the GARP. The GARP is used also for duplication detection. However, it has originally been set forth for another purpose. The purpose of the GARP is broadcast transmission onto the network 201. That is, the purpose is to rewrite the table (referred to as an ARP table, hereinafter) of the communication counter unit, which is managed by a communication device on the network 201 like communication devices such as the communication devices 204-1, 204-2, . . . , 204-N, the communication devices A202 and the communication device B203. Each communication device having received a GARP, like the communication devices 204-1, 204-2, . . . , 204-N, the communication device A202 and the communication device B203, searches the ARP table on the basis of the transmitting source IP address 106 in the GARP. Then, when an entry having the transmitting source IP address 106 is present in the ARP table, the entry is updated with the transmitting source DL address 105 of the received GARP (see, for example, Non-Patent Reference 2).

Non-Patent Reference 1: Standard Specification "RFC826", IETF, [Searched on May 19, 2007 (H17)], Internet <URL: http://www.ietf.org/rfc/rfc826.txt>

Non-Patent Reference 2: Standard Specification "RFC2002", IETF, [Searched on May 19, 2007 (H17)], Internet <URL: http://www.ietf.org/rfc/rfc2002.txt>

Non-Patent Reference 3: Standard Specification "RFC2131", IETF, [Searched on May 19, 2007 (H17)], Internet <URL: http://www.ietf.org/rfc/rfc2131.txt>

Non-Patent Reference 4: Microsoft Windows (registered trademark) 2000 Technical Reference, "TCP/IP Protocol & Service Guide"=pp. 74-75

SUMMARY OF THE INVENTION

Problems that Invention is to Solve

<Duplication Detection Method Using GARP>

However, the GARP rewrites the ARP table on the network as described above. Thus, when the GARP is used for duplication detection, the following problems occur.

(a) Initial State

When duplication detection using GARP is performed, the following problem arises owing to a feature of the GARP packet. For simplicity of description, the following explanation is given with reference to a network configuration diagram of FIG. 4 in which the communication devices 204-1, 204-2, . . . , 204-N of FIG. 2 are built as one device.

An IP address "192.168.0.100" is set up in a communication device 402 (referred to as a device A402, hereinafter), as shown in table 405. Then, the device has a DL address "AA:AA:AA:AA:AA:AA". Further, in a communication device 404 (referred to as a device C404, hereinafter), an IP address "192.168.0.200" is set up. Then, the device has a DL address "CC:CC:CC:CC:CC:CC". At this time, the device A402 and the device C404 communicate with each other. As shown in FIG. 5, the device C404 holds an ARP table indicating that the IP address "192.168.0.100" corresponds to the DL address "AA:AA:AA:AA:AA:AA". Further, the expiration time in the ARP table indicates that this entry is valid for N seconds. The N is tens of seconds in a short case and several hours in a long case. This value depends on the setting of each communication device.

(b) Starting Duplication Detection of Device B403

At this time, as shown in table 406, a communication device 403 (referred to as a device B403, hereinafter) has a DL address "BB:BB:BB:BB:BB:BB" and, from now on, tries to detect duplication concerning the IP address "192.168.0.100" which overlaps that of the device A402. The sequence at this time is described below with reference to FIG. 6.

The device A402 and the device C404 are in a mutually communicating state (#6AC1, #6CA1). In this situation, the device B403 broadcasts a GARP for duplication detection (#6BF). The GARP packet (#6BF) transmitted from the device B403 At this time is an ARP packet shown in FIG. 7. Processing performed in the devices that receive the GARP packet is described below.

(c) Behavior of Device A402

The device A402 having received this GARP packet (#6BF) determines that the address is duplicated with the IP address used by the device A402, and hence returns an ARP reply (referred to as a duplication notification ARP, hereinafter) packet notifying that the IP address is duplicated (#6AB).

(d) Behavior of Device C404

Since the address is not duplicated with the IP address used by the device C404, the device C404 having received this GARP packet (#6BF) does not return a duplication notification ARP packet. However, because of the ARP table update function which is the original purpose of the GARP, an entry is searched for that has an IP address "192.168.0.100" in the ARP table held in the device C404. Then, the entry is rewritten with the information of the received GARP. As a result, the ARP table in the device C404 becomes as shown in FIG. 8.

(e) Communication Between Device A402 and Device C404 after Duplication Detection After the completion of duplication detection by the device B403, when the device A402 tries to communicate with the device C404, a packet can be transmitted satisfactorily from the device A402 to the device C404 (#6ACN). However, when a packet is to be transmitted from the device C404 to the device A402, since the information in the ARP table held in the device C404 indicates that the IP address "192.168.0.100" is the DL address "BB:BB:BB:BB:BB:BB" as shown in FIG. 8, the packet is erroneously transmitted to the device B403 (#6CAN).

(f) Restoration of Communication of Device C404

The device C404 continues to hold in the ARP table the erroneous information concerning the device A402 and the device B403. Thus, until the ARP table expiration time elapses, the device C404 continues to erroneously transmit packets to the device A402 to the device B403. After a predetermined time of N seconds has elapsed, the device C404 deletes the ARP table concerning the entry corresponding to the IP address "192.168.0.100". Accordingly, since the entry corresponding to the device A402 has been deleted from the ARP table of the device C404, an ARP request is broadcasted (#6CF) in order to resolve the DL address of the device A402. The device A402 receives this ARP request (#6CF) and then notifies the correct DL address "AA:AA:AA:AA:AA:AA" of the device A402 to the device C404, so that the ARP table of the device C404 returns to the state of FIG. 5 (#6ACA). As a result, communication from the device C404 to the device A402 is restored (#6CAM).

As such, in a case that a communication device that performs duplication detection using GARP is present, a problem arises that after duplication detection, communication failure is caused for a predetermined time by a device having a duplicated address.

<Installation of Windows (Registered Trademark)>

Meanwhile, in the Windows (registered trademark) OS in which duplication detection is perform by GARP, the following processing is performed after duplication detection such that the problem of communication failure of the device C404 should be avoided. Its description is given below with reference to FIG. 9. The device B403 is assumed to employ the Windows (registered trademark) OS.

At the time of duplication detection, the device B403 broadcasts a GARP (#9BF). Then, the device B403 receives an ARP reply from the device A402 and recognizes that the IP address is duplicated (#9AB). After that, the device B403 serves as if it were the device A402, and broadcasts a GARP (#9AF). By virtue of this, the ARP table of the device C404 is immediately restored, so that failure is avoided in subsequent communication (#9ACM, #9CAM).

When the device B403 is installed as described here, communication between the device A402 and the device C404 can be restored immediately. However, the device B403 is not always installed like this. Further, since the packet is transmitted from the device B403 that serves as if it were the device A402, the information in the DL address table of a switching hub on the path of the broadcast could be damaged. This would cause another communication failure.

The present invention has been devised in view of the above-mentioned problems. An object of the present invention is to provide a communication device and the like capable of solving the problem of communication interruption that could be caused after the detection of duplication in a communication device.

Means to Solve the Problems

In order to achieve the object above, a communication device is realized which manages network layer addresses and data link layer addresses in association with each other is realized as a first invention, the communication device comprising: an Address Resolution Protocol (ARP) receiving unit which receives ARP packets transmitted by ARP; a duplication detecting unit which detects a Gratuitous ARP (GARP) packet in which a network layer address of a transmitting source matches a network layer address of the communication device, from among the ARP packets received by the ARP receiving unit; a duplication notification generating unit which generates an ARP reply packet notifying the transmitting source that the network layer address is duplicated, when the GARP packet is detected by the duplication detecting unit; an update GARP generating unit which generates an update GARP packet in which the network layer address and the data link layer address of the communication device are set up, when the GARP packet is detected by the duplication detecting unit; and an ARP transmitting unit which transmits, by ARP, the ARP reply packet generated by the duplication notification generating unit and transmit, by GARP, the update GARP packet generated by the update GARP generating unit.

Accordingly, by virtue of the Gratuitous ARP packet, the updated ARP tables of the communication devices on the same network can be restored so that restoration of communication is achieved.

As a second invention, the update GARP generating unit immediately generates the update GARP packet and transfers the update GARP packet to the ARP transmitting unit, when the GARP packet is detected by the duplication detecting unit.

Accordingly, by virtue of the Gratuitous ARP packet, the updated ARP tables of the communication devices on the same network can immediately be restored so that rapid restoration of communication is achieved.

As a third invention, the duplication notification generating unit may generate the ARP reply packet and transfer the ARP reply packet to the ARP transmitting unit, when a duplication detection notification notifying that the network layer address is duplicated is accepted from the duplication detecting unit, the update GARP generating unit may generate the update GARP packet and transfer the update GARP packet to the ARP transmitting unit, when the duplication detection notification is accepted from the duplication detecting unit, and the duplication detecting unit may limit a number of times per time unit of transferring the duplication detection notification to the duplication notification generating unit and the update GARP generating unit, when GARP packets are successively detected from among the ARP packets received by the ARP receiving unit.

Accordingly, the amount of traffic of update GARP packets can be limited so that reduction is achieved in the ratio of Gratuitous ARP packets in the communication on the network.

As a fourth invention, the communication device further comprises a duplication notifying unit which may transfer, to the duplication detecting unit, an address duplication notification notifying that the network layer address is duplicated, when, after the ARP transmitting unit has transmitted the update GARP packet, the ARP receiving unit may receive an ARP reply packet in which the network layer address of the transmitting source matches the network layer address of the communication device, and the duplication notification generating unit may generate the ARP reply packet and transfer the ARP reply packet to the ARP transmitting unit, when a duplication detection notification notifying that the network layer address is duplicated is accepted from the duplication detecting unit, the update GARP generating unit may generate the update GARP packet and transfer the update GARP packet to the ARP transmitting unit, when the duplication detection notification is accepted from the duplication detecting unit, and the duplication detecting unit may stop transfer of the duplication detection notification to the duplication notification generating unit and the update GARP generating unit, when the address duplication notification is accepted from the duplication notifying unit.

Accordingly, in a case that the Gratuitous ARP packet is used for a purpose other than the duplication detection and that a function similar to that of the present invention is installed, exchange of update Gratuitous ARP packets can be stopped that could be generated when an update Gratuitous ARP packet is transmitted together with a duplication notification ARP packet. This permits suppression of wasteful network traffic.

As a fifth invention, the communication device may further comprise: a duplication monitoring unit which outputs that the network layer address of the communication device is duplicated on the network connected to the communication device, when an address duplication notification notifying that the network layer address is duplicated is accepted; and a duplication notifying unit which transfers the address duplication notification to the duplication monitoring unit, when, after the ARP transmitting unit has transmitted the update GARP packet, the ARP receiving unit receives an ARP reply packet in which the network layer address of the transmitting source matches the network layer address of the communication device.

This permits detection that a communication device having a duplicated network layer address is present on the network. Then, when the result is notified, requesting the user to change the setting is achieved.

As a sixth invention, the duplication notifying unit may include the network address of the transmitting source in such a manner that the data link layer address is included and transfer the resulting notification, and the duplication monitoring unit outputs the data link layer address of the transmitting source included in the address duplication notification.

This permits recognition of the data link layer address of a communication device that causes address duplication. Thus, requesting the user to change the setting of the communication device that causes duplication is achieved.

As a seventh invention, the duplication notifying unit may include the network address of the transmitting source in such a manner that the data link layer address is included and transfer the resulting notification, and the duplication monitoring unit may output the network layer address of the transmitting source included in the address duplication notification.

This permits recognition of a network layer address that causes duplication in a communication device having a plurality of network layer addresses. Thus, requesting the user to change solely that network layer address is achieved.

As an eighth invention, the duplication detecting unit has a GARP counter for counting GARP packets and may: hold the last GARP packet which is a GARP packet received most recently by the ARP receiving unit; increment the GARP counter when the last GARP packet matches a GARP packet received by the ARP receiving unit; clear the GARP counter when they do not match each other; and stop transfer of the duplication detection notification to the duplication notification generating unit and the update GARP generating unit, when the GARP counter exceeds the predetermined number as long as the last GARP packet matches a GARP packet received by the ARP receiving unit.

Accordingly, exchange of an update GARP packet with the same communication device can be stopped so that reduction of network traffic is achieved.

As a $9^{th}$ invention, the update GARP generating unit may generate a plurality of update GARP packets and transfer the plurality of update GARP packets to the ARP transmitting unit.

Accordingly, in a case that a network such as a wireless LAN having a high packet loss rate is present, the possibility is increased that at least one update GARP packet can reach other communication devices on the network. Thus, even in a network employing various communication media, the ARP tables of other communication devices can be updated so that restoration of communication with other communication devices on the network is achieved.

As a tenth invention, a communication device is realized which manages network layer addresses and data link layer addresses in association with each other, including: an ARP receiving unit which receives an ARP packet transmitted by Address Resolution Protocol (ARP); a duplication detecting unit which detects a Gratuitous ARP (GARP) packet in which a network layer address of a transmitting source matches a network layer address of the communication device, from among ARP packets received by the ARP receiving unit; a duplication notification generating unit which generates an ARP reply packet notifying the transmitting source that the network layer address is duplicated, when the GARP packet is detected by the duplication detecting unit; an update GARP generating unit which generates an update GARP packet in which the network layer address and the data link layer address of the communication device are set up, when the GARP packet is detected by the duplication detecting unit; an update GARP delaying unit which delays, by a predetermined time, transmission of the update GARP packet generated by the update GARP generating unit; and an ARP transmitting unit which transmits by ARP the ARP reply packet generated by the duplication notification generating unit and transmits by GARP the update GARP packet delayed by the update GARP delaying unit.

Accordingly, even in a communication device in which the ARP table is not updated for a predetermined time, the ARP table can be updated so that restoration of communication is achieved.

As an eleventh invention, a communication device is realized which manages network layer addresses and data link layer addresses in association with each other, the communication device comprising: an ARP receiving unit which receives an ARP packet transmitted by Address Resolution Protocol (ARP); a duplication detecting unit which detects a Gratuitous ARP (GARP) packet in which a network layer address of a transmitting source matches a network layer address of the communication device, from among ARP packets received by the ARP receiving unit; a duplication notification generating unit which generates an ARP reply packet notifying the transmitting source that the network layer address is duplicated, when the GARP packet is detected by the duplication detecting unit; an update GARP generating unit which generates a plurality of update GARP packets in which the network layer address and the data link layer address of the communication device are set up, when the GARP packet is detected by the duplication detecting unit; an update GARP delaying unit which delays by a predetermined time at least one of the plurality of update GARP packets generated by the update GARP generating unit; and an ARP transmitting unit which transmits by ARP the ARP reply packet generated by the duplication notification generating unit and transmits by GARP the update GARP packet delayed by the update GARP delaying unit.

Accordingly, even in a case that communication devices that update the ARP table immediately and communication devices that do not update the ARP table for a predetermined time are present in a mixed manner on the network connected to the communication device, the ARP tables of the communication devices can be updated so that early restoration of communication in various communication devices connected to the network is achieved.

As a twelfth invention, the communication device further includes a duplication notifying unit which transfers to the duplication detecting unit and the update GARP delaying unit an address duplication notification notifying that the network layer address is duplicated, when, after the ARP transmitting unit has transmitted the update GARP packet, the ARP receiving unit receives a duplication notification ARP packet in which the network layer address of the transmitting source matches the network layer address of the communication device, and the duplication notification generating unit generates the ARP reply packet and transfers the ARP reply packet to the ARP transmitting unit, when the duplication detection notification is accepted from the duplication detecting unit, the update GARP generating unit generates a plurality of the update GARP packets and transfer at least one of them to the GARP delaying unit, when the duplication detection notification is accepted from the duplication detecting unit, the duplication detecting unit stops transfer of the duplication detection notification to the duplication notification generating unit and the update GARP generating unit, when the address duplication notification is accepted from the duplication notifying unit, and the update GARP delaying unit which stops delay by a predetermined time of the update GARP packet having already been accepted from the update GARP generating unit and transfers the update GARP packet to the ARP transmitting unit, when the address duplication notification is accepted from the duplication notifying unit.

Accordingly, when duplication is detected in the network layer address of a communication device on the network already managed by the address administration unit, unnecessary transmission of update GARP packets after address duplication can be stopped. This permits reduction in the traffic that could be caused by wasteful GARP packets on the network, and avoids update of the ARP table in the communication device that could occur frequently.

As a thirteenth invention, the duplication detecting unit may transfer to the update GARP generating unit and the update GARP delaying unit a GARP duplication receiving notification notifying that the ARP receiving unit has received a GARP packet in which the network layer address is duplicated with the network layer address of the communication device, when, during the time that the update GARP delaying unit delays by a predetermined time the update GARP packet accepted from the update GARP generating unit, the ARP receiving unit may receive a GARP packet in which the network layer address of the transmitting source matches the network layer address of the communication device, the update GARP generating unit may stop transfer to the update GARP delaying unit of at least one of the generated update GARP packets, when the GARP duplication receiving notification is accepted from the duplication detecting unit, and the update GARP delaying unit may temporarily stop transfer of the update GARP packet having already been accepted from the update GARP generating unit to the ARP transmitting unit after a predetermined time delay and newly delay the update GARP packet by the predetermined time and transfer the update GARP packet to the ARP transmitting unit, when the GARP duplication receiving notification is accepted from the duplication detecting unit.

Accordingly, in a network environment where communication devices that repeat plural times of duplication detection processing using a Gratuitous ARP packet and communication device that do not update the ARP table for a predetermined time after the same Gratuitous ARP packet is received most recently are present in a mixed manner, the ARP tables of all communication devices can be updated so that restoration of communication with all communication devices is achieved.

As a fourteenth invention, the duplication detecting unit may further hold as the DL address information the data link layer address of the transmitting source of the GARP packet and transfer the GARP duplication receiving notification to the update GARP generating unit and the update GARP delaying unit only when, during the time that the update GARP delaying unit delays by a predetermined time the update GARP packet accepted from the update GARP generating unit, and the ARP receiving unit may receive a GARP packet in which the network layer address of the transmitting source matches the network layer address of the communication device and further the data link layer address of the transmitting source matches the DL address information.

Accordingly, even in a network environment where communication devices that repeat plural times of duplication detection processing using a Gratuitous ARP packet and communication device that do not update the ARP table for a predetermined time after the same Gratuitous ARP packet is received most recently are present in a mixed manner, the ARP tables of all communication devices can be updated within an optimal time so that rapid restoration of communication with all communication devices is achieved.

As a fifteenth invention, the duplication detecting unit may further stop transfer of the duplication detection notification when, during the time that the update GARP delaying unit delays by a predetermined time the update GARP packet accepted from the update GARP generating unit, the ARP receiving unit may receive a duplication ARP packet in which the network layer address of the transmitting source matches the network layer address of the communication device.

Accordingly, even in a case that a large number of Gratuitous ARP packets are provided at the time of a DoS (Denial of Services) attack or the like, the number of update GARP packets can be limited that are allowed to be transmitted within a predetermined time. This avoids the situation that the communication device itself causes a DoS attack.

As a sixteenth invention, an address duplication searching unit may search for duplication of a network layer address by using a network layer address for address duplication search; and a GARP generating unit may generate a search GARP packet in which the network layer address for address duplication search is set up as a network layer address of the transmission destination, the ARP transmitting unit may transmit the search GARP packet generated by the GARP generating unit, and the duplication detecting unit which transfers an address duplication notification notifying that the network layer address is duplicated, when, during the time that the ARP transmitting unit transmits the search GARP packet and that the address duplication searching unit searches for address duplication, a duplication ARP packet is received in which the network layer address of the transmission destination matches the network layer address for search.

Accordingly, a check can be performed whether a communication device having a duplicated network layer address is present on the same network, so that network setting free from duplication is achieved.

As a seventeenth invention, the communication device further includes a restoration GARP generating unit which may set the data link layer address of the transmitting source of the duplication ARP packet as a data link layer address of the transmitting source and generate a restoration GARP packet in which the network layer address for address duplication search is set up as a network layer address of the transmission destination, and the duplication detecting unit may transfer to the address duplication searching unit the data link layer address of the transmitting source of the duplication ARP packet in a manner included in the address duplication notification, the address duplication searching unit may transfer to the restoration GARP generating unit the data link layer address of the transmitting source of the duplication ARP packet and the network layer address for address duplication search included in the address duplication notification, and the ARP transmitting unit may set the data link layer address of the transmission destination of the restoration GARP packet as a data link layer broadcast address, and set the data link layer address of the transmitting source of the restoration GARP packet as a data link layer address set in the communication device, so as to transmit the restoration GARP packet.

Accordingly, by virtue of the search GARP, the updated ARP tables of the communication devices on the same network can be restored so that restoration of communication is achieved. Further, when the data link layer address of the present communication device is used as the transmission source address of the data link layer header, erroneous learning is avoided in a switching hub on the network.

As an eighteenth invention, the restoration GARP generating unit may immediately generate a restoration GARP packet and transfer the restoration GARP packet to the ARP transmitting unit, when a restoration GARP generation notification that instructs to generate a restoration GARP packet is accepted from the address duplication searching unit.

Accordingly, by virtue of the search GARP, the updated ARP tables of the communication devices on the same network can immediately be restored so that rapid restoration of communication is achieved.

As a nineteenth invention, the communication device further comprises a duplication monitoring unit which may output that the network layer address of the communication device is duplicated on the network connected to the communication device, when the address duplication notification is accepted from the address duplication searching unit, and the address duplication searching unit may transfer the address duplication notification to the duplication monitoring unit, when a duplication ARP packet in which the network layer address of the transmitting source matches the network layer address of the communication device is received and when the address duplication notification is accepted from the duplication detecting unit.

This permits detection that a communication device having a duplicated network layer address is present on the network. Then, when the result is notified, requesting the user to change the setting is achieved.

As a twentieth invention, the address duplication searching unit may transfer to the duplication monitoring unit the data link layer address of the transmitting source of the duplication ARP packet in a manner included in the address duplication notification, and the duplication monitoring unit may output the data link layer address of the transmitting source of the duplication ARP packet included in the address duplication notification.

This permits recognition of the data link layer address of a communication device that causes address duplication. Thus, requesting the user to change the setting of the communication device that causes duplication is achieved.

As a twenty-first invention the address duplication searching unit may transfer to the duplication monitoring unit the network layer address of the transmitting source of the duplication ARP packet in a manner included in the address duplication notification, and the duplication monitoring unit may output the network layer address of the transmitting source of the duplication ARP packet included in the address duplication notification.

This permits recognition of a network layer address that causes duplication in a communication device having a plurality of network layer addresses. Thus, requesting the user to change solely that network layer address is achieved.

As a twenty-second invention, the restoration GARP generating unit may generate a plurality of the restoration GARP packets when the restoration GARP generation notification is accepted from the address duplication searching unit, and the ARP transmitting unit may transmit the plurality of restoration GARP packets generated by the restoration GARP generating unit.

Accordingly, in a case that a network such as a wireless LAN having a high packet loss rate is present, the possibility is increased that at least one update GARP packet can reach other communication devices on the network. Thus, even in a network employing various communication media, the ARP tables of other communication devices can be updated. Thus, even in a network employing various communication media, restoration of communication with other communication devices on the network is achieved.

As a twenty-third invention, the communication device further includes a restoration GARP delaying unit which may delay by a predetermined time a restoration GARP packet accepted from the restoration GARP generating unit and transfer the restoration GARP packet to the ARP transmitting unit, and the restoration GARP generating unit may generate a plurality of the restoration GARPs so as to transfer to the ARP transmitting unit at least one of the generated restoration GARP packets and transfer to the restoration GARP delaying unit at least one of the generated restoration GARP packets.

Accordingly, even in a case that communication devices that update the ARP table immediately and communication devices that do not update the ARP table for a predetermined time are present in a mixed manner on the network connected to the communication device, the ARP tables of the communication devices can be updated so that early restoration of communication in various communication devices connected to the network is achieved.

As a twenty-fourth invention, the address duplication searching unit may stop transfer of the address duplication notification to the restoration GARP generating unit, when the address duplication notification is accepted and when the restoration GARP delaying unit is delaying by a predetermined time the restoration GARP packet having already been accepted from the restoration GARP generating unit.

Accordingly, transmission of unnecessary restoration GARPs can be reduced so that reduction of wasteful network traffic is achieved.

As a twenty-fifth invention, an address duplication searching unit may search for duplication of a network layer address by using a network layer address for address duplication search; a GARP generating unit may generate a search GARP packet in which the network layer address for address duplication search is set up as a network layer address of the transmission destination; and an ARP search generating unit may generate a search ARP request packet in which the network layer address for address duplication search is set up as the transmission destination network layer address, the transmitting source network layer address is unspecified, the data link layer address of the transmission destination is unspecified, and the data link layer address of the transmitting source is set up as the data link layer address of the communication device, the ARP transmitting unit may transmit the search GARP packet generated by the GARP generating unit and transmit the search ARP request packet generated by the ARP search generating unit, and the duplication detecting unit may transfer to the address duplication searching unit an address duplication notification notifying that the network layer address is duplicated, when, during the time that the address duplication searching unit searches for address duplication, the ARP receiving unit receives a duplication ARP packet in which the network layer address of the transmission destination matches the network layer address for address duplication search.

Accordingly, even in a communication device that does not return a reply to a search GARP packet, an address duplication reply can be returned so that network layer address duplication can be detected on the network. Thus, network setting free from duplication is achieved.

As a twenty-sixth invention, a communication device is realized which manages network layer addresses and data link layer addresses in association with each other, the communication device including: a duplication detecting unit which detects a Gratuitous ARP (GARP) packet in which a network layer address of a transmitting source matches a network layer address of the communication device, from among received Address Resolution Protocol (ARP) packets; and an ARP information administration unit which deletes all information in an ARP table in which network layer addresses and data link layer addresses concerning communication devices on a network connected to the communication device are managed in association with each other, when the GARP packet is detected by the duplication detecting unit.

Accordingly, an ARP table can be generated newly at the time of start of communication from the communication device. Thus, restoration of communication is achieved.

Here, in addition to the implementation in the form of a communication device, the present invention may be implemented for example as: a communication method of controlling a communication device; a communication program that causes a computer system or the like to execute the communication method; and a storage medium that records the communication program.

Effects of the Invention

According to the present invention, ARP tables on the same network can immediately be restored so that a communication failure state for a predetermined time can be avoided.

BRIEF DESCRIPTION OF DRAWINGS

FIG. 5 is a diagram showing an ARP table of a device C in a conventional mode;

FIG. 8 is a diagram showing an ARP table of a device C after a device B transmits a GARP packet in a conventional mode;

FIG. 15 is a diagram showing an ARP table of a device C according to the first embodiment of the present invention;

FIG. 16 is a diagram showing an ARP table of a device C after a device B transmits a GARP packet, according to the first embodiment of the present invention;

FIG. 17 is a diagram showing an ARP table of a device C after a device A transmits a GARP packet, according to the first embodiment of the present invention;

FIG. 21 is a diagram showing an ARP table of a device C according to the second embodiment of the present invention;

FIG. 22 is a diagram showing an ARP table of a device C according to the second embodiment of the present invention;

FIG. 23 is a diagram showing an ARP table of a device C according to the second embodiment of the present invention;

FIG. 27 is a diagram showing an ARP table of a device C according to the third embodiment of the present invention;

FIG. 28 is a diagram showing an ARP table of a device D according to the third embodiment of the present invention;

FIG. 29 is a diagram showing an ARP table of a device C after a device B transmits a GARP packet, according to the third embodiment of the present invention;

FIG. 30 is a diagram showing an ARP table of a device D after a device B transmits a GARP packet, according to the third embodiment of the present invention;

FIG. 31 is a diagram showing an ARP table of a device C after a device A transmits an update GARP packet, according to the third embodiment of the present invention;

FIG. 32 is a diagram showing an ARP table of a device D after a device A transmits a delayed GARP packet, according to the third embodiment of the present invention;

FIG. 38 is a diagram showing an ARP table of a device A according to the fourth embodiment of the present invention;

FIG. 39 is a diagram showing an ARP table of a device C according to the fourth embodiment of the present invention;

FIG. 40 is a diagram showing an ARP table of a device C after a device B transmits a GARP packet, according to the fourth embodiment of the present invention;

FIG. 41 is a diagram showing an ARP table of a device A after a device B transmits a GARP packet, according to the fourth embodiment of the present invention;

FIG. 42 is a diagram showing an ARP table of a device C after a device A transmits an ARP request packet, according to the fourth embodiment of the present invention;

FIG. 43 is a diagram showing an ARP table of a device A after a device C transmits an ARP reply packet, according to the fourth embodiment of the present invention;

FIG. 47 is a diagram showing an ARP table of a device C according to the sixth embodiment of the present invention;

FIG. 48 is a diagram showing an ARP table of a device C after a device A transmits a GARP packet, according to the sixth embodiment of the present invention;

FIG. 49 is a diagram showing an ARP table of a device C after a device A transmits a restoration GARP packet, according to the sixth embodiment of the present invention;

FIG. 50 is a diagram showing a format of a restoration GARP packet in the sixth embodiment according to the present invention

FIG. 54 is a diagram showing an ARP table of a device C according to the eighth embodiment of the present invention;

FIG. 55 is a diagram showing an ARP table of a device D according to the eighth embodiment of the present invention;

FIG. 56 is a diagram showing an ARP table of a device C after a device A transmits a GARP packet, according to the eighth embodiment of the present invention;

FIG. 57 is a diagram showing an ARP table of a device D after a device A transmits a GARP packet, according to the eighth embodiment of the present invention;

FIG. 58 is a diagram showing an ARP table of a device C after a device A transmits a restoration GARP packet, according to the eighth embodiment of the present invention;

FIG. 59 is a diagram showing an ARP table of a device D at the time that a device A transmits a restoration GARP packet, according to the eighth embodiment of the present invention;

FIG. 60 is a diagram showing an ARP table of a device D after a device A transmits a delayed restoration GARP packet, according to the eighth embodiment of the present invention;

FIG. 67 is a diagram showing an ARP table of a device C according to the tenth embodiment of the present invention;

FIG. 68 is a diagram showing an ARP table of a device D according to the tenth embodiment of the present invention;

FIG. 69 is a diagram showing an ARP table of a device C after a device A transmits a GARP packet, according to the tenth embodiment of the present invention;

FIG. 70 is a diagram showing an ARP table of a device D after a device A transmits a GARP packet, according to the tenth embodiment of the present invention;

FIG. 72 is a diagram showing an ARP table of a device C after a device A transmits an update GARP packet, according to the tenth embodiment of the present invention;

FIG. 73 is a diagram showing an ARP table of a device D at the time that a device A transmits a delayed update GARP packet, according to the tenth embodiment of the present invention;

FIG. 74 is a diagram showing an ARP table of a device D after a device A transmits a delayed update GARP packet, according to the tenth embodiment of the present invention;

NUMERICAL REFERENCES

Figure 1:
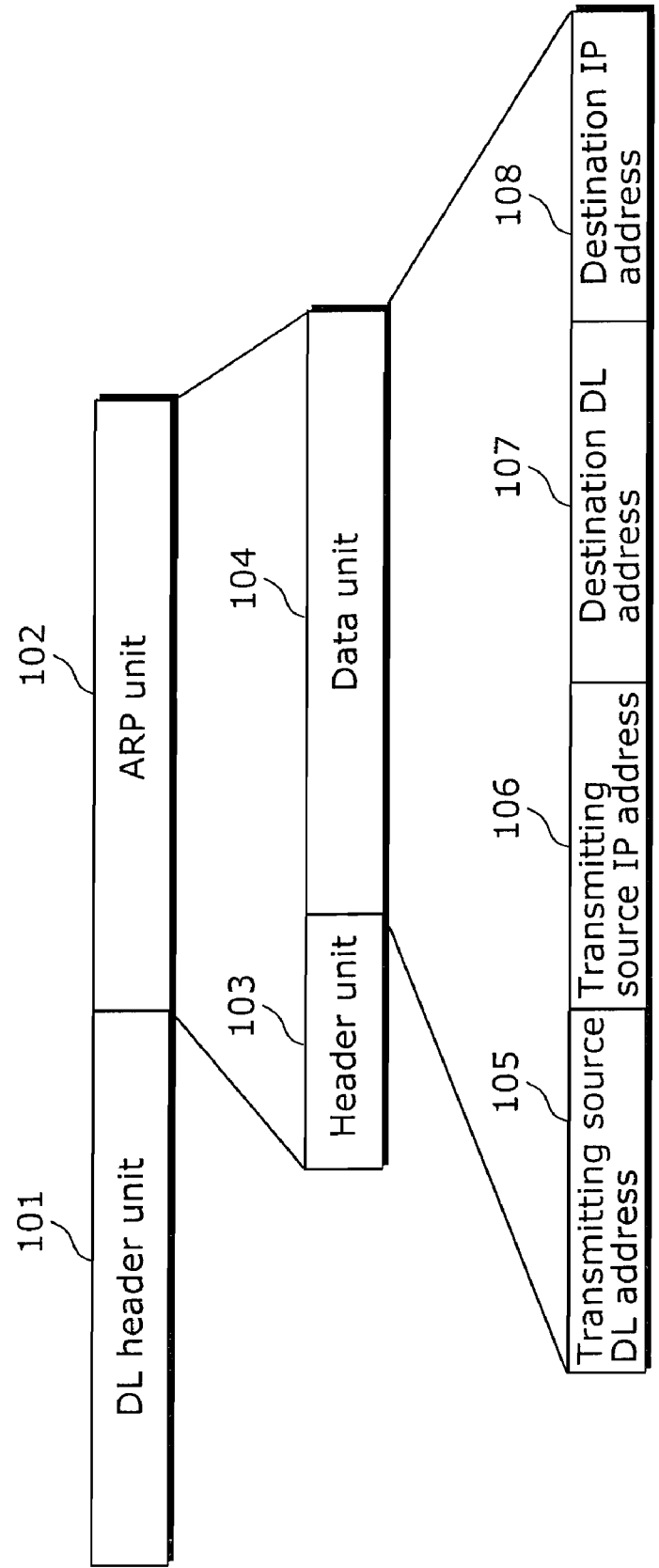
FIG. 1 is a diagram showing a format of an ARP packet in a conventional mode.
Figure 2:
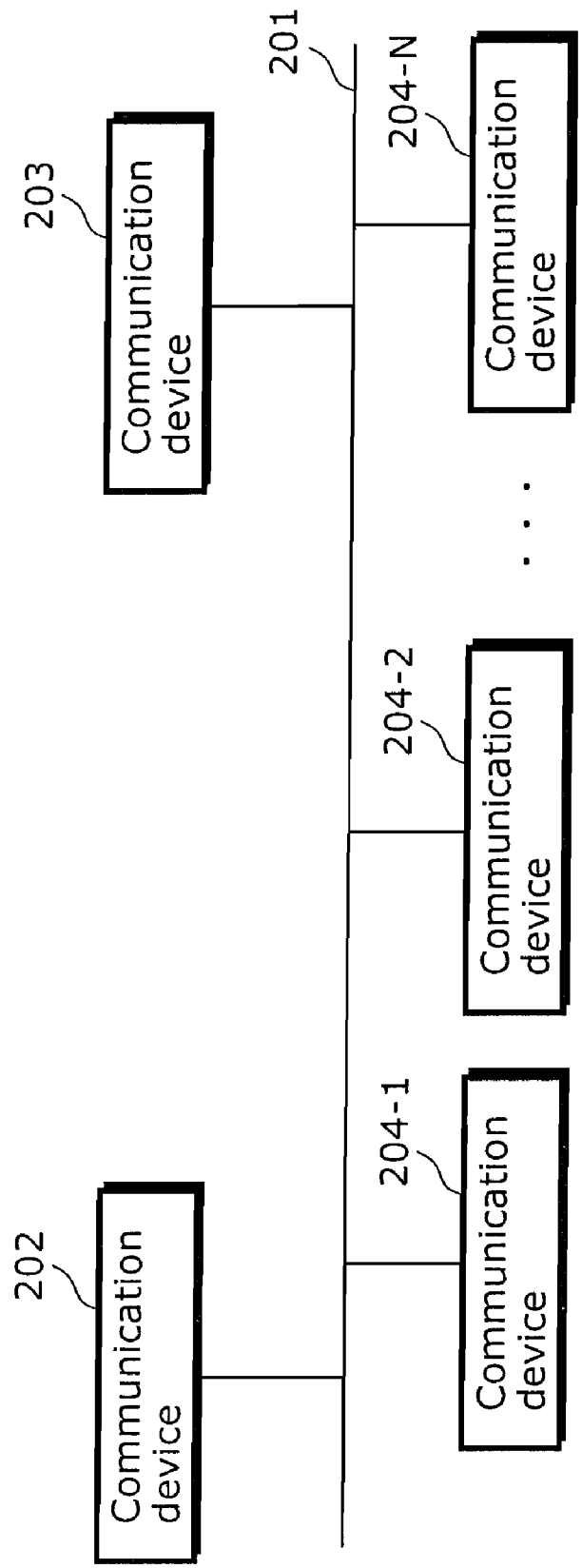
FIG. 2 is a diagram showing a network configuration in a conventional mode.
Figure 3:
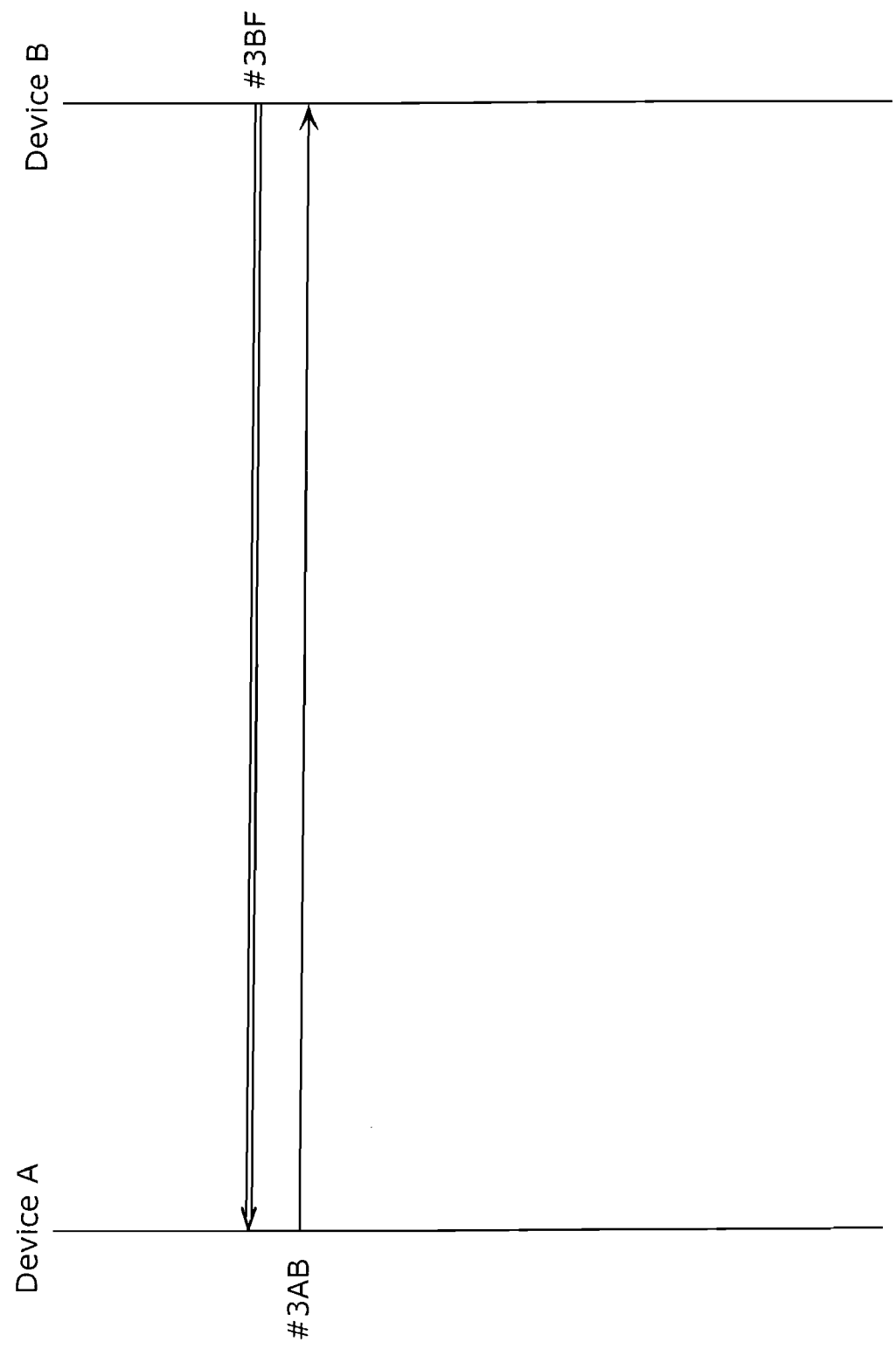
FIG. 3 is a diagram showing a sequence of duplication detection of a communication device in a conventional mode.
Figure 4:
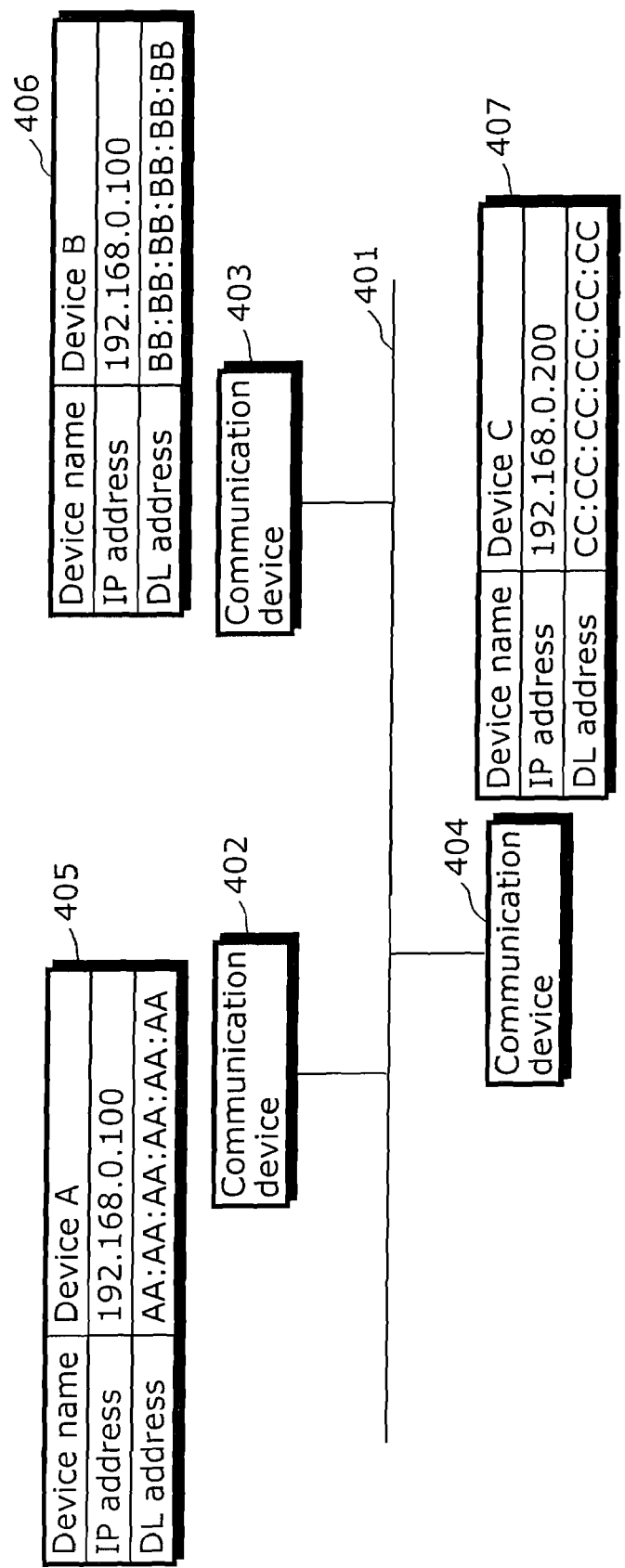
FIG. 4 is a diagram showing a network configuration in a conventional mode.
Figure 6:
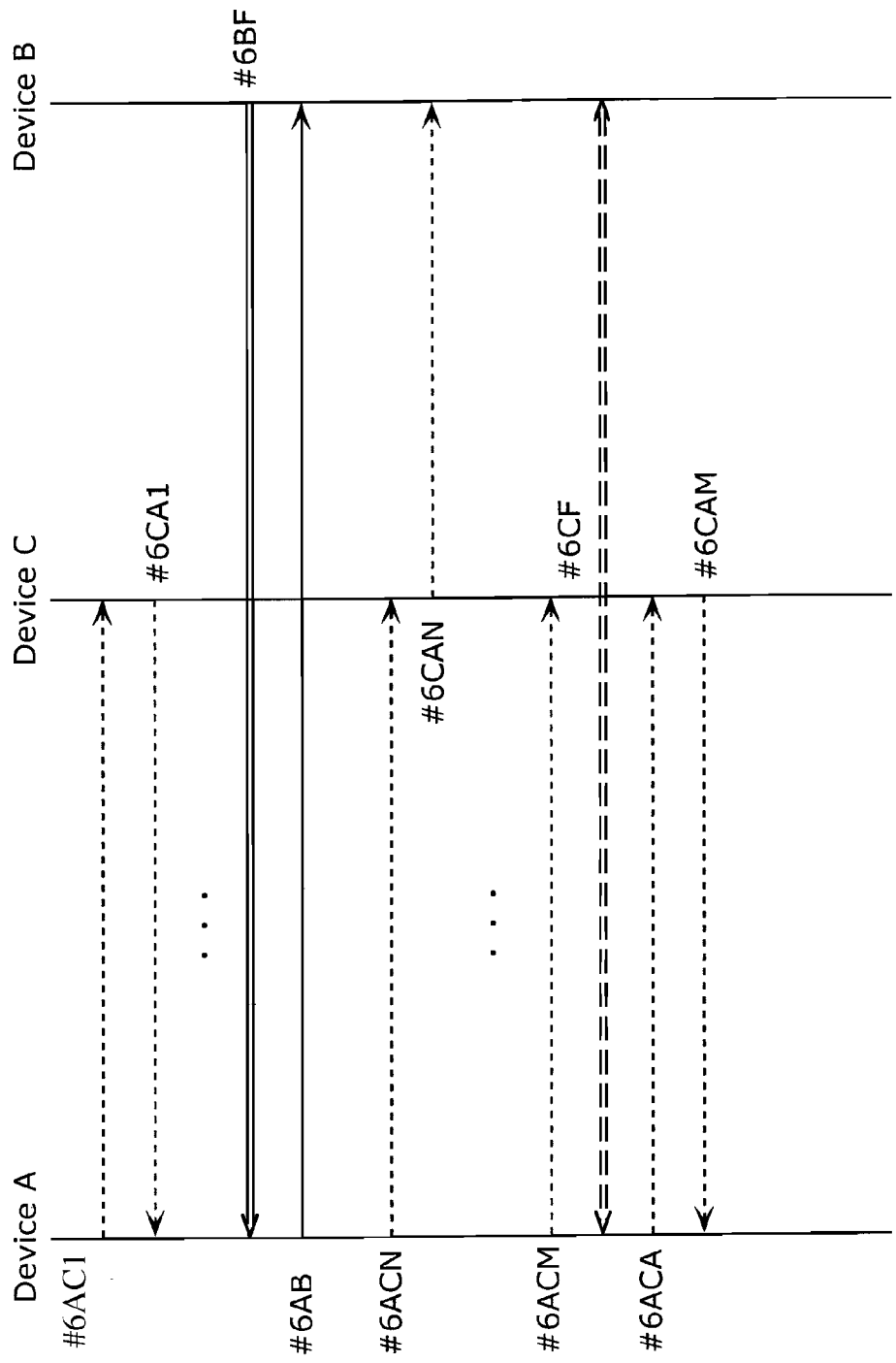
FIG. 6 is a diagram showing a sequence of a communication device in a conventional mode.
Figure 7:
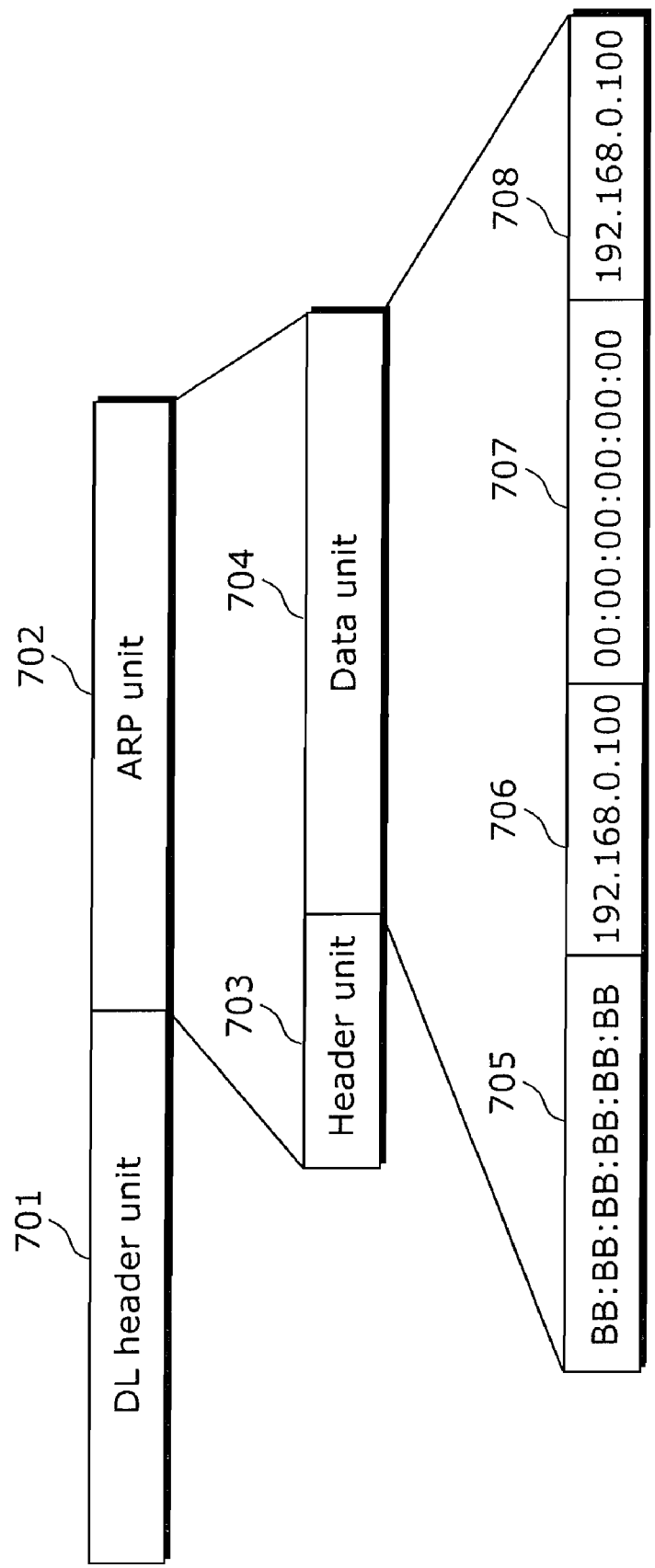
FIG. 7 is a diagram showing a format of a GARP packet in a conventional mode.
Figure 9:
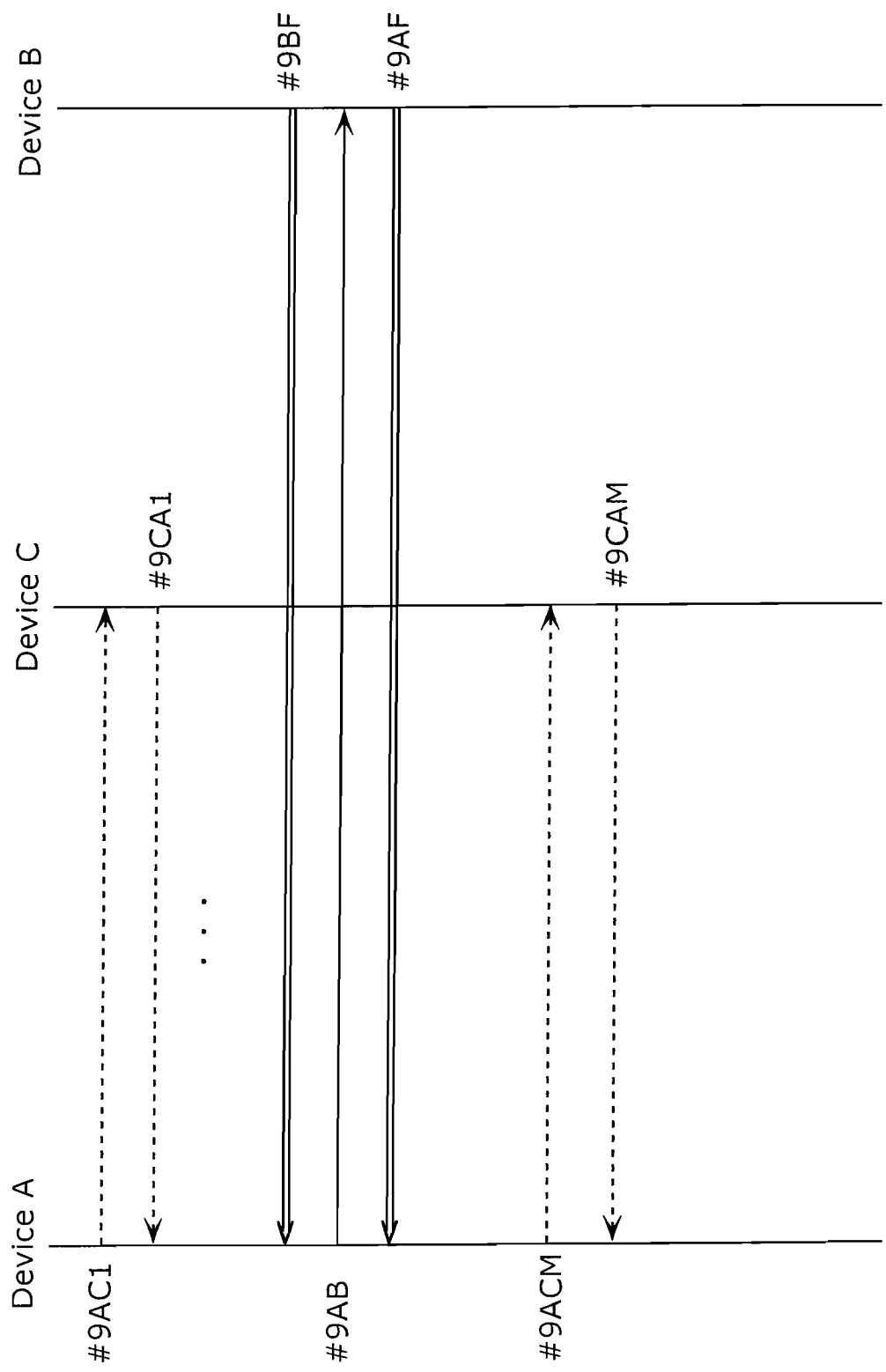
FIG. 9 is a diagram showing a sequence in a case that a Windows (registered trademark) OS operates in a communication device in a conventional mode.

101 DL header part
102 ARP unit
103 Header part
104 Data part
105 Transmitting source DL address
106 Transmitting source IP address
107 Destination DL address
108 Destination IP address
201 Network
202 Communication device
203 Communication device
204-1, 204-2, . . . , 204-N Communication device
401 Network
402 Communication device
403 Communication device
404 Communication device
405 Setting condition of communication device 402
406 Setting condition of communication device 403
407 Setting condition of communication device 404
701 DL header part 702 ARP unit
703 Header part
704 Data part
705 Transmitting source DL address
706 Transmitting source IP address
707 Destination DL address
708 Destination IP address
1001 Network
1002 Communication device
1003 Communication device
1004 Communication device
1005 Setting condition of communication device 1002
1006 Setting condition of communication device 1003
1007 Setting condition of communication device 1004
1101 Communication device
1102 Communication unit
1103 Processing unit
1104 Storage unit
1105 Network
1201 Interface processing unit
1202 Network layer protocol processing unit
1203 ARP processing unit
1204 Transport layer protocol processing unit
1205 Application layer processing unit
1301 ARP processing unit
1302 Address administration unit
1303 Duplication detecting unit
1304 ARP receiving unit
1305 Update GARP generating unit
1306 Duplication notification generating unit
1307 ARP transmitting unit
130A Receiving flow from interface processing unit
130B Transmission flow to interface processing unit
1801 ARP processing unit
1802 Address administration unit
1803 Duplication detecting unit
1804 ARP receiving unit
1805 Update GARP generating unit
1806 Duplication notification generating unit
1807 ARP transmitting unit
180A Receiving flow from interface processing unit
180B Transmission flow to interface processing unit
1901 ARP processing unit
1902 Address administration unit
1903 Duplication detecting unit
1904 ARP receiving unit
1905 Update GARP generating unit
1906 Duplication notification generating unit
1907 ARP transmitting unit
1908 Update GARP delaying unit
190A Receiving flow from interface processing unit
190B Transmission flow to interface processing unit
2401 Network
2402 Communication device
2403 Communication device
2404 Communication device
2405 Communication device
2406 Setting condition of communication device 2402
2407 Setting condition of communication device 2403
2408 Setting condition of communication device 2404
2409 Setting condition of communication device 2405
2501 ARP processing unit
2502 Address administration unit
2503 Duplication detecting unit
2504 ARP receiving unit
2505 Update GARP generating unit
2506 Duplication notification generating unit
2507 ARP transmitting unit
2508 Update GARP delaying unit
2510 Duplication notifying unit
2512 Duplication monitoring unit
250A Receiving flow from interface processing unit
250B Transmission flow to interface processing unit
S3301 Initial state
S3302 Address setting state
S3303 Update GARP transmission delay state
S3304 Address duplication state
330A State transition from initial state to address setting state
330B State transition from address setting state to update GARP transmission delay state
330C State transition from address setting state to initial state
330D State transition from address setting state to address duplication state
330E State transition from update GARP transmission delay state to update GARP transmission delay state
330F State transition from update GARP transmission delay state to address setting state
330G State transition from update GARP transmission delay state to initial state
330H State transition from update GARP transmission delay state to address duplication state
330I State transition from address duplication state to initial state
3601 ARP processing unit
3602 Address administration unit
3603 Duplication detecting unit
3604 ARP receiving unit
3605 Duplication notification generating unit
3606 ARP reply generating unit
3607 ARP transmitting unit
3608 ARP information administration unit
3609 ARP request generating unit
360A Receiving flow from interface processing unit
360B Transmission flow to interface processing unit
4401 ARP processing unit
4402 Address administration unit
4403 Duplication detecting unit
4404 ARP receiving unit
4405 Duplication notification generating unit
4406 ARP reply generating unit
4407 ARP transmitting unit
4410 Duplication notifying unit
4412 Duplication monitoring unit
440A Receiving flow from interface processing unit
440B Transmission flow to interface processing unit
5001 DL header part
5002 ARP unit
5003 Header part in ARP unit
5004 Data part in ARP unit
5005 Transmitting source DL address
5006 Transmitting source IP address
5007 Destination DL address
5008 Destination IP address
5009 Destination DL address
5010 Transmitting source DL address
5011 NW protocol type
5101 ARP processing unit
5102 Address administration unit
5103 Duplication detecting unit
5104 ARP receiving unit
5105 Update GARP generating unit
5106 Duplication notification generating unit 5107 ARP transmitting unit
5108 Address duplication searching unit
5109 GARP generating unit
5110 Restoration GARP generating unit
510A Receiving flow from interface processing unit
510B Transmission flow to interface processing unit
5111 Duplication monitoring unit
5201 ARP processing unit
5202 Address administration unit
5203 Duplication detecting unit
5204 ARP receiving unit
5205 Update GARP generating unit
5206 Duplication notification generating unit
5207 ARP transmitting unit
5208 Address duplication searching unit
5209 GARP generating unit
5210 Restoration GARP generating unit
5211 Restoration GARP delaying unit
520A Receiving flow from interface processing unit
520B Transmission flow to interface processing unit
6101 Network
6102 Communication device
6103 Communication device
6104 Communication device
6105 Setting condition of communication device 6102
6106 Setting condition of communication device 6103
6107 Setting condition of communication device 6104
6201 ARP processing unit
6202 Address administration unit
6203 Duplication detecting unit
6204 ARP receiving unit
6205 Update GARP generating unit
6206 Duplication notification generating unit
6207 ARP transmitting unit
6208 Address duplication searching unit
6209 GARP generating unit
6210 ARP search generating unit
620A Receiving flow from interface processing unit
62CB Transmission flow to interface processing unit
6501 L2 switch
6502 Communication device
6503 Communication device
6504 Communication device
6505 Communication device
6506 Setting condition of communication device 6502
6507 Setting condition of communication device 6503
6508 Setting condition of communication device 6504
6509 Setting condition of communication device 6505
7101 DL header part
7102 ARP unit
7103 Header part
7104 Data part
7105 Transmitting source DL address
7106 Transmitting source IP address
7107 Destination DL address
7108 Destination IP address
7109 Destination DL address
7110 Transmitting source DL address
7111 NW protocol type

DETAILED DESCRIPTION OF THE INVENTION

First Embodiment

The first embodiment of the present invention is described below with reference to the drawings.

<Outline>

A communication device in the present embodiment has the features of the following (C1) to (C3).

(C1) A communication device that manages network layer addresses and data link layer addresses in association with each other, the communication device comprising: an ARP receiving unit that receives an ARP packet transmitted by Address Resolution Protocol (ARP); a duplication detecting unit that detects a Gratuitous ARP (GARP) packet in which a network layer address of a transmitting source matches a network layer address of the present communication device, from among ARP packets received by the ARP receiving unit; a duplication notification generating unit that generates an ARP reply packet notifying the transmitting source that the network layer address is duplicated, when the GARP packet is detected by the duplication detecting unit; an update GARP generating unit that generates an update GARP packet in which the network layer address and the data link layer address of the present communication device are set up, when the GARP packet is detected by the duplication detecting unit; and an ARP transmitting unit that transmits by ARP the ARP reply packet generated by the duplication notification generating unit and transmits by GARP the update GARP packet generated by the update GARP generating unit.

(C2) When the GARP packet is detected by the duplication detecting unit, the update GARP generating unit immediately generates an update GARP packet and transfers it to the ARP transmitting unit.

(C3) When a duplication detection notification notifying that the network layer address is duplicated is accepted from the duplication detecting unit, the duplication notification generating unit generates an ARP reply packet and transfers it to the ARP transmitting unit. When the duplication detection notification is accepted from the duplication detecting unit, the update GARP generating unit generates an update GARP packet and transfers it to the ARP transmitting unit. When GARP packets are successively detected from among ARP packets received by the ARP receiving unit, the duplication detecting unit limits the number of times per time unit of transferring the duplication detection notification to the duplication notification generating unit and the update GARP generating unit.

Here, the features of the following (C8) and (C9) may be provided.

(C8) The duplication detecting unit: has a GARP counter for counting GARP packets, holds the last GARP packet which is a GARP packet received most recently by the ARP receiving unit; increments the GARP counter when the last GARP packet matches a GARP packet received by the ARP receiving unit; clears the GARP counter when they do not match each other; and stops to transfer the duplication detection notification to the duplication notification generating unit and the update GARP generating unit, when the GARP counter exceeds the predetermined number as long as the last GARP packet matches a GARP packet received by the ARP receiving unit.

(C9) The update GARP generating unit generates a plurality of update GARP packets and transfers the plurality of update GARP packets to the ARP transmitting unit.

On the basis of the above-mentioned points, the communication device in the present embodiment is described is below.

<Network Configuration>

Figure 10:
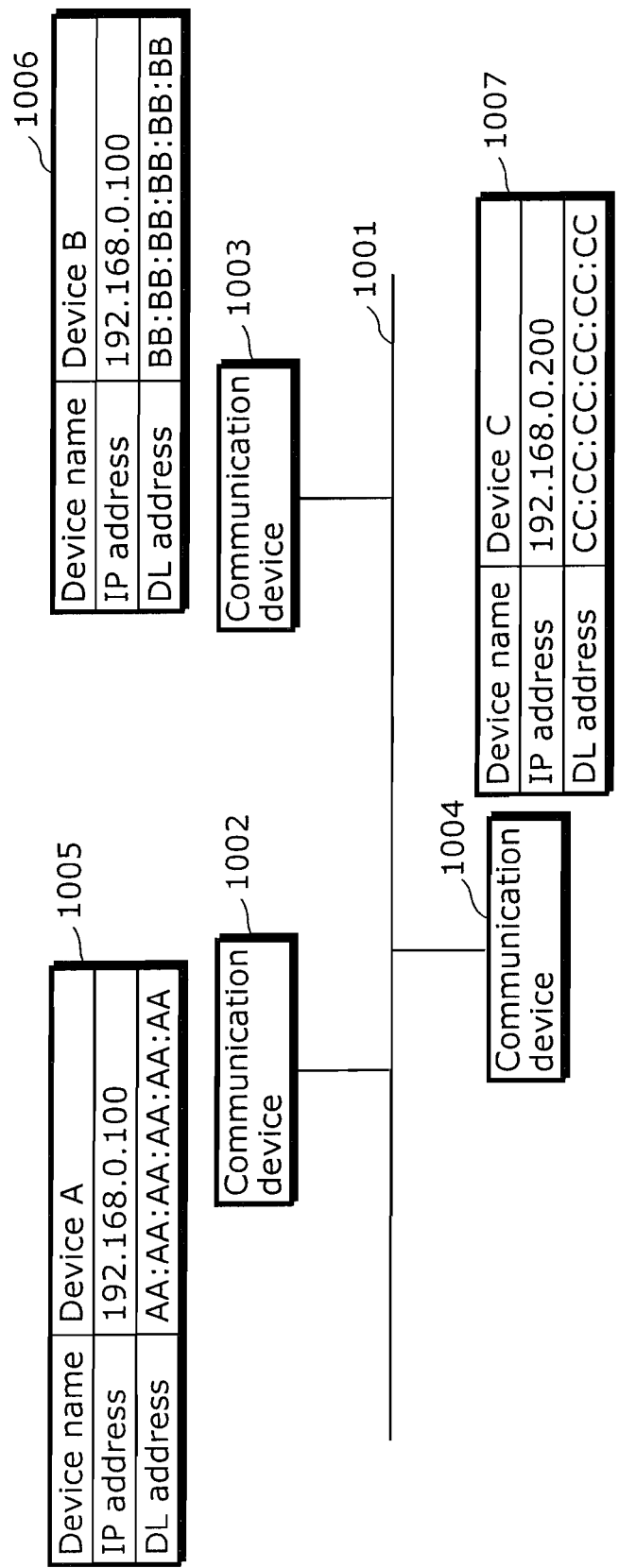
FIG. 10 is a diagram showing a network configuration and an example setting for a communication device according to the first embodiment of the present invention.

FIG. 10 is a diagram showing a network configuration and an example setting of a communication device in the present embodiment. As shown in FIG. 10, a communication device 1002 (referred to as a device A1002, hereinafter), a communication device 1003 (referred to as a device B1003, hereinafter) and a communication device 1004 (referred to as a device C1004, hereinafter) are connected to the network 1001. Note that, for simplicity of description, the present embodiment is described for the case that the three communication devices are connected to the network 1001. However, even when a plurality of communication devices each corresponding to the device B1003 and communication devices each corresponding to the device C1004 are present, the operation is similar.

The device A1002, the device B1003 and the device C1004 are devices having a communication function for connecting by cable or wireless, and may be, for example, devices provided with an Ethernet (registered trademark) interface, PCs, or home electronic appliance devices capable of network communication. The network 1001 is a LAN which is a network employing cable or wireless.

The device A1002 has the function of a communication device in the present embodiment, and holds a data link layer address (referred to as a DL address, hereinafter) "AA:AA:AA:AA:AA:AA". Then, a network layer address (referred to as an IP address, hereinafter) "192.168.0.100" is set for the data link layer address "AA:AA:AA:AA:AA:AA".

The device B1003 holds a DL address "BB:BB:BB:BB:BB:BB". Then, an IP address "192.168.0.100" which overlaps the device A is to be set for the DL address "BB:BB:BB:BB:BB:BB". Note that the device has the function of performing duplication detection using GARP before setting the IP address. Here, the device B1003 also may have the function of a communication device in the present embodiment.

The device C1004 holds a DL address "CC:CC:CC:CC:CC:CC". Then, an IP address "192.168.0.200" is set for the DL address "CC:CC:CC:CC:CC:CC". Then, the device C1004 communicates with the device A1002. Note that the device C1004 also may have the function of a communication device in the present embodiment.

<Configuration of Communication Device>

Figure 11:
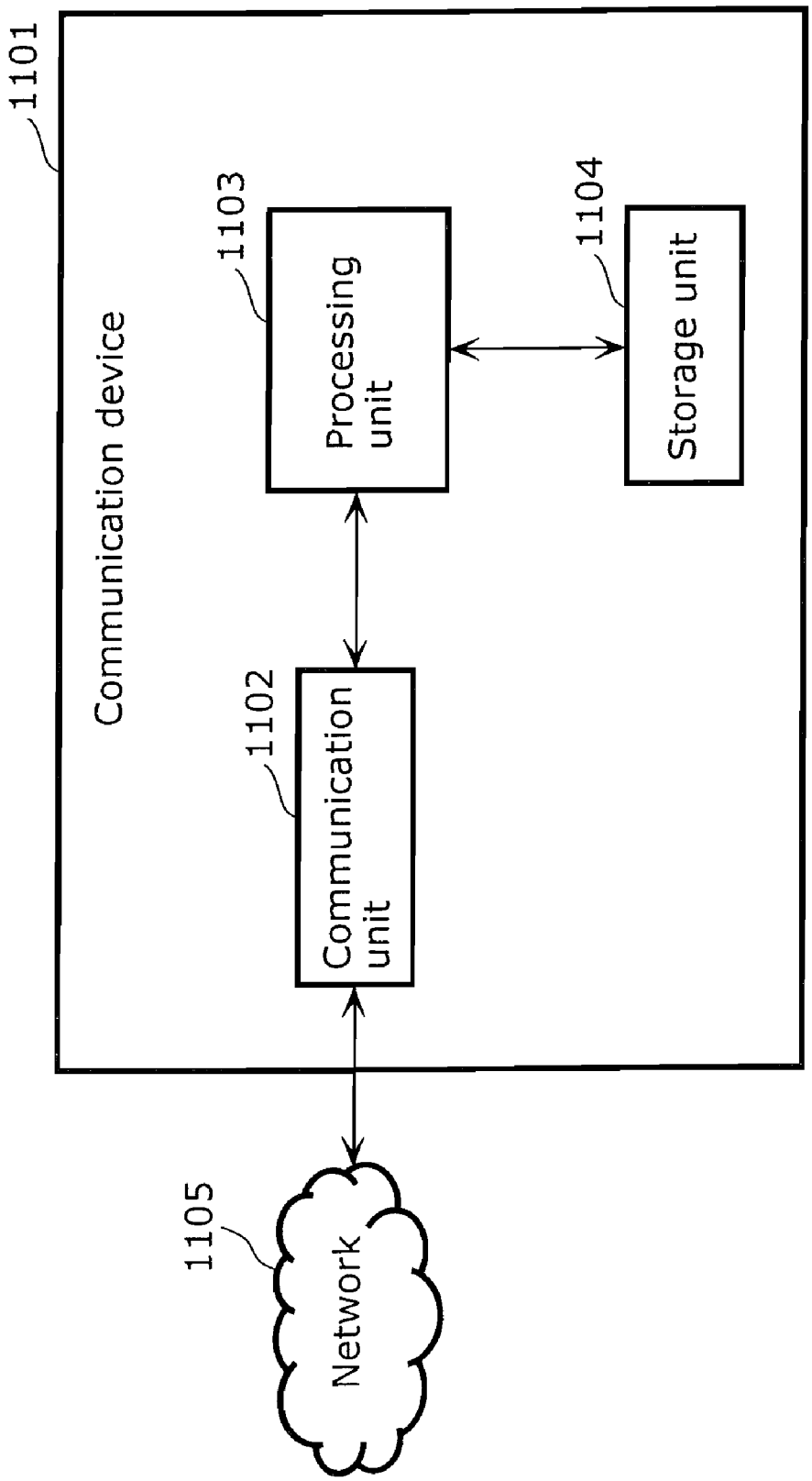
FIG. 11 is a diagram showing functional blocks of a communication device according to the first embodiment of the present invention.

FIG. 11 is a configuration diagram showing an exemplary configuration of a communication device according to the present invention. The communication device 1101 includes a communication unit 1102, a processing unit 1103 and a storage unit 1104. Detailed description for these is given below.

(a) Communication Unit 1102

The communication unit 1102 is hardware connected to the system bus, and has the functions of transmitting to a network 1105 (network 1001 in FIG. 10) a packet transferred from the processing unit 1103 and of transferring to the processing unit 1103 a packet received from the network 1105.

(b) Processing Unit 1103

The processing unit 1103 has the function of moving to the storage unit 1104 the data transferred from the communication unit 1102 and the function of moving to the communication unit 1102 the data stored in the storage unit 1104. Further, the processing unit 1103 performs data analysis processing, transmission data generation processing and the like on the data stored in the storage unit 1104.

(c) Storage Unit 1104

The storage unit 1104 has the function of holding data. Note that in data transfer from the storage unit 1104 to the communication unit 1102 and from the storage unit 1104 to the communication unit 1102, a DMA controller may be provided separately so that the data may be moved by the DMA controller in place of the processing unit 1103.

<Function Configuration>

Figure 12:
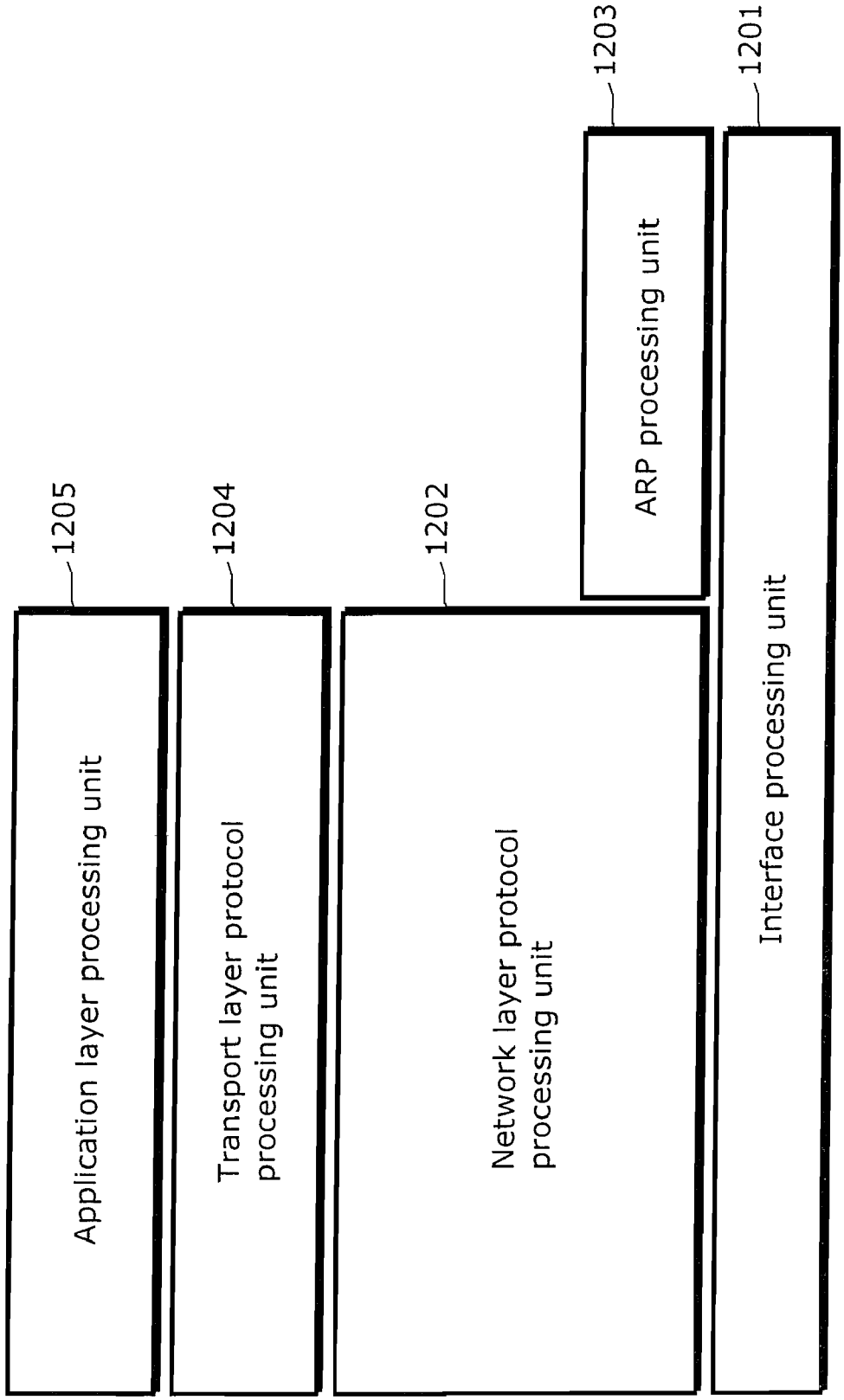
FIG. 12 is a diagram showing a configuration of a protocol stack function of a communication device according to the first embodiment of the present invention.

FIG. 12 is a function configuration diagram showing an exemplary function configuration of a communication device according to the present invention. Each function is described below.

(a) Interface Processing Unit 1201

The interface processing unit 1201 has the function of performing analysis processing for the data link layer protocol on a packet received by the communication unit 1102 so as to determine the network layer protocol and of transferring the received packet to the ARP processing unit 1203 in the case of an ARP packet and to the network layer protocol processing unit 1202 in the case of other protocols. Further, the interface processing unit 1201 has the function of performing header generation processing for the data link layer protocol on a transmission packet generated by the ARP processing unit 1203 and the network layer protocol processing unit 1202, and then performing transmission processing. This transmission packet is transmitted to the network 1105 via the communication unit 1102.

(b) Network Layer Protocol Processing Unit 1202

The network layer protocol processing unit 1202 has the function of performing network layer protocol header analysis processing on the receiving packet transferred from the interface processing unit 1201, and transferring it to the transport layer protocol processing unit 1204. Further, the network layer protocol processing unit 1202 has the function of performing network layer protocol header generation processing on the transmission packet transferred from the transport layer protocol processing unit 1204, and transferring it to the interface processing unit 1201.

(c) ARP Processing Unit 1203

The ARP processing unit 1203 has the function of performing analysis processing on the ARP packet transferred from the interface processing unit 1201 and performing processing in accordance with the analyzed contents. Further, the ARP processing unit 1203 has the function of generating an ARP packet and transferring it to the interface processing unit 1201.

(d) Transport Layer Protocol Processing Unit 1204

The transport layer protocol processing unit 1204 has the function of performing transport layer protocol header analysis processing on the receiving packet transferred from the network layer protocol processing unit 1202, and transferring it to the application layer protocol processing unit 1205. Further, the transport layer protocol processing unit 1204 has the function of performing transport layer protocol header generation processing on the transmission data transferred from the application layer protocol processing unit 1205, and transferring it to the network layer protocol processing unit 1202.

(e) Application Layer Processing Unit 1205

The application layer processing unit 1205 has the function of accepting receiving data transferred from the transport layer protocol processing unit 1204. Further, the application layer processing unit 1205 has the function of transferring transmission data to the transport layer protocol processing unit 1204. Here, the function of performing address duplication detection before setting the IP address may be provided.

<Detailed Function Configuration>

Figure 13:
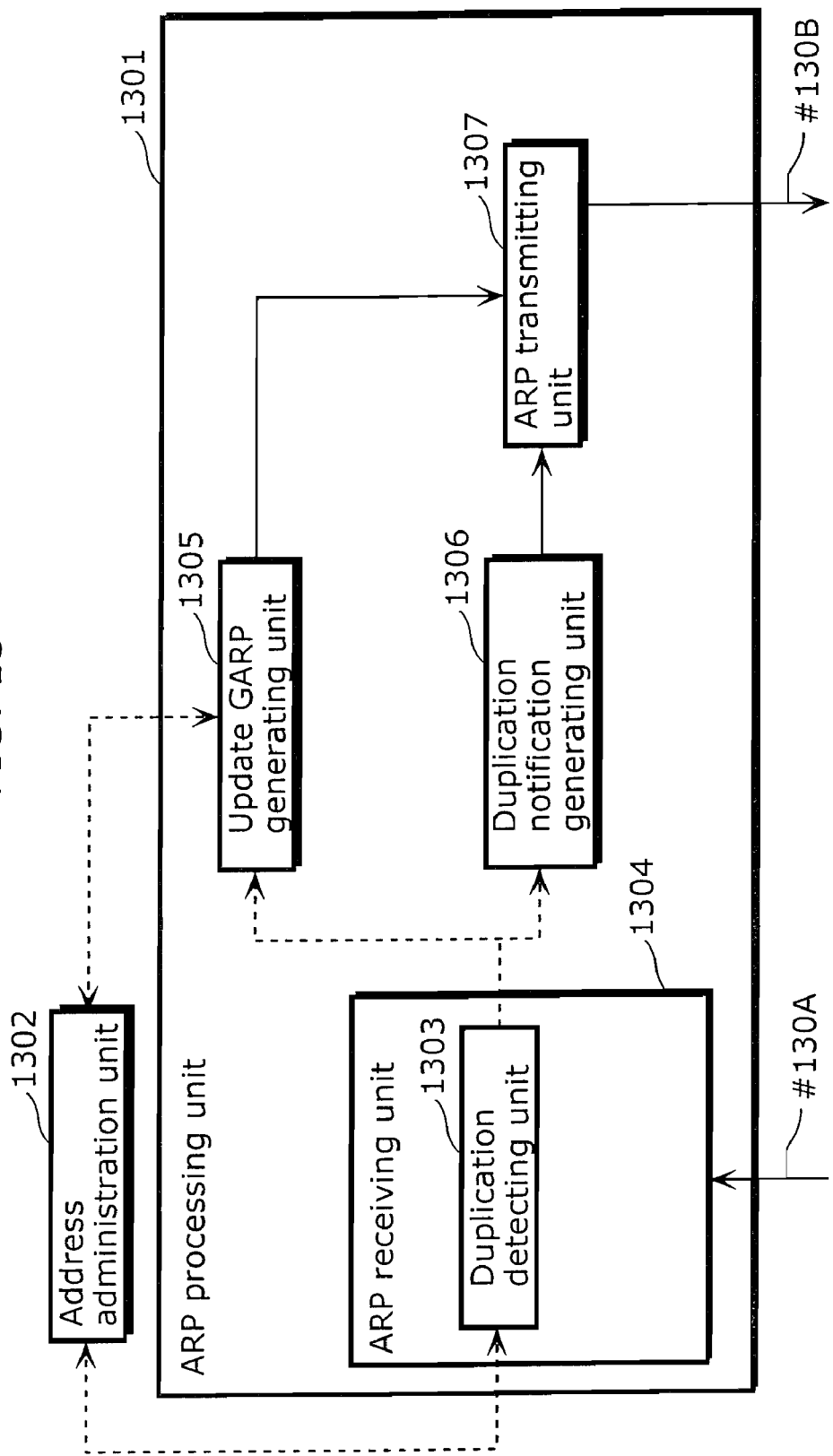
FIG. 13 is a diagram showing an exemplary function configuration of an ARP processing unit of a communication device according to the first embodiment of the present invention.

FIG. 13 is a diagram showing an exemplary function configuration of an ARP processing unit and an address administration unit of a communication device according to the present embodiment. Note that among the arrows in the figure, a dash-dotted line indicates a control information flow, while a solid line indicates a packet flow.

The ARP processing unit 1301 corresponds to the ARP processing unit 1203 of FIG. 12 and, in this example, includes a duplication detecting unit 1303, an ARP receiving unit 1304, an update GARP generating unit 1305, a duplication notification generating unit 1306 and an ARP transmitting unit 1307.

(a) Address Administration Unit 1302

The address administration unit 1302 manages the IP address and the DL address which are set for the device A1002. Note that the addresses to be managed may be data in the storage unit 1104, information managed by the network layer protocol processing unit 1202, or information managed by the interface layer processing unit 1201. Further, as for the DL address, the information may be information recorded in the communication unit 1102.

(b) Duplication Detecting Unit 1303

The duplication detecting unit 1303 issues a duplication detection notification when a Gratuitous ARP packet (abbreviated as a GARP packet, hereinafter) is received in which the IP address of the device A1002 managed by the address administration unit 1302 matches the transmitting source IP address of the receiving ARP packet.

This duplication detection notification is notified to the update GARP generating unit 1305 and the duplication notification generating unit 1306.

In this duplication detection notification, the transmitting source DL address of the GARP packet is included as information. Note that the GARP packet itself may be transferred as the information.

Note that the duplication detecting unit 1303 may have the function to limit the number of times per time unit of duplication detection notification.

Note that the duplication detecting unit 1303 has a GARP counter for counting GARP packets and may have the function of: holding the last GARP packet which is a GARP packet received most recently; incrementing the GARP counter when the last GARP packet matches a GARP packet; clearing the GARP counter when the last GARP packet does not match the GARP packet; and stopping transfer of the duplication detection notification to the duplication notification generating unit and the update GARP generating unit, when the GARP counter exceeds the predetermined number as long as the last GARP packet matches a GARP packet received by the ARP receiving unit.

(c) ARP Receiving Unit 1304

The ARP receiving unit 1304 performs receiving processing and data analysis processing for the ARP packet (#130A) transferred from the interface processing unit 1201.

The duplication detecting unit 1303 is included in the inside of the ARP receiving unit 1304.

(d) Update GARP Generating Unit 1305

The update GARP generating unit 1305 accepts the duplication detection notification from the duplication detecting unit 1303, and generates a Gratuitous ARP packet (referred to as an update GARP packet, hereinafter) in which the IP address and the DL address of the device A1002 managed by the address administration unit 1302 are set up, so as to transfer the Gratuitous ARP packet to the ARP transmitting unit 1307.

Note that the update GARP generating unit 1305 may generate a plurality of update GARP packets in response to one occasion of duplication detection notification. Further, the generated update GARP packets may be transferred to the ARP transmitting unit 1307 at predetermined intervals, or alternatively may be transferred to the ARP transmitting unit 1307 at varying intervals of transfer.

(e) Duplication Notification Generating Unit 1306

When duplication detection is performed with the ARP packet and when it is determined that the address is duplicated with the IP address of the device A1002, the duplication notification generating unit 1306 receives a duplication notification from the duplication detecting unit 1303. The duplication notification generating unit 1306 having received the duplication notification has the function of generating an ARP packet (referred to as a duplication notification ARP packet, hereinafter) notifying that the IP address is duplicated for the transmitting source of the received ARP packet for duplication detection, and of transferring the ARP packet to the ARP transmitting unit 1308.

(f) ARP Transmitting Unit 1307

The ARP transmitting unit 1307 generates a DL header and transfers an ARP packet to the interface processing unit 1201 (#130B).

<Sequence of Duplication Detection Using GARP>

Figure 14:
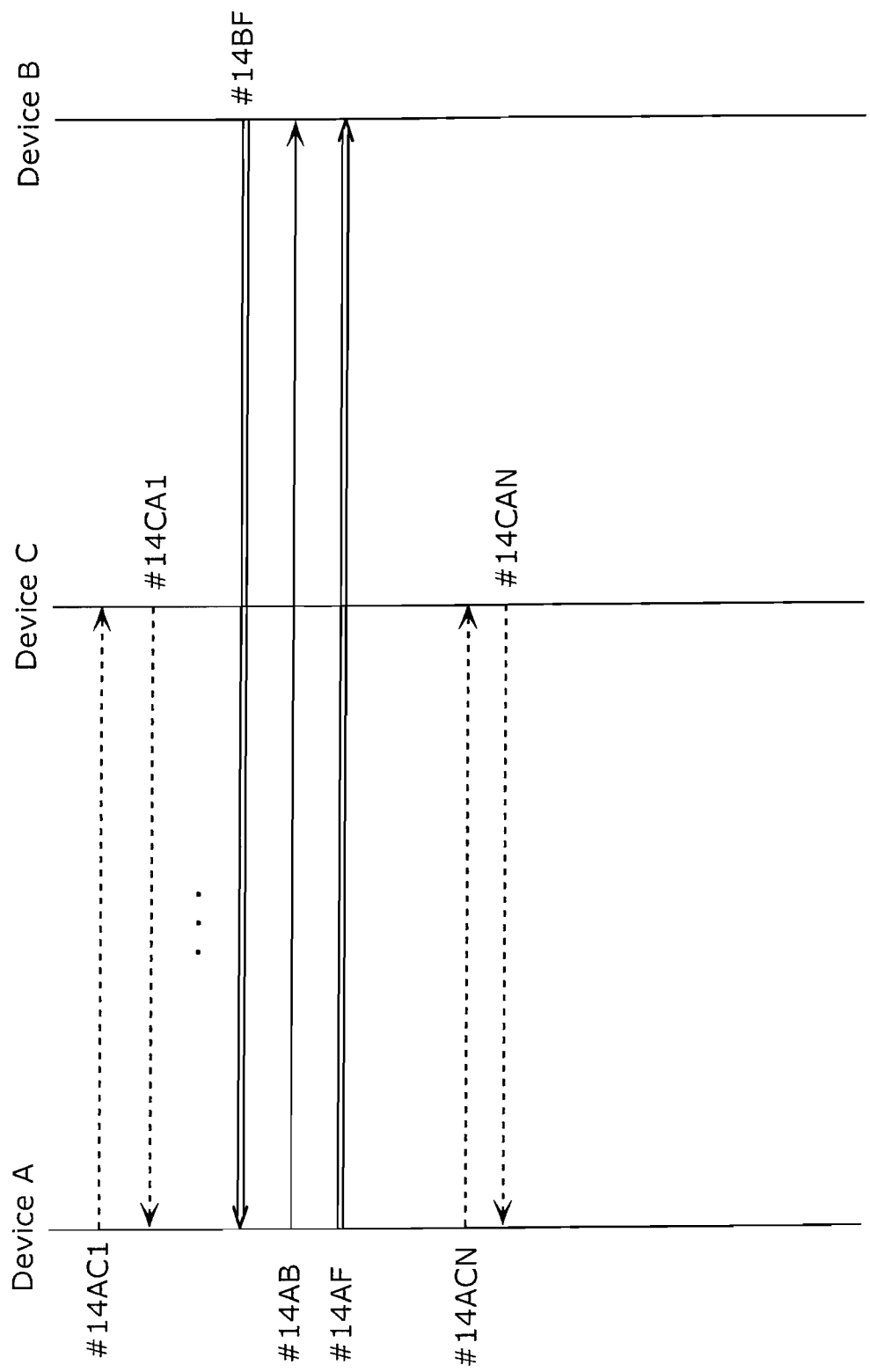
FIG. 14 is a diagram showing a sequence of a communication device according to the first embodiment of the present invention.

FIG. 14 is a diagram showing a sequence of a communication device in the present embodiment. As shown in FIG. 14, when duplication detection using GARP is performed by the device B1003, the following packet exchange is performed by the device A1002, the device B1003 and the device C1004.

(a) Operation Before Duplication Detection

The device A1002 and the device C1004 communicate with each other (#14AC1, #14CA1). At this time, the situation of the ARP table in the device C1004 is as shown in FIG. 15.

Here, the device B1003 is connected to the network 1001 and transmits a GARP packet for duplication detection (#14BF).

(b) Operation of Device C1004

The device C1004 receives the GARP packet (#14BF) broadcasted from the device B1003 to the network 1001. The device C1004 analyzes the contents of the received GARP packet (#14BF) so as to search whether a corresponding entry is present in the ARP table managed by the device C1004. As a result of the search, in the device C1004, the search hits the entry of the device A1002 with which communication has been performed until that time. Thus, the entry is overwritten with the information of the received GARP packet (#14BF). As a result, the ARP table of the device C1004 is overwritten with the GARP packet (#14BF) as shown in FIG. 16.

(c) Operation of Device A1002

The device A1002 receives the GARP packet (#14BF) broadcasted from the device B1003 to the network 1001. The device A1002 detects that the received GARP packet (#14BF) has duplication with the IP address having been set for the device A1002.

When detecting duplication of the IP address, the device A1002 transmits to the device B1003 a duplication notification ARP packet (#14AB) for notifying the duplication of the IP address. Further, the device A1002 broadcasts an update GARP packet (#14AF) to the network 1001.

Note that the present sequence has been described for the case of the order of the duplication notification ARP packet (#14AB) and the update GARP packet (#14AF). However, the order may be changed.

(d) Operation of Device C1004 after Update GARP Transmission from Device A1002

The device C1004 receives the update GARP packet (#14AF) broadcasted from the device A1002 to the network 1001. The device C1004 analyzes the contents of the received update GARP packet (#14AF) so as to search whether or not a corresponding entry is present in the ARP table managed by the device C1004. As a result of the search, in the device C1004, the search hits the entry of the device A1002 overwritten with the GARP packet (#14BF) for duplication detection of the device B1003. As a result, the ARP table of the device C1004 is overwritten with the GARP packet (#14AF) as shown in FIG. 17.

(e) Operation after Duplication Detection

As a result of the above-mentioned sequence, the ARP table of the device C1004 returns to the state that is prior to the duplication detection of the device B1003. Thus, the device A1002 and the device C1004 enter a state in which mutual communication is available (#14ACN, #14CAN) similarly to the state prior to the duplication detection.

<Processing Flow in Device A1002>

The processing flow is described further in detail with reference to FIGS. 13 and 14.

(a) GARP Packet Receiving Processing (#14BF)

The device A1002 receives the GARP packet (#14BF) from the device B1003. The received GARP packet (#14BF) is transferred via the interface processing unit 1201 to the ARP receiving unit 1304 (#130A).

The duplication detecting unit 1303 in the ARP receiving unit 1304 issues a duplication detection notification on the basis of the received GARP packet (#14BF).

(b) Transmission Processing for Update GARP Packet (#14AF) and Duplication Notification ARP Packet (#14AB)

The update GARP generating unit 1305 accepts the duplication detection notification from the duplication detecting unit 1303, and generates an update GARP packet (#14AF) so as to transfer it to the ARP transmitting unit 1307.

The duplication notification generating unit 1306 accepts the duplication detection notification from the duplication detecting unit 1303, and generates a duplication notification ARP packet (#14AB) for the device B1003 so as to transfer it to the ARP transmitting unit 1307.

The ARP transmitting unit 1307 transfers to the interface processing unit 1201 the update GARP packet (#14AF) and the duplication notification ARP packet (#14AB) which have been received, so as to perform transmission processing (#130B). In the present embodiment, transmission to the network 1001 is performed in the order of the duplication notification ARP packet (#14AB) and the update GARP packet (#14AF). However, the sequence may be reversed.

Figure 18:
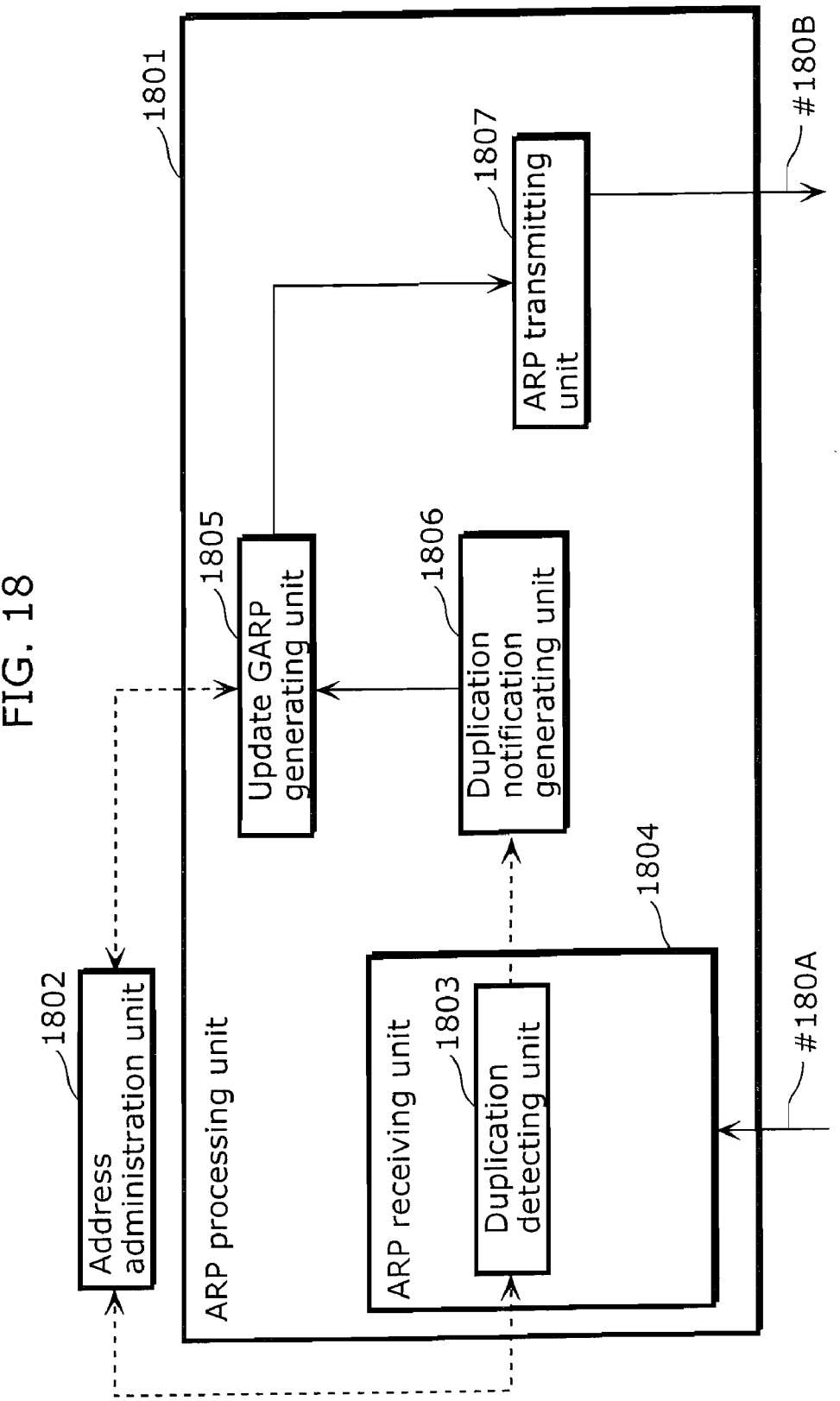
FIG. 18 is a diagram showing a modification of an exemplary function configuration of an ARP processing unit of a communication device according to the first embodiment of the present invention.

Further, the present embodiment has been described for the case that the update GARP generating unit 1305 and the duplication notification generating unit 1306 operate independently. However, as shown in FIG. 18, the duplication notification generating unit 1806 may generate a duplication notification ARP packet (#14AB), and then on the basis of the duplication notification ARP packet (#14AB) information, the update GARP generating unit 1805 may generate an update GARP packet (#14AF). Then, the update GARP generating unit 1805 may transfer the duplication notification ARP packet (#14AB) and the update GARP packet (#14AF) in this order to the ARP transmitting unit 1807, so that the sequence may be controlled. Note that also in FIG. 18, the order of transmission of the duplication notification ARP packet (#14AB) and the update GARP packet (#14AF) may be reversed.

Here, when a series of this processing is performed successively and immediately, the ARP table of the communication device on the network 1001 can be updated immediately.

<Processing in the Case that Device B1003 has Update GARP Transmitting Function>

Figure 76:
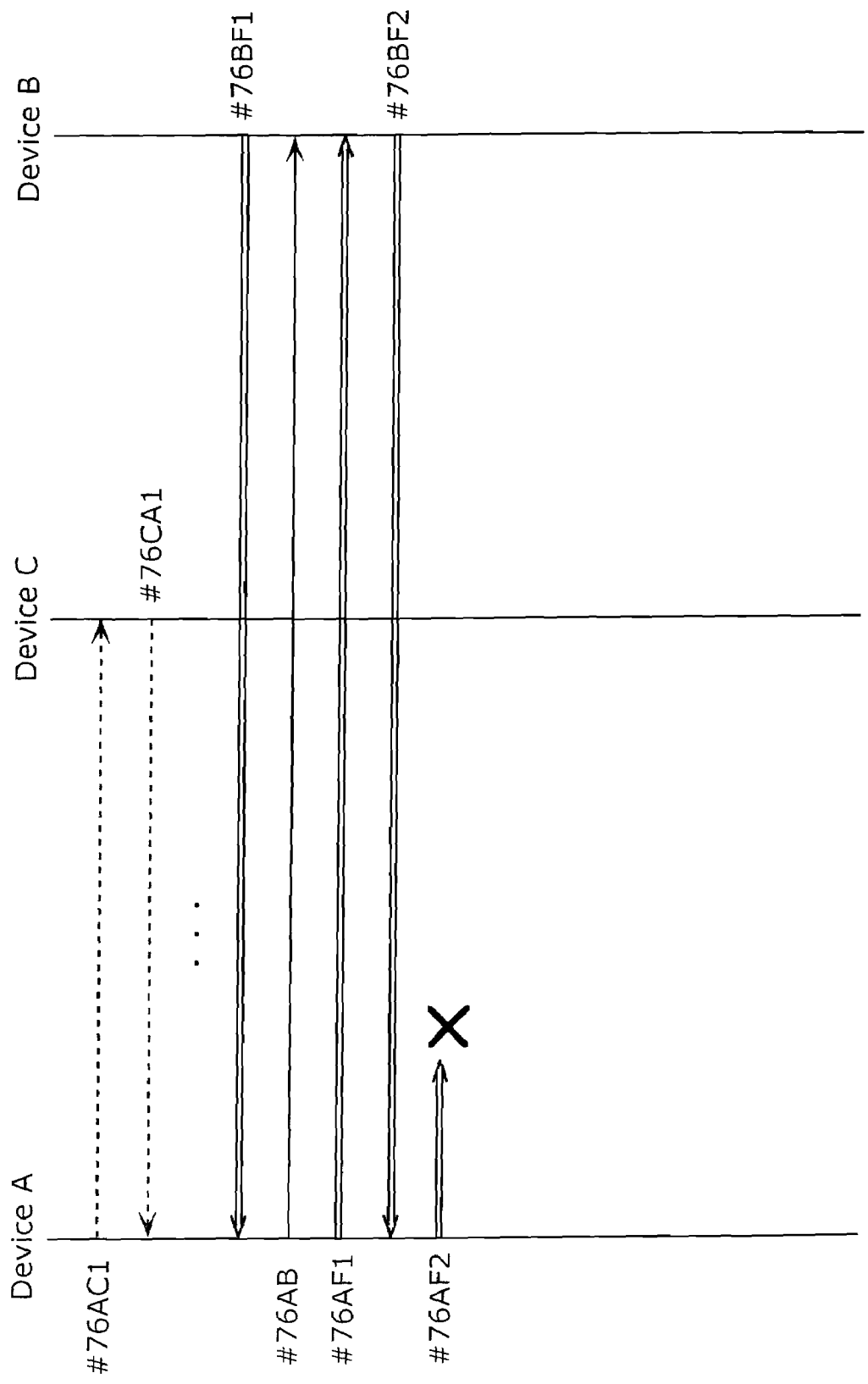
FIG. 76 is a diagram showing a sequence of a communication device according to the first embodiment of the present invention.

An embodiment is described below with reference to FIG. 76 for the case that, when a GARP packet which is duplicated with the IP address of the device B1003 is received, the device B1003 has the update GARP packet transmitting function solely in the present invention.

The sequence is the same as that described above until the step in which the device A1002 receives the GARP packet (#76BF1) transmitted from the device B1003 and transmits an update GARP packet (#76AF1).

Then, after receiving the update GARP packet (#76AF1) transmitted from the device A1002, the device B1003 transmits an update GARP packet (#76BF2) in order to restore the ARP table for the device B1003.

When receiving the update GARP packet (#76BF2) transmitted from the device B1003, the device A1002 detects duplication with the IP address of the device A1002.

However, after the transmission of the update GARP packet (#67AF1) having already been transmitted, a predetermined time X has not yet elapsed. Thus, the device A1002 stops transmission of an additional update GARP packet (#76AF2). Note that the condition for stopping the additional update GARP packet (#76AF2) may be that the time having elapsed since the transmission of the previous update GARP packet (#76AF1) does not reach a predetermined time X or alternatively that the communication device is the same as the transmitting device of the last GARP packet. Further, the combination of these may be adopted.

As described above, in the present embodiment, the device B1003 can restore the rewritten ARP table of the device C1004. This permits restoration of communication with the device A1002 and the device C1004.

Further, when a limit is placed on the amount of traffic of the update GARP packets or alternatively when a limit is placed on continuous transmission of update GARP packets in response to GARP packets from the same communication device, the traffic of the update GARP packets on the network 1001 can be suppressed. For example, when accepting from the duplication detecting unit 1303 a duplication detection notification notifying that the network layer address is duplicated, the duplication notification generating unit 1306 generates an ARP reply packet and transfers it to the ARP transmitting unit 1307. When accepting the duplication detection notification from the duplication detecting unit 1303, the update GARP generating unit 1305 generates an update GARP packet so as to transfer it to the ARP transmitting unit 1307. Then, when GARP packets are successively detected from among the ARP packets received by the ARP receiving unit 1304, the duplication detecting unit 1303 limits a number of times per time unit of transferring the duplication detection notification to the duplication notification generating unit 1306 and the update GARP generating unit 1305.

Further, when a plurality of update GARP packets are generated and transmitted, even an environment in which packet loss easily occurs on the network 1001 can be handled.

Further, even in a case that the device having performed duplication detection has the function of restoring the ARP table using a GARP packet, conflict is avoided between the GARP packets and the update GARP packets.

Second Embodiment

The second embodiment of the present invention is described below with reference to the drawings.

<Outline>

A communication device in the present embodiment has the following feature (C10).

(C10) A communication device that manages network layer addresses and data link layer addresses in association with each other, the communication device comprising: an ARP receiving unit that receives an ARP packet transmitted by Address Resolution Protocol (ARP); a duplication detecting unit that detects a Gratuitous ARP (GARP) packet in which a network layer address of a transmitting source matches a network layer address of the present communication device, from among ARP packets received by the ARP receiving unit; a duplication notification generating unit that generates an ARP reply packet notifying the transmitting source that the network layer address is duplicated, when the GARP packet is detected by the duplication detecting unit; an update GARP generating unit that generates an update GARP packet in which the network layer address and the data link layer address of the present communication device are set up, when the GARP packet is detected by the duplication detecting unit; an update GARP delaying unit that delays, by a predetermined time, transmission of the update GARP packet generated by the update GARP generating unit; and an ARP transmitting unit that transmits by ARP the ARP reply packet generated by the duplication notification generating unit, and transmits by GARP the update GARP packet delayed by the update GARP delaying unit.

On the basis of the above-mentioned points, the communication device in the present embodiment is described below.

<Network Configuration>

The network configuration of the present embodiment is similar to that of the first embodiment. Hence, the description is omitted.

<Configuration of Communication Device>

The configuration of the communication device in the present embodiment is similar to that of the first embodiment. Hence, the description is omitted.

<Function Configuration>

The function configuration of the present embodiment is similar to that of the first embodiment. Hence, the description is omitted.

<Detailed Function Configuration>

Figure 19:
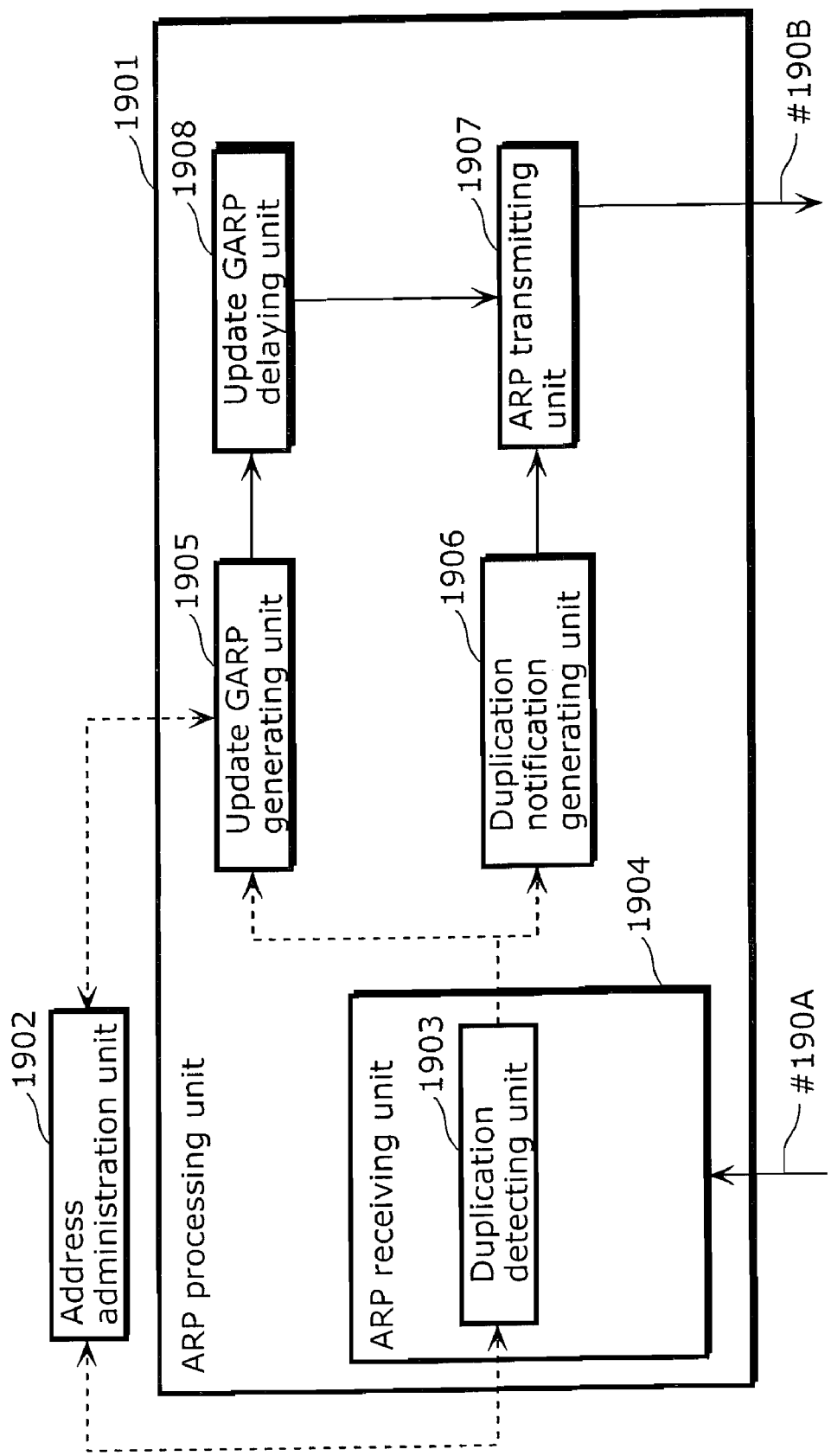
FIG. 19 is a diagram showing an exemplary function configuration of an ARP processing unit of a communication device according to the second embodiment of the present invention.

FIG. 19 is a diagram showing an exemplary function configuration of an ARP processing unit and an address administration unit of a communication device according to the present embodiment. Here, among the arrows in the figure, a dash-dotted line indicates a control information flow, while a solid line indicates a packet flow.

The ARP processing unit 1901 corresponds to the ARP processing unit 1203 of FIG. 12 and, in this example, includes a duplication detecting unit 1903, an ARP receiving unit 1904, an update GARP generating unit 1905, a duplication notification generating unit 1906, an ARP transmitting unit 1907 and an update GARP delaying unit 1908. Here, description is omitted for functions similar to those of the first embodiment.

(a) Address Administration Unit 1902

The address administration unit 1902 of the present embodiment is similar to that of the first embodiment. Hence, the description is omitted.

(b) Duplication Detecting Unit 1903

The duplication detecting unit 1903 of the present embodiment is similar to that of the first embodiment. Hence, the description is omitted.

(c) ARP Receiving Unit 1904

The ARP receiving unit 1904 of the present embodiment is similar to that of the first embodiment. Hence, the description is omitted.

(d) Update GARP Generating Unit 1905

The update GARP generating unit 1905 accepts the duplication detection notification from the duplication detecting unit 1903, and generates a GARP packet in which the IP address and the DL address of the device A1002 managed by the address administration unit 1902 are set up, so as to transfer it to the update ARP delaying unit 1908.

(e) Duplication Notification Generating Unit 1906

The duplication notification generating unit 1906 of the present embodiment is similar to that of the first embodiment. Hence, description is omitted.

(f) ARP Transmitting Unit 1907

Note that the ARP transmitting unit 1907 of the present embodiment is similar to that of the first embodiment. Hence, the description is omitted.

(g) Update GARP Delaying Unit 1908

When accepting an update GARP packet from the update GARP generating unit 1905, the update GARP delaying unit 1908 does not immediately transfer the accepted update GARP packet to the ARP transmitting unit 1907, and holds it until a predetermined time T elapses. When a predetermined time T has elapsed, the accepted update GARP packet is transferred to the ARP transmitting unit 1907. In the following description, the update GARP packet transferred to the ARP transmitting unit 1907 in such a delayed manner is referred to as a delayed update GARP packet in some cases.

<Sequence of Duplication Detection Using GARP>

Figure 20:
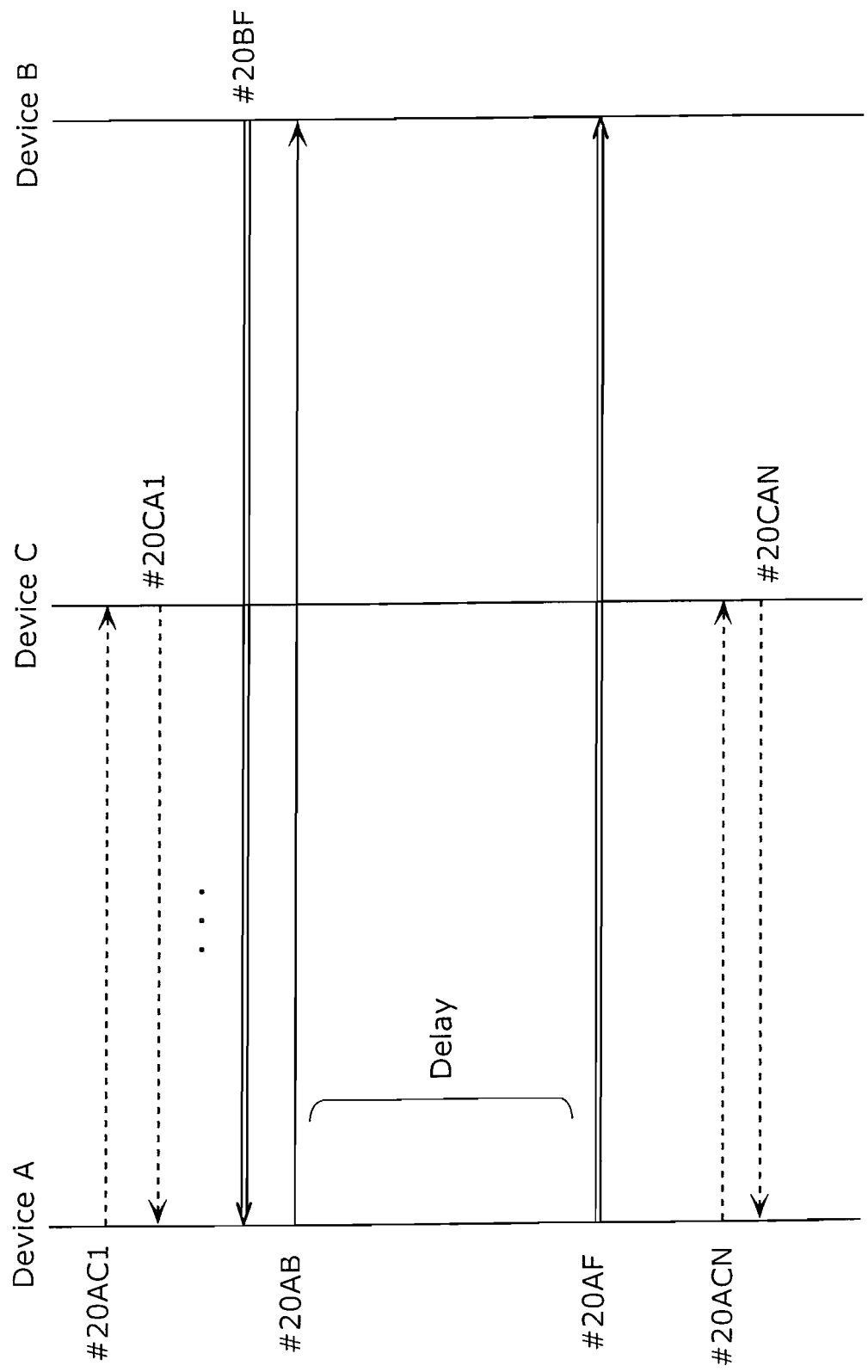
FIG. 20 is a diagram showing a sequence of a communication device according to the second embodiment of the present invention.

FIG. 20 is a diagram showing a sequence of a communication device in the present embodiment. As shown in FIG. 20, when duplication detection using GARP is performed by the device B1003, the following packet exchange is performed by the device A1002, the device B1003 and the device C1004.

(a) Operation Before Duplication Detection

The device A1002 and the device C1004 communicate with each other (#20AC1, #20CA1). At this time, the situation of the ARP table in the device C1004 is as shown in FIG. 21. At this time, in the ARP table in the device C1004, such that the ARP table should be prevented from being rewritten frequently by successive ARP packets generated by a DoS attack or the like, the time until the update is accepted is controlled. In the example of FIG. 21, the entry corresponding to the IP address "192.168.0.100" has been updated sufficiently prior. Thus, the time until the update is accepted is set to be 0 seconds. That is, in the device C1004, when the ARP table needs to be updated concerning that entry, the update is performed immediately.

Here, the device B1003 is connected to the network 1001 and transmits a GARP packet for duplication detection (#20BF).

(b) Operation of Device C1004

The device C1004 receives the GARP packet (#20BF) broadcasted from the device B1003 to the network 1001. The device C1004 analyzes the contents of the received GARP packet (#20BF) so as to search whether a corresponding entry is present in the ARP table managed by the device C1004. As a result of the search, in the device C1004, the search hits the entry of the device A1002 with which communication has been performed until that time. At this time, since the hit entry in the ARP table has been updated sufficiently prior, the update can be performed immediately. Thus, the entry is overwritten with the information of the received GARP packet (#20BF). As a result, the ARP table of the device C1004 is overwritten with the GARP packet (#20BF) as shown in FIG. 22. Further, the time until the update is accepted is initialized and set to be U seconds.

(c) Operation of Device A1002

The device A1002 receives the GARP packet (#20BF) broadcasted from the device B1003 to the network 1001. The device A1002 detects that the received GARP packet (#20BF) has duplication with the IP address having been set for the device A1002.

When detecting duplication of the IP address, the device A1002 transmits to the device B1003 a duplication notification ARP packet (#20AB) for notifying that the IP address is duplicated. Further, the device A1002 delays the update GARP packet (#20AF) by a predetermined time U or longer, and then broadcasts it to the network 1001.

(d) Operation of Device C1004 after Update GARP Transmission from Device A1002

The device C1004 receives the update GARP packet (#20AF) broadcasted from the device A1002 to the network 1001. The device C1004 analyzes the contents of the received GARP packet (#20AF) so as to search whether or not a corresponding entry is present in the ARP table managed by the device C1004. As a result of the search, in the device C1004, the search hits the entry corresponding to the device A1002 overwritten with the GARP packet (#20BF) for duplication detection of the device B1003. At this time, since the device A1002 has transmitted the update GARP packet (#20AF) after a predetermined time U has elapsed, the time until the update is accepted of the device C1004 for the ARP table entry corresponding to the device A1002 is 0 seconds. As a result, the ARP table of the device C1004 is overwritten with the update GARP packet (#20AF) as shown in FIG. 23.

(e) Operation after Duplication Detection

As a result of the above-mentioned sequence, the ARP table of the device C1004 returns to the state that is prior to the duplication detection of the device B1003. Thus, the device A1002 and the device C1004 enter a state in which mutual communication is available (#20ACN, #20CAN) similarly to the state prior to the duplication detection.

<Processing Flow in Device A1002>

The processing flow is described further in detail with reference to FIGS. 19 and 20.

(a) GARP Packet Receiving Processing (#20BF)

Here, GARP packet receiving processing (#20BF) of the present embodiment is similar to that of the first embodiment. Hence, the description is omitted.

(b) Transmission Processing for Update GARP Packet (#20AF) and duplication notification ARP Packet (#20AB)

The update GARP generating unit 1905 accepts the duplication detection notification from the duplication detecting unit 1903, and generates an update GARP packet (#20AF) so as to transfer it to the update ARP delaying unit 1908.

The duplication notification generating unit 1306 accepts the duplication detection notification from the duplication detecting unit 1903, and generates a duplication notification ARP packet (#20AB) for the device B1003 so as to transfer it to the ARP transmitting unit 1907.

The update GARP delaying unit 1908 delays by a predetermined time U the accepted update GARP packet (#20AF), and then transfers it to the ARP transmitting unit 1907.

The ARP transmitting unit 1907 transfers the accepted duplication notification ARP packet (#20AB) to the interface processing unit 1201 so as to perform transmission processing (#130B). Further, the ARP transmitting unit 1907 also transfers the delayed update GARP packet (#20AF) to the interface processing unit 1201 so as to perform transmission processing (#130B).

As described above, in the present embodiment, the device B1003 can restore the ARP table of the device C1004 with a function that the ARP table is not updated for a predetermined time after rewriting. This permits restoration of communication with the device A1002 and the device C1004.

Third Embodiment

The third embodiment of the present invention is described below with reference to the drawings.

<Outline>

A communication device in the present embodiment has the features of the following (C11) to (C7).

(C11) A communication device that manages network layer addresses and data link layer addresses in association with each other, the communication device comprising: an ARP receiving unit that receives an ARP packet transmitted by Address Resolution Protocol (ARP); a duplication detecting unit that detects a Gratuitous ARP (GARP) packet in which a network layer address of a transmitting source matches a network layer address of the present communication device, from among ARP packets received by the ARP receiving unit; a duplication notification generating unit that generates an ARP reply packet notifying the transmitting source that the network layer address is duplicated, when the GARP packet is detected by the duplication detecting unit; an update GARP generating unit that generates a plurality of update GARP packets in which the network layer address and the data link layer address of the present communication device are set up, when the GARP packet is detected by the duplication detecting unit; an update GARP delaying unit that delays, by a predetermined time, at least one of the plurality of update GARP packets generated by the update GARP generating unit; and an ARP transmitting unit that transmits by ARP the ARP reply packet generated by the duplication notification generating unit, and transmits by GARP the update GARP packet delayed by the update GARP delaying unit.

Here, the features of the following (C12) and (C15) may be provided.

(C12) The communication device further includes a duplication notifying unit that transfers to the duplication detecting unit and the update GARP delaying unit an address duplication notification notifying that the network layer address is duplicated, when, after the ARP transmitting unit has transmitted the update GARP packet, the ARP receiving unit receives a duplication notification ARP packet reply packet in which the network layer address of the transmitting source matches the network layer address of the present communication device. When accepting the duplication detection notification from the duplication detecting unit, the duplication notification generating unit generates an ARP reply packet and transfers it to the ARP transmitting unit. When accepting the duplication detection notification from the duplication detecting unit, the update GARP generating unit generates a plurality of the update GARP packets and transfers at least one of them to the GARP delaying unit. When accepting the address duplication notification from the duplication notifying unit, the duplication detecting unit stops to transfer the duplication detection notification to the duplication notification generating unit and the update GARP generating unit. When accepting the address duplication notification from the duplication notifying unit, the update GARP delaying unit stops to delay by a predetermined time the update GARP packet having already been accepted from the update GARP generating unit and transfer it to the ARP transmitting unit.

(C13) The duplication detecting unit transfers to the update GARP generating unit and the update GARP delaying unit a GARP duplication receiving notification notifying that the ARP receiving unit has received a GARP packet in which the network layer address is duplicated with the network layer address of the present communication device, when, during the time that the update GARP delaying unit delays by a predetermined time the update GARP packet accepted from the update GARP generating unit, the ARP receiving unit receives a GARP packet in which the network layer address of the transmitting source matches the network layer address of the present communication device. The update GARP generating unit stops to transfer to the update GARP delaying unit at least one of the generated update GARP packets, when the GARP duplication receiving notification is accepted from the duplication detecting unit. The update GARP delaying unit temporarily stops to transfer to the ARP transmitting unit in a manner delayed by a predetermined time the update GARP packet having already been accepted from the update GARP generating unit and newly delays it by a predetermined time and transfer it to the ARP transmitting unit, when the GARP duplication receiving notification is accepted from the duplication detecting unit.

(C14) The duplication detecting unit further holds as the DL address information the data link layer address of the transmitting source of the GARP packet and transfers the GARP duplication receiving notification to the update GARP generating unit and the update GARP delaying unit only when, during the time that the update GARP delaying unit delays by a predetermined time the update GARP packet accepted from the update GARP generating unit, the ARP receiving unit receives a GARP packet in which the network layer address of the transmitting source matches the network layer address of the present communication device and further the data link layer address of the transmitting source matches the DL address information.

(C15) The duplication detecting unit further stops to transfer the duplication detection notification when, during the time that the update GARP delaying unit delays by a predetermined time the update GARP packet accepted from the update GARP generating unit, the ARP receiving unit receives a duplication ARP packet in which the network layer address of the transmitting source matches the network layer address of the present communication device.

On the basis of the above-mentioned points, the communication device in the present embodiment is described below.

<Network Configuration>

Figure 24:
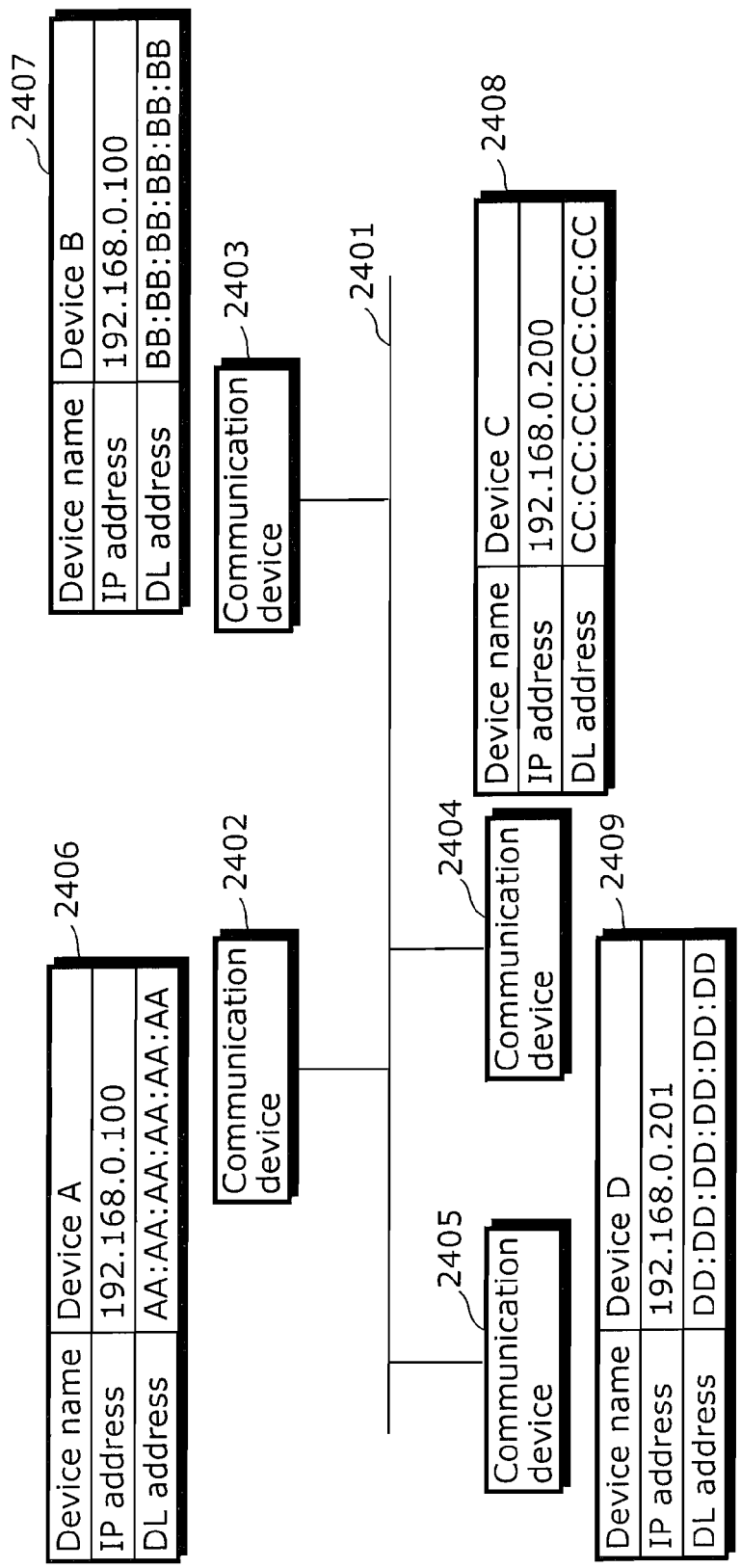
FIG. 24 is a diagram showing a network configuration and an example setting of a communication device according to the third embodiment of the present invention.

FIG. 24 is a diagram showing a network configuration and an example setting of a communication device in the present embodiment. As shown in FIG. 24, a communication device 2402 (referred to as a device A2402, hereinafter), a communication device 2403 (referred to as a device B2403, hereinafter) a communication device 2404 (referred to as a device C2404, hereinafter), and a communication device 2405 (referred to as a device D2405, hereinafter) are connected to the network 2401. Note that for simplicity of description, the present embodiment is described for the case that the four communication devices are connected to the network 2401. However, even when a plurality of communication devices each corresponding to the device B2403, communication devices each corresponding to the device C2404 and communication devices each corresponding to the device D2405 are present, the operation is similar.

The device A2402, the device B2403, the device C2404 and the device D2405 are devices having a communication function of connecting by cable or wireless. They are, for example, devices provided with an Ethernet (registered trademark) interface, like PCs or home electronic appliance devices capable of network communication. The network 2401 is a LAN which is a network employing cable or wireless.

The device A2402 has the function of a communication device in the present embodiment, and holds a DL address "AA:AA:AA:AA:AA:AA". Then, an IP address "192.168.0.100" is set for the device A2402.

The device B2403 holds a DL address "BB:BB:BB:BB:BB:BB". Then, an IP address "192.168.0.100" which overlaps that of the device A is to be set for the device B2403. Further, the device has the function of performing duplication detection using GARP before setting the IP address. Note that the device B2403 also may have the function of a communication device in the present embodiment.

The device C2404 holds a DL address "CC:CC:CC:CC:CC:CC". Then, an IP address "192.168.0.200" is set for the device C2404. Then, the device C2404 communicates with the device A2402. Here, the device C2404 also may have the function of a communication device in the present embodiment.

The device D2405 holds a DL address "DD:DD:DD:DD:DD:DD". Then, an IP address "192.168.0.201" is set for the device D2405. Then, the device D2405 communicates with the device A2402. Here, the device D2405 also may have the function of a communication device in the present embodiment.

<Configuration of Communication Device>

The configuration of the communication device in the present embodiment is similar to that of the first embodiment. Hence, the description is omitted.

<Function Configuration>

The function configuration of the present embodiment is similar to that of the first embodiment. Hence, the description is omitted.

<Detailed Function Configuration>

Figure 25:
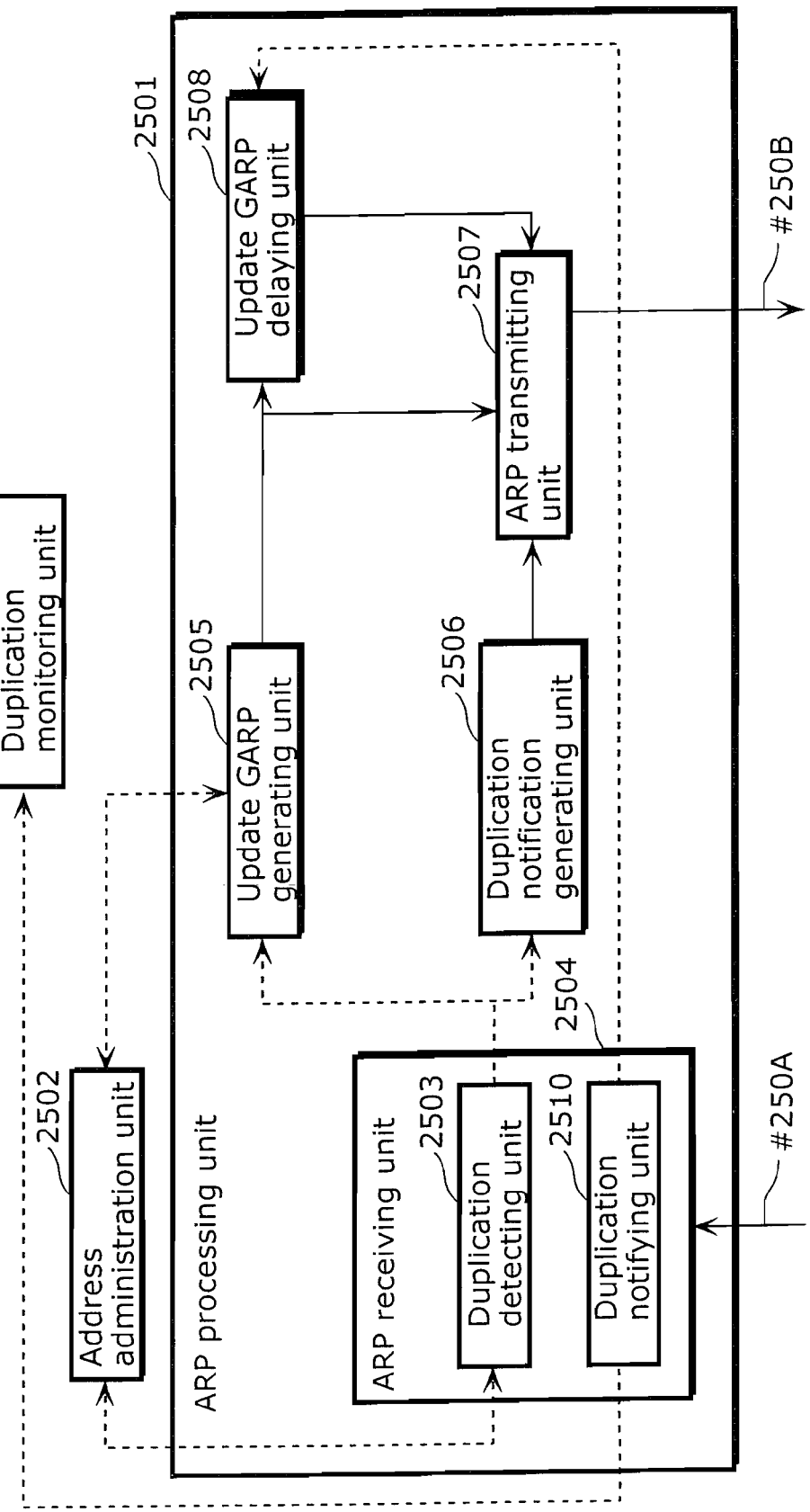
FIG. 25 is a diagram showing an exemplary function configuration of an ARP processing unit of a communication device according to the third embodiment of the present invention.

FIG. 25 is a diagram showing an exemplary function configuration of an ARP processing unit, an address administration unit and a duplication monitoring unit of a communication device according to the present embodiment. Note that among the arrows in the figure, a dash-dotted line indicates a control information flow, while a solid line indicates a packet flow.

The ARP processing unit 2501 corresponds to the ARP processing unit 1203 of FIG. 12 and, in this example, includes a duplication detecting unit 2503, an ARP receiving unit 2504, an update GARP generating unit 2505, a duplication notification generating unit 2506, an ARP transmitting unit 2507, an update GARP delaying unit 2508 and a duplication notifying unit 2510. Here, description is omitted for functions similar to those of the first embodiment.

(a) Address Administration Unit 2502

Note that the address administration unit 2502 of the present embodiment is similar to that of the first embodiment. Hence, the description is omitted.

(b) Duplication Detecting Unit 2503

Note that the duplication detecting unit 2503 of the present embodiment is similar to that of the first embodiment. Hence, the description is omitted.

(c) ARP Receiving Unit 2504

The ARP receiving unit 2504 performs receiving processing and data analysis processing for the ARP packet (#250A) transferred from the interface processing unit 1201.

Note that the duplication detecting unit 2503 and the duplication notifying unit 2510 are included in the inside of the ARP receiving unit 2504.

(d) Update GARP Generating Unit 2505

The update GARP generating unit 2505 accepts the duplication detection notification from the duplication detecting unit 2503, and generates a plurality of GARP packets in which the IP address and the DL address of the device A2402 managed by the address administration unit 2502 are set up, and then transfers the GARP packets to the ARP transmitting unit 2507 and the update GARP delaying unit 2508. Note that when three or more update GARP packets are generated, the second and subsequent update GARP packets may be transferred to the update GARP delaying unit 2508.

(e) Duplication Notification Generating Unit 2506

Note that the duplication notification generating unit 2506 of the present embodiment is similar to that of the first embodiment. Hence, the description is omitted.

(f) ARP Transmitting Unit 2507

The ARP transmitting unit 2507 of the present embodiment is similar to that of the first embodiment. Hence, the description is omitted.

(g) Update GARP Delaying Unit 2508

When accepting an update GARP packet from the update GARP generating unit 2505, the update GARP delaying unit 2508 does not immediately transfer the accepted update GARP packet to the ARP transmitting unit 2507, and holds it until a predetermined time T elapses. When a predetermined time T has elapsed, the accepted update GARP packet is transferred to the ARP transmitting unit 2507. In the following description, the update GARP packet transferred to the ARP transmitting unit 2507 in such a delayed manner is referred to as a delayed update GARP packet in some cases.

The update GARP delaying unit 2508 stops the update GARP delay processing of accepting the address duplication notification from the duplication notifying unit 2510 and delaying the update GARP packet so as to transfer it to the ARP transmitting unit 2507.

Note that when a plurality of update GARP packets are transferred, the update GARP delaying unit 2508 may transfer the delayed update GARP packets to the ARP transmitting unit 2507 at predetermined time T intervals, or alternatively may transfer the delayed update GARP packets to the ARP transmitting unit 2507 at varying intervals.

(i) Duplication Notifying Unit 2510

The duplication notification receiving unit 2510 issues an address duplication notification when an ARP packet (referred to as a duplication notification ARP packet, hereinafter) is received in which the IP address of the device A2402 managed by the address administration unit 2502 matches the transmitting source IP address of the receiving ARP packet.

This address duplication notification is notified to the update GARP delaying unit 2508 and the duplication monitoring unit 2512.

(j) Duplication Monitoring Unit 2512

The duplication monitoring unit 2512 accepts the address duplication notification notified from the duplication notifying unit 2510, so as to recognize the occurrence of IP address duplication on the network 2401.

Note that when the address duplication notification is accepted from the duplication notifying unit 2510, the duplication monitoring unit 2512 may have the functions of turning ON an LED when the LED is provided in the device A2402, displaying the duplication when a display function is provided, and generating sound when a speaker is provided.

Further, the DL address of the communication device in which duplication has been detected may be displayed, while the actual IP address causing duplication may be outputted as information.

Further, the function of deleting the IP address "192.168.0.100" set for the device A2402 and then re-setting another IP address may be provided.

<Sequence of Duplication Detection Using GARP>

Figure 26:
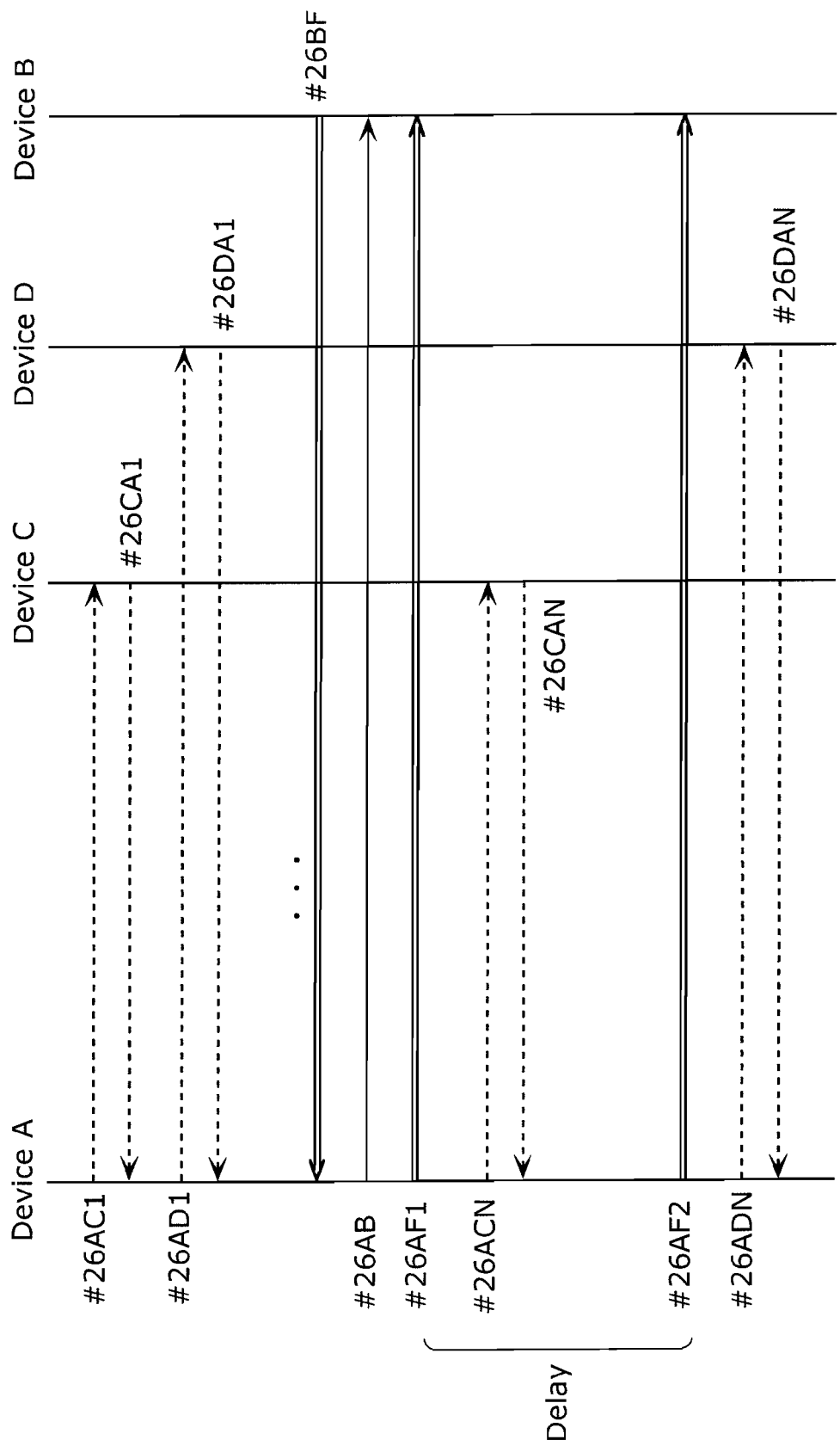
FIG. 26 is a diagram showing a sequence of duplication detection according to the third embodiment of the present invention.

FIG. 26 is a diagram showing a sequence of a communication device in the present embodiment. As shown in FIG. 26, when duplication detection using GARP is performed by the device B2403, the following packet exchange is performed by the device A2402, the device B2403, the device C2404 and the device D2405.

(a) Operation Before Duplication Detection

The device A2402 and the device C2404 communicate with each other (#26AC1, #36CA1). At this time, the situation of the ARP table in the device C2404 is as shown in FIG. 27.

Further, the device A2402 and the device D2405 communicate with each other (#26AC1, #26CA1). At this time, the situation of the ARP table in the device D2405 is as shown in FIG. 28. At this time, in the ARP table in the device D2405, the time until the update is accepted is controlled such that the ARP table should be prevented from being rewritten frequently by successive ARP packets generated by a DoS attack or the like. In the example of FIG. 28, the entry corresponding to the IP address "192.168.0.100" has been updated sufficiently prior. Thus, the time until the update is accepted is set to be 0 seconds. That is, when the ARP table need be updated concerning that entry, the update is performed immediately by the device D2405.

Here, the device B2403 is connected to the network 2401 and transmits a GARP packet for duplication detection (#26BF).

(b) Operation of Device C2404

The device C2404 receives the GARP packet (#26BF) broadcasted from the device B2403 to the network 2401. The device C2404 analyzes the contents of the received GARP packet (#26BF) so as to search whether a corresponding entry is present in the ARP table managed by the device C2404. As a result of the search, in the device C2404, the search hits the entry of the device A2402 with which communication has been performed until that time. Thus, the entry is overwritten with the information of the received GARP packet (#26BF). As a result, the ARP table of the device C2404 is overwritten with the GARP packet (#26BF) as shown in FIG. 29.

(c) Operation of Device D2405

The device D2405 receives the GARP packet (#26BF) broadcasted from the device B2403 to the network 2401. The device D2405 analyzes the contents of the received GARP packet (#26BF) so as to search whether a corresponding entry is present in the ARP table managed by the device D2405. As a result of the search, in the device D2405, the search hits the entry of the device A2402 with which communication has been performed until that time. At this time, since the hit entry in the ARP table has been updated sufficiently prior, its update can be performed immediately. Thus, the entry is overwritten with the information of the received GARP packet (#26BF). As a result, the ARP table of the device D2405 is overwritten with the GARP packet (#26BF) as shown in FIG. 30. Further, the time until the update is accepted is initialized and set to be U seconds.

(d) Operation of Device A2402

The device A2402 receives the GARP packet (#26BF) broadcasted from the device B2403 to the network 2401. The device A2402 detects that the received GARP packet (#26BF) has duplication with the IP address having been set for the device A2402.

When detecting the duplication of the IP address, the device A2402 transmits to the device B2403 a duplication notification ARP packet (#26AB) for notifying the duplication of the IP address. Further, the device A2402 broadcasts an update GARP packet (#26AF1) to the network 2401.

Here, the present sequence has been described for the case of the order of the duplication notification ARP packet (#26AB) and the update GARP packet (#26AF1). However, the order may be changed.

Further, the device A2402 delays the update GARP packet (#26AF2) by a predetermined time U or longer, and then broadcasts it to the network 2401.

(e) Operation of Device C2404 after Update GARP Transmission from Device A2402

The device C2404 receives the update GARP packet (#26AF1) broadcasted from the device A2402 to the network 2401. The device C2404 analyzes the contents of the received GARP packet (#26AF1) so as to search whether a corresponding entry is present in the ARP table managed by the device C2404. As a result of the search, in the device C2404, the search hits the entry of the device A2402 overwritten with the update GARP packet (#26BF) for duplication detection of by the device B2403. As a result, the ARP table of the device C2404 is overwritten with the update GARP packet (#26AF1) so as to become as shown in FIG. 31.

Further, the device C2404 receives the update GARP packet (#26AF2) broadcasted from the device A2402 to the network 2401. The device C2404 analyzes the contents of the received GARP packet (#26AF2) so as to search whether a corresponding entry is present in the ARP table managed by the device C2404. As a result of the search, in the device C2404, the search hits the entry of the device A2402 which has been overwritten with the update GARP packet (#26AF1) by the device A2402. As a result, the ARP table of the device C2404 is overwritten again with the update GARP packet (#26AF2). However, since the contents are the same, the ARP table remains as shown in FIG. 31.

(f) Operation of Device D2405 after Update GARP Transmission from Device A2402

The device D2405 receives the update GARP packet (#26AF1) broadcasted from the device A2402 to the network 2401. The device D2405 analyzes the contents of the received GARP packet (#26F1) so as to search whether a corresponding entry is present in the ARP table managed by the device D2405. As a result of the search, in the device D2405, the search hits the entry corresponding to the device A2402 overwritten with the GARP packet (#26BF) for duplication detection of the device B2403. However, since the time U until the update is accepted has not yet elapsed, the ARP table of the device D2405 is not overwritten and remains in the state of FIG. 30.

The device D2405 receives the update GARP packet (#26AF2) broadcasted from the device A2402 to the network 2401. The device D2405 analyzes the contents of the received GARP packet (#26AF2) so as to search whether a corresponding entry is present in the ARP table managed by the device D2405. As a result of the search, in the device D2405, the search hits the entry corresponding to the device A2402 overwritten with the GARP packet (#26BF) for duplication detection of the device B2403. At this time, since the device A2402 has transmitted the update GARP packet (#26AF2) after a predetermined time U has elapsed, the time until the update is accepted of the device D2405 for the ARP table entry corresponding to the device A2402 is 0 seconds. As a result, the ARP table of the device D2405 is overwritten with the update GARP packet (#26AF2) as shown in FIG. 32. Further, the time until the update is accepted is initialized and set to be U.

(g) Operation after Duplication Detection

As a result of the above-mentioned sequence, the ARP table of the device C2404 returns to the state that is prior to the duplication detection of the device B2403. Thus, the device A2402 and the device C2404 enter a state in which mutual communication is available (#26ACN, #26CAN) similarly to the state prior to the duplication detection.

Further, the ARP table of the device D2405 returns to the state that is prior to the duplication detection of the device B2403. Thus, the device A2402 and the device D2405 enter a state in which mutual communication is available (#26ADN, #26DAN) similarly to the state prior to the duplication detection.

<State Transition in Device A2402>

Figure 33:
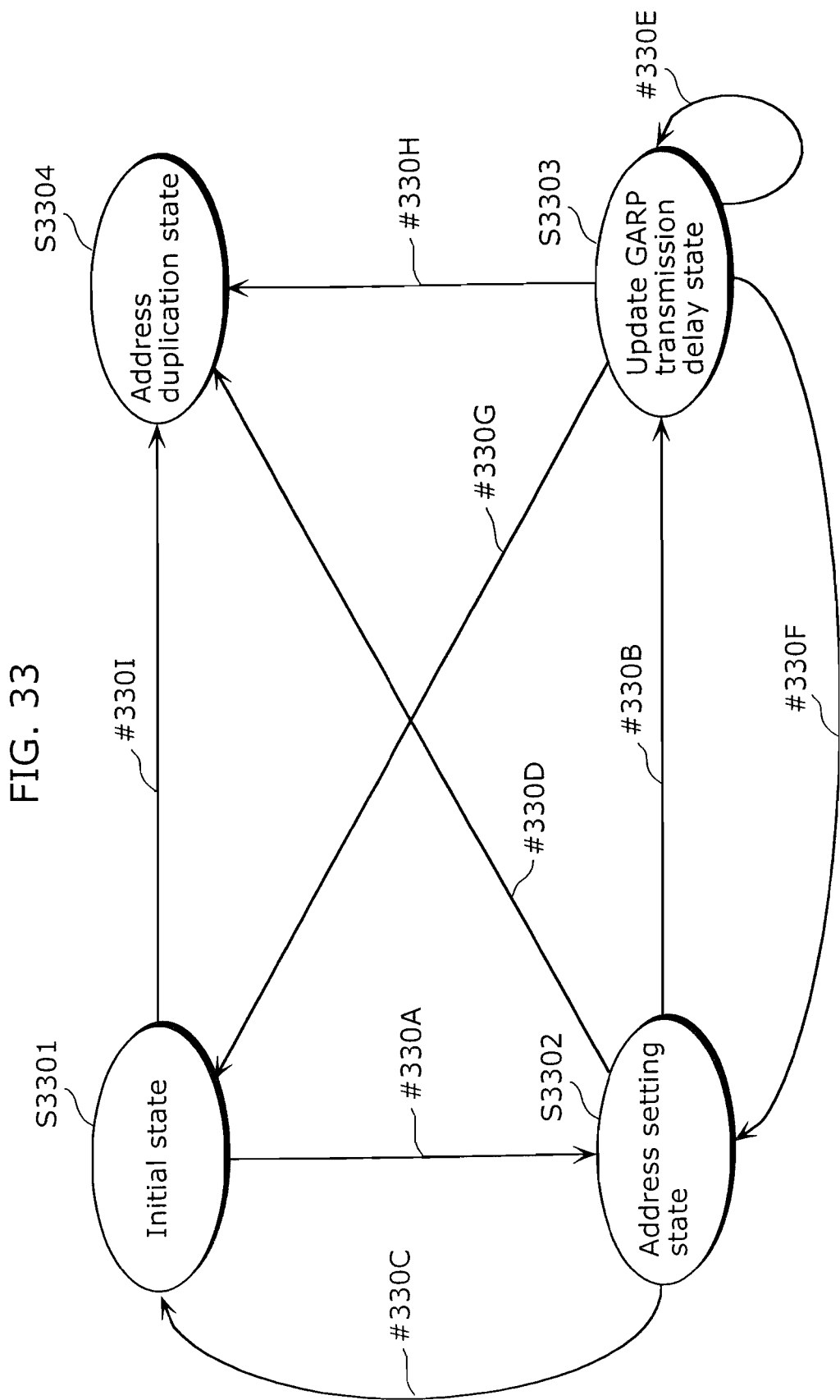
FIG. 33 is a diagram showing the state transition of a communication device according to the third embodiment of the present invention.

A state transition diagram in the device A2402 is described below with reference to FIG. 33. The states in the device A include an initial state S3301, an address setting state S3302, an update GARP transmission delay state S3303 and an address duplication state S3304. These states, their state transition conditions, and the contents of processing at the time of state transition are described below.

(a) Initial State S3301

The initial state S3301 is a state in which an IP address is not set for the device A2402.

(#330A) Transition from initial state S3301 to address setting state S3302

The state transition occurs when an IP address is set for the device A2402.

(b) Address Setting State S3302

The address setting state S3302 is a state in which an IP address has been set for the device A2402.

(#330B) Transition from address setting state S3302 to update GARP transmission delay state S3303

The state transition occurs when the device A2402 receives a GARP packet from another communication device on the network 2401. At this time, in response to the received GARP packet, a duplication notification ARP packet and an update GARP packet are transmitted.

(#330C) Transition from address setting state S3302 to initial state S3301

The state transition occurs when the IP address having been set for the device A2402 is deleted.

(#330D) Transition from address setting state S3302 to address duplication state S3304

The state transition occurs when the device A2402 receives a duplication notification ARP packet from another communication device on the network 2401.

(c) Update GARP Transmission Delay State S3303

The update GARP transmission delay state S3303 is in a state in which the device A2402 has already transmitted an update GARP and that the second or the subsequent update GARP is delayed by a predetermined time U so that transmission is waited for. That is, the state is at a point between the transmission of the first update GARP packet (#26AF1) in FIG. 26 and the transmission of the last update GARP (#26AF2). Note that even in a case that three or more update GARP packets are transmitted, the time until the last update GARP packet is transmitted is the update GARP transmission delay state S3303.

(#330E) Transition from Update GARP Transmission Delay State S3303 to Update GARP Transmission Delay State S3303

The state transition occurs when the device A2402 receives a GARP packet from another communication device on the network 2401. At this time, a duplication notification ARP packet is transmitted in response to the received GARP packet. Further, an update GARP packet is transmitted simultaneously. Note that the update GARP transmission delay time may be re-set to be the initial value predetermined time U. Note that the update GARP packet transmission need not be performed simultaneously.

(#330F) Transition from update GARP transmission delay state S3303 to address setting state S3302

The state transition occurs when a predetermined time U has passed after a transition into the update GARP transmission delay state S3303. At this time, the last update GARP packet is transmitted. Note that in a case that three or more update GARP packets are transmitted, the state transition occurs when a predetermined time T that causes the last update GARP packet transmission has elapsed.

(#330G) Transition from update GARP transmission delay state S3303 to initial state S3301

The state transition occurs when the IP address having been set for the device A2402 is deleted.

(#330H) Transition from update GARP transmission delay state S3303 to address duplication state S3304

The state transition occurs when the device A2402 receives a duplication notification ARP packet from another communication device on the network 2401.

(d) Address Duplication State S3304

The address duplication state S3304 is a state in which it has been detected that the IP address having been set for the device A2402 is duplicated with the IP address of another communication device on the network 2401.

(#330I) Transition from address duplication state S3304 to initial state S3301

The state transition occurs when the IP address having been set for the device A2402 is deleted.

<Processing Flow in Device A2402>

Further, the processing flow is described below in detail with reference to the state transition diagrams of FIGS. 25, 26 and 33.

(a) Initial State of Device A2402

An IP address "192.168.0.100" is set for the device A2402 which is in a state in which transition has occurred from the initial state S3301 to the address setting state S3302 (#330A).

(b) GARP Packet Receiving Processing (#26BF)

The device A2402 receives the GARP packet (#26BF) from the device B2403. The received GARP packet (#26BF) is transferred via the interface processing unit 1201 to the ARP receiving unit 2504 (#250A). The received GARP packet (#26BF) is analyzed by the ARP receiving unit 2504, and with the IP address having been set for the device A2402 is checked for duplication by the duplication detecting unit 2503. In the present sequence, the device B2403 transmits the GARP packet (#26BF) in a state that the same IP address as the device A2402 is set for the device B2403. Thus, a result "duplication" is obtained.

(c) Transmission Processing for Update GARP Packet (#26AF1) and Duplication Notification ARP Packet (#26AB)

In response to the result "duplication", in the device A2402, duplicated GARP packet (#26BF) information is transferred from the duplication detecting unit 2503 to the update GARP generating unit 2505 and the duplication notification generating unit 2506.

When accepting the notification of "duplication" and the GARP packet (#26BF) information, the update GARP generating unit 2505 generates GARP packets (#26AF1, #26AF2) in which the IP address and the DL address of the device A2402 are set up, and then transfers the GARP packets to the ARP transmitting unit 2507 and the update GARP delaying unit 2508.

When receiving the notification of "duplication" and the information of the GARP packet (#26BF), the duplication notification generating unit 2506 generates a duplication notification ARP packet (#26AB) for the device B2403 having transmitted the GARP packet (#26BF), and transfers it to the ARP transmitting unit 2608.

The ARP transmitting unit 2608 transfers to the interface processing unit 1201 the update GARP packet (#26AF1) and the duplication notification ARP packet (#26AB) which have been received, so as to perform transmission processing (#250B).

At this time, in the device A2402, state transition occurs from the address setting state S3302 to the update GARP transmission delay state S3303 (#330B).

(d) Update GARP Packet (#26AF2) Transmission Processing

When accepting the update GARP packet (#26AF2) from the update GARP generating unit 2505, the update GARP delaying unit 2508 delays it by a predetermined time U and then transfers it to the ARP transmitting unit 2507.

The ARP transmitting unit, 2507 transfers the accepted delayed update GARP packet (#26AF2) to the interface processing unit 1201, so as to perform transmission processing (#250B).

At this time, in the device A2402, state transition occurs from the update GARP transmission delay state S3303 to the address setting state S3302 (#330F).

After that, at each time that a GARP packet for duplication detection is received, the above-mentioned processing flow is performed.

<Stop Sequence in Case that Communication Device Having Duplicated IP Address is Present>

Next, a stop sequence when the network experiences an abnormality according to the present invention is described below.

Figure 34:
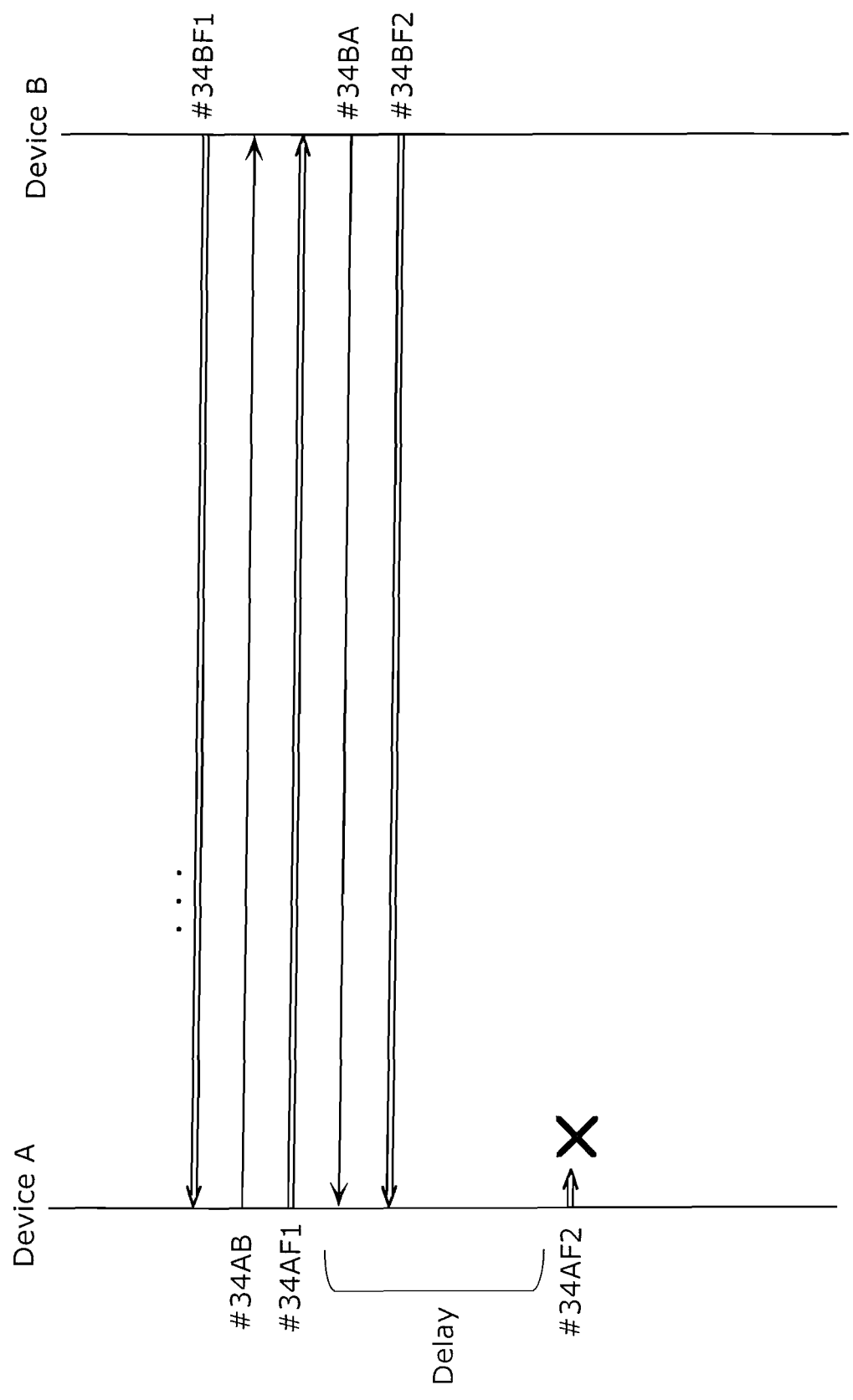
FIG. 34 is a diagram showing a sequence of a communication device in an abnormal system state according to the third embodiment of the present invention.

FIG. 34 is a diagram showing a sequence of a communication device in the present embodiment. As shown in FIG. 34, despite that the device B2403 has address duplication, when the device stays on the network 2401 in a state that the duplicated IP address is maintained, the following packet exchange is performed between the device A2402 and the device B2403. Note that for simplicity of description, the device C2404 and the device D2405 are omitted so that description is given solely for the device A2402 and the device B2403.

(a) Duplication Detection Start by the Device B2403

The device B2403 is connected to the network 2401 and broadcasts a GARP packet (#34BF1) to the IP address which overlaps that of the device A2402.

(b) Operation of Device A2402

The device A2402 receives the GARP packet (#34BF1) broadcasted from the device B2403 to the network 2401. The device A2402 detects that the received GARP packet (#34BF1) has duplication with the IP address having been set for the device A2402.

When detecting the duplication of the IP address, the device A2402 transmits to the device B2403 a duplication notification ARP packet (#34AB) for notifying the duplication of the IP address. Further, the device A2402 broadcasts an update GARP packet (#34AF1) to the network 2401.

Note that the present sequence has been described for the case of the order of the duplication notification ARP packet (#34AB) and the update GARP packet (#34AF1). However, the order may be changed.

Further, the device A2402 causes the broadcast transmission of the update GARP packet (#34AF2) to the network 2401 to wait for a predetermined time U.

(c) Operation of Device B2403

Here, in spite of the address duplication, the device B2403 continues to use the IP address which overlaps that of the device A2402. Further, the device B2403 is assumed to be a communication device similar to that of the present invention and to have a mechanism of transmitting an update GARP packet when a GARP packet for the device B2403 is received.

At this time, the device B2403 receives the update GARP packet (#34AF1) broadcasted from the device A2402 to the network 2401. The device B2403 detects that the received GARP packet (#34AF1) has duplication with the IP address having been set for the device B2403.

When detecting the duplication of the IP address, the device B2403 transmits to the device A2402 a duplication notification ARP packet (#34BA) for notifying the duplication of the IP address. Further, the device B2403 broadcasts an update GARP packet (#34BF2) to the network 2401.

Note that the present sequence has been described for the case of the order of the duplication notification ARP packet (#34BA) and the update GARP packet (#34BF2). However, the order may be changed.

(d) Operation of Device A2402 after Transmission of Duplication Notification ARP Packet from Device B2403

The device A2402 receives the duplication notification ARP packet (#34BA) which the device B2403 transmitted to the device A2402. When receiving the duplication notification ARP packet (#34BA), the device A2402 stops the transmission of the update GARP packet (#34AF2) which is waiting for transmission.

Note that in the device A2402, when an LED is provided, the LED may be turned ON. When a display function is provided, the duplication may be displayed. When a speaker is provided, sound may be generated. Further, the IP address "192.168.0.100" set for the device A2402 may be deleted, and then another IP address having the same network address may be set again.

Figure 35:
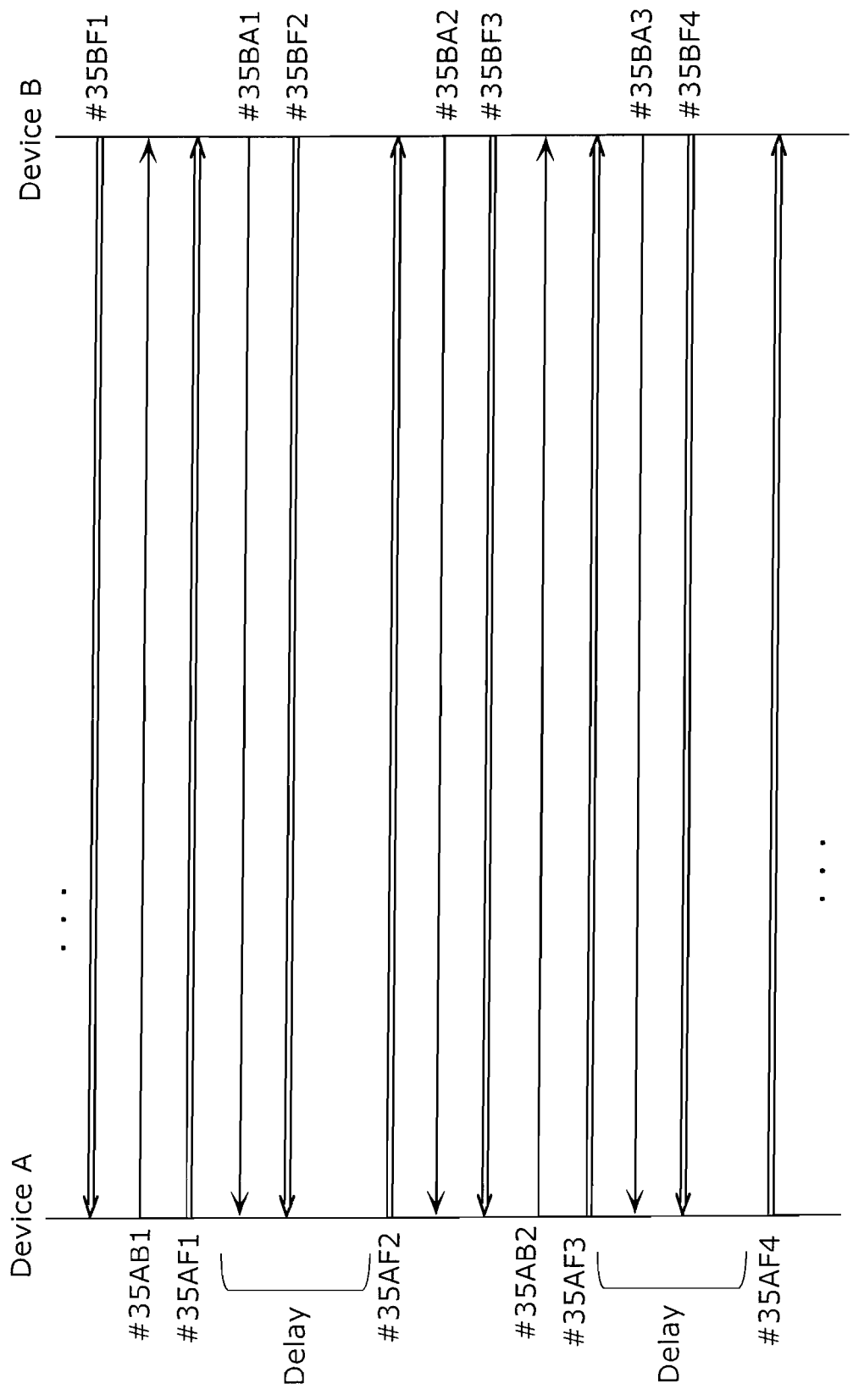
FIG. 35 is a diagram showing a reference-use sequence of a communication device in an abnormal system state according to the third embodiment of the present invention.

In (d), were transmission processing performed in a state in which the transmission of the update GARP packet (#34AF2) is not stopped, the sequence as shown in FIG. 35 would be repeated permanently. Thus, when the update GARP packet transmission stop function is provided as described here, wasteful traffic generation on the network 2401 is prevented so that a permanent communication failure state is avoided.

<Update GARP Packet Transmission Stop Processing Flow in Device A2402>

Further, the processing flow is described below in detail with reference to the state transition diagrams of FIGS. 25, 34 and 33.

(a) Initial State of Device A2402

The device A2402 is in a state in which an IP address "192.168.0.100" is set up and that transition has occurred from the initial state S3301 to the address setting state S3302 (#330A).

(b) GARP Packet Receiving Processing (#34BF1)

The device A2402 receives the GARP packet (#34BF1) from the device B2403. The received GARP packet (#34BF1) is transferred via the interface processing unit 1201 to the ARP receiving unit 2504 (#250A). The received GARP packet (#34BF1) is analyzed by the ARP receiving unit 2504, and duplication with the IP address having been set for the device A2402 is checked by the duplication detecting unit 2503. In the present sequence, the device B2403 transmits the GARP packet (#34BF1) in a state in which the same IP address as the device A2402 is set up. Thus, a result "duplication" is obtained.

(c) Transmission Processing for Update GARP Packet (#34AF1) and Duplication Notification ARP Packet (#34AB)

In response to the result "duplication", in the device A2402, duplicated GARP packet (#34BF1) information is transferred from the duplication detecting unit 2503 to the update GARP generating unit 2505 and the duplication notification generating unit 2506.

When accepting the notification of "duplication" and the GARP packet (#34BF1) information, the update GARP generating unit 2505 generates GARP packets (#34AF1, #34AF2) in which the IP address and the DL address of the device A2402 are set up, and then transfers them to the ARP transmitting unit 2507 and the update GARP delaying unit 2508.

When receiving the notification of "duplication" and the information of the GARP packet (#34BF1), the duplication notification generating unit 2506 generates a duplication notification ARP packet (#34AB) for the device B2403 having transmitted the GARP packet (#34BF1), and transfers it to the ARP transmitting unit 2608.

The ARP transmitting unit 2608 transfers to the interface processing unit 1201 the update GARP packet (#34AF1) and the duplication notification ARP packet (#34AB) which have been received, so as to perform transmission processing (#250B).

At this time, in the device A2402, state transition occurs from the address setting state S3302 to the update GARP transmission delay state S3303 (#330B).

(d) Receiving Process for Duplication Notification ARP Packet (#34BA)

The device A2402 receives the duplication notification ARP packet (#34BA) from the device B2403. The received duplication notification ARP packet (#34BA) is transferred via the interface processing unit 1201 to the ARP receiving unit 2504 (#250A). The received duplication notification ARP packet (#34BA) is analyzed by the ARP receiving unit 2504, and thereby determined as a duplication notification ARP packet by the duplication notifying unit 2510.

When determining that the received packet is a duplication notification ARP packet, the duplication notifying unit 2510 notifies to the update GARP delaying unit 2508 and the duplication monitoring unit 2512 that the duplication notification has been received.

At this time, in the device A2402, state transition occurs from the address setting state S3302 to the update GARP transmission delay state S3303 (#330B).

(e) Stop Processing for Update GARP Packet (#34AF2) Transmission

In response to the duplication notification received from the duplication notifying unit 2510, the update GARP delaying unit 2508 stops transfer to the ARP transmitting unit 2507 of the update GARP packet which is waiting for a predetermined time U. At this time, since the transfer of which to the ARP transmitting unit 2507 has been suspended the update GARP packet is discarded by the update GARP delaying unit 2508 without being transmitted to the network 2401.

Note that in response to the duplication notification received from the duplication notifying unit 2510, the duplication monitoring unit 2512 may have the functions of turning ON an LED when one is provided in the device A2402, displaying the duplication when a display function is provided, and generating sound when a speaker is provided. Further, the function of deleting the IP address "192.168.0.100" set for the device A2402 and then re-setting another IP address having the same network address may be provided.

<Processing in Case that Device B2403 has Update GARP Transmitting Function>

Figure 77:
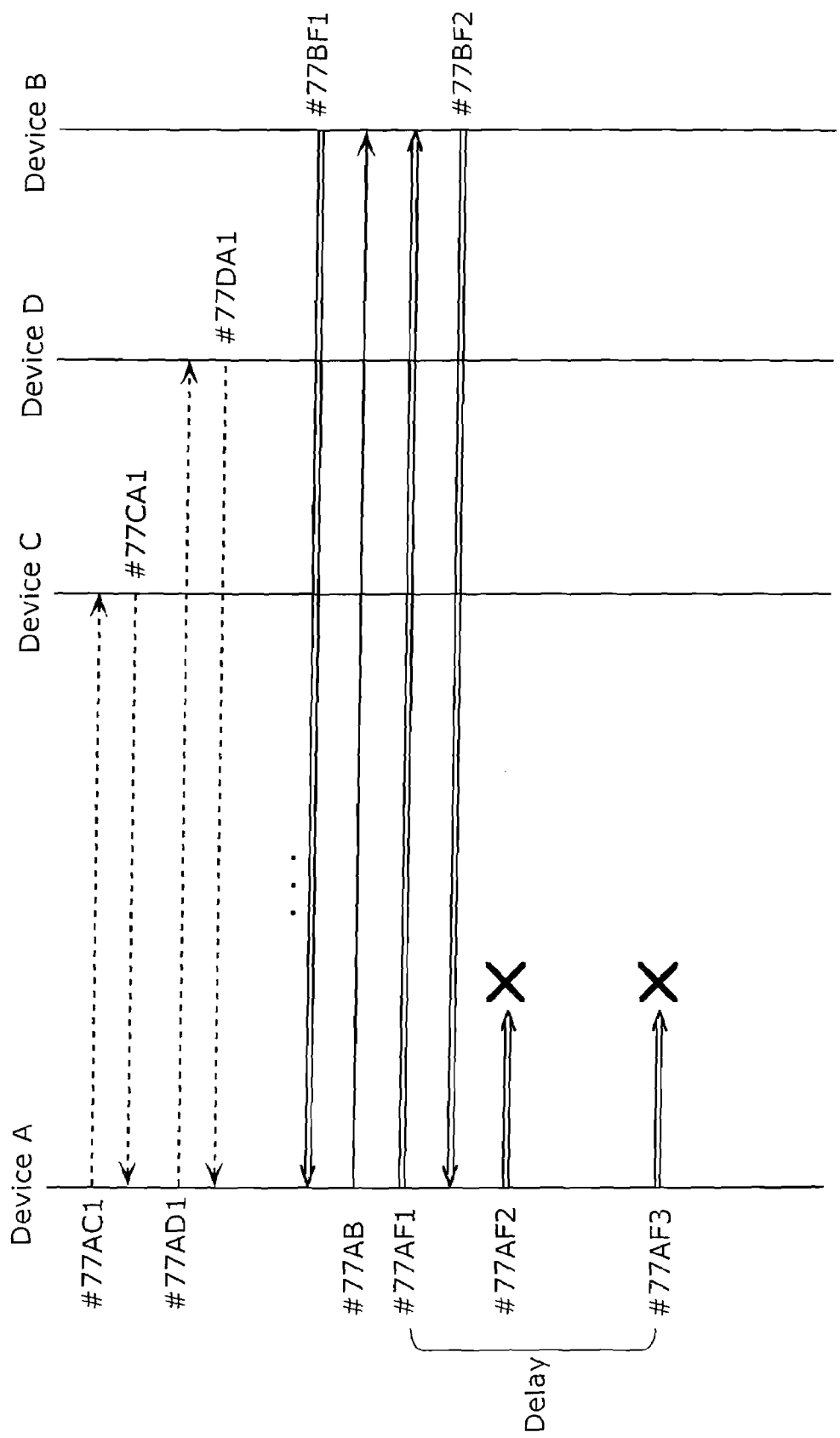
FIG. 77 is a diagram showing a sequence of a communication device according to the third embodiment of the present invention.

An embodiment is described below with reference to FIG. 77 for the case that, when a GARP packet which is duplicated with the IP address of the device B2403 is received, the device B2403 has the update GARP packet transmitting function solely in the present invention.

The sequence is the same as that described above until the step in which the device A2402 receives the GARP packet (#77BF1) transmitted from the device B2403 and transmits an update GARP packet (#77AF1).

Then, after receiving the update GARP packet (#77AF1) transmitted from the device A2402, the device B2403 transmits an update GARP packet (#77BF2) in order to restore the ARP table for the device B2403.

When receiving the update GARP packet (#77BF2) transmitted from the device B2403, the device A2402 detects duplication with the IP address of the device A2402.

However, after the transmission of the update GARP packet (#77A1), the device A2402 is waiting for the elapse of a predetermined time T. Thus, the device A2402 does not immediately transmit an additional update GARP packet (#77AF2). Further, the device A2402 stops the transmission of the update GARP packet (#77AF3) having been delayed for a predetermined time T.

As described above, in the present embodiment, the device B2403 can restore the rewritten ARP table of the device C2404 and the ARP table of the device D2405 in which update of the ARP table is limited for a predetermined time. This permits restoration of communication with the device A2402, the device C2404 and the device D2405 which have various types of installation.

Further, when a device is present that has an IP address duplicated with the network 2401, transmission of the wasteful update GARP packet can be suppressed so that network traffic is reduced.

Further, even in the case of a DoS attack in which GARP packets are transmitted successively, traffic increase can be avoided that could be caused if the device A2402 would return replies.

Further, even in a case that the device having performed duplication detection has the function of restoring the ARP table using a GARP packet, conflict is avoided between the GARP packets and the update GARP packets.

Fourth Embodiment

The fourth embodiment of the present invention is described below with reference to the drawings.

<Outline>

A communication device in the present embodiment has the following feature (C26).

(C26) A communication device that manages network layer addresses and data link layer addresses in association with each other, the communication device comprising: a duplication detecting unit that detects a Gratuitous ARP (GARP) packet in which a network layer address of a transmitting source matches a network layer address of the present communication device, from among received Address Resolution Protocol (ARP) packets; and an ARP information administration unit that deletes all information in an ARP table in which network layer addresses and data link layer addresses concerning communication devices on a network connected to the present communication device are managed in association with each other, when the GARP packet is detected by the duplication detecting unit.

On the basis of the above-mentioned points, the communication device in the present embodiment is described below.

<Network Configuration>

Note that the network configuration of the present embodiment is similar to that of the first embodiment. Hence, the description is omitted.

<Configuration of Communication Device>

Note that the configuration of the communication device in the present embodiment is similar to that of the first embodiment. Hence, the description is omitted.

<Function Configuration>

Note that the function configuration of the present embodiment is similar to that of the first embodiment. Hence, the description is omitted.

<Detailed Function Configuration>

Figure 36:
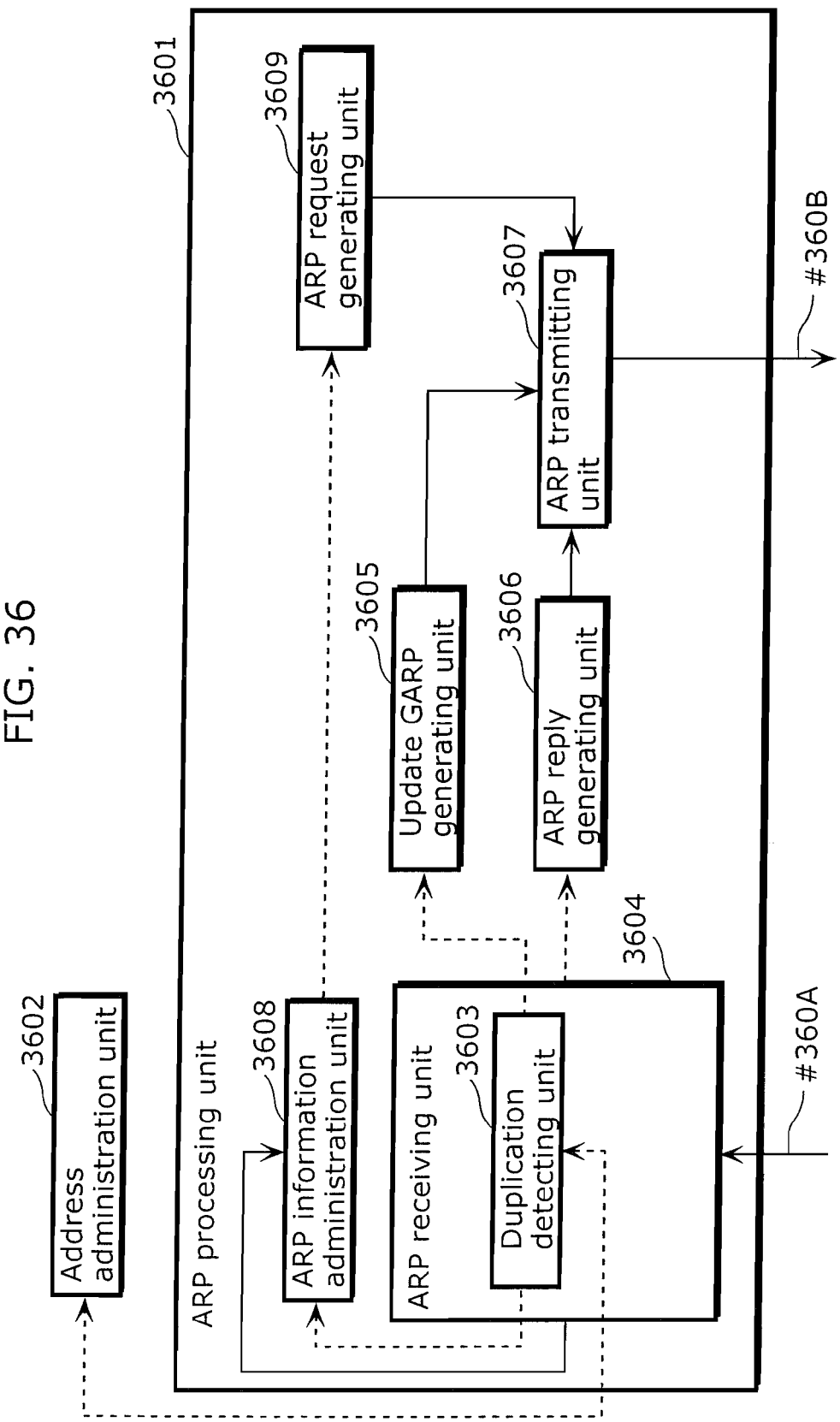
FIG. 36 is a diagram showing an exemplary function configuration of an ARP processing unit of a communication device according to the fourth embodiment of the present invention.

FIG. 36 is a diagram showing an exemplary function configuration of an ARP processing unit and an address administration unit of a communication device according to the present embodiment. Note that among the arrows in the figure, a dash-dotted line indicates a control information flow, while a solid line indicates a packet flow.

The ARP processing unit 3601 corresponds to the ARP processing unit 1203 of FIG. 12 and, in this example, includes a duplication detecting unit 3603, an ARP receiving unit 3604, a duplication notification generating unit 3605, an ARP reply generating unit 3606, an ARP transmitting unit 3607, an ARP information administration unit 3608 and an ARP request generating unit 3609. Note that description is omitted for functions similar to those of the first embodiment.

(a) Address Administration Unit 3602

Note that the address administration unit 3602 of the present embodiment is similar to that of the first embodiment. Hence, the description is omitted.

(b) Duplication Detecting Unit 3603

When receiving a GARP packet, the duplication detecting unit 3603 compares and checks whether is the GARP packet has duplicated the IP address having been set for the device A402. As a result of comparison, when the IP address is duplicated, the duplication detecting unit 3603 notifies to ARP information administration unit 3608 that the ARP table should be deleted. Further, the duplication detecting unit 3603 notifies the duplication to the duplication notification generating unit 3605, and transfers the transmitting source DL address information of the GARP packet to the duplication notification generating unit 3605. Note that the GARP packet itself may be transferred as the information.

Note that the duplication detecting unit 3603 may have the function of comparing and checking whether an IP address is duplicated with the IP address having been set for the device A402, even when a 0ARP packet is received. Further, as a result of comparison with the 0ARP packet, when the IP address is duplicated, the duplication detecting unit 3603 may notify the duplication to the duplication notification generating unit 3605 and transfer the SRC-DL address information of the 0ARP packet. Note that the 0ARP packet itself may be transferred as the information.

(c) ARP Receiving Unit 3604

Note that the ARP receiving unit 3604 of the present embodiment is similar to that of the first embodiment. Hence, the description is omitted.

(d) Duplication Notification Generating Unit 3605

The duplication notification generating unit 3605 of the present embodiment is similar to that of the first embodiment. Hence, the description is omitted.

(e) ARP Reply Generating Unit 3606

The ARP reply generating unit 3606 of the present embodiment is similar to that of the first embodiment. Hence, the description is omitted.

(f) ARP Transmitting Unit 3607

The ARP transmitting unit 3607 has the function of transferring to the interface layer processing unit as an ARP packet (#360B) the ARP packet generated by the duplication notification generating unit 2605, the ARP reply generating unit 3606 and the ARP request generating unit 3609.

(g) ARP Information Administration unit 3608

The ARP information administration unit 3608 manages the ARP table. The ARP table stores the information transferred as the ARP packet analysis result of the ARP receiving unit 3604 in the storage unit 1104, and manages the information. The ARP table is a pair of the IP address and the DL address, and used in communication with another communication device connected to the network 401. Further, the ARP information administration unit 3608 has the function of deleting entire ARP table management information managed by the ARP information administration unit 3608, when the ARP information administration unit 3608 is notified that a GAP packet is received from the duplication detecting unit 3603. Further, the ARP information administration unit 3608 has the function of notifying the ARP request generating unit 3609 that an ARP request should be issued, when the device A402 tries to communicate with another communication device on the network and when an entry of the ARP table corresponding to the destination IP address is not present.

(h) ARP Request Generating Unit 3609

When an entry corresponding to the destination IP address of the packet to be transmitted is not present in the ARP table managed by the ARP information administration unit 3608, the ARP request generating unit 3609 receives a request for an ARP request. The ARP request generating unit 3609 having received the request for an ARP request has the function of generating an ARP request packet and transferring it to the ARP transmitting unit 3607.

<Sequence of Duplication Detection Using GARP>

Figure 37:
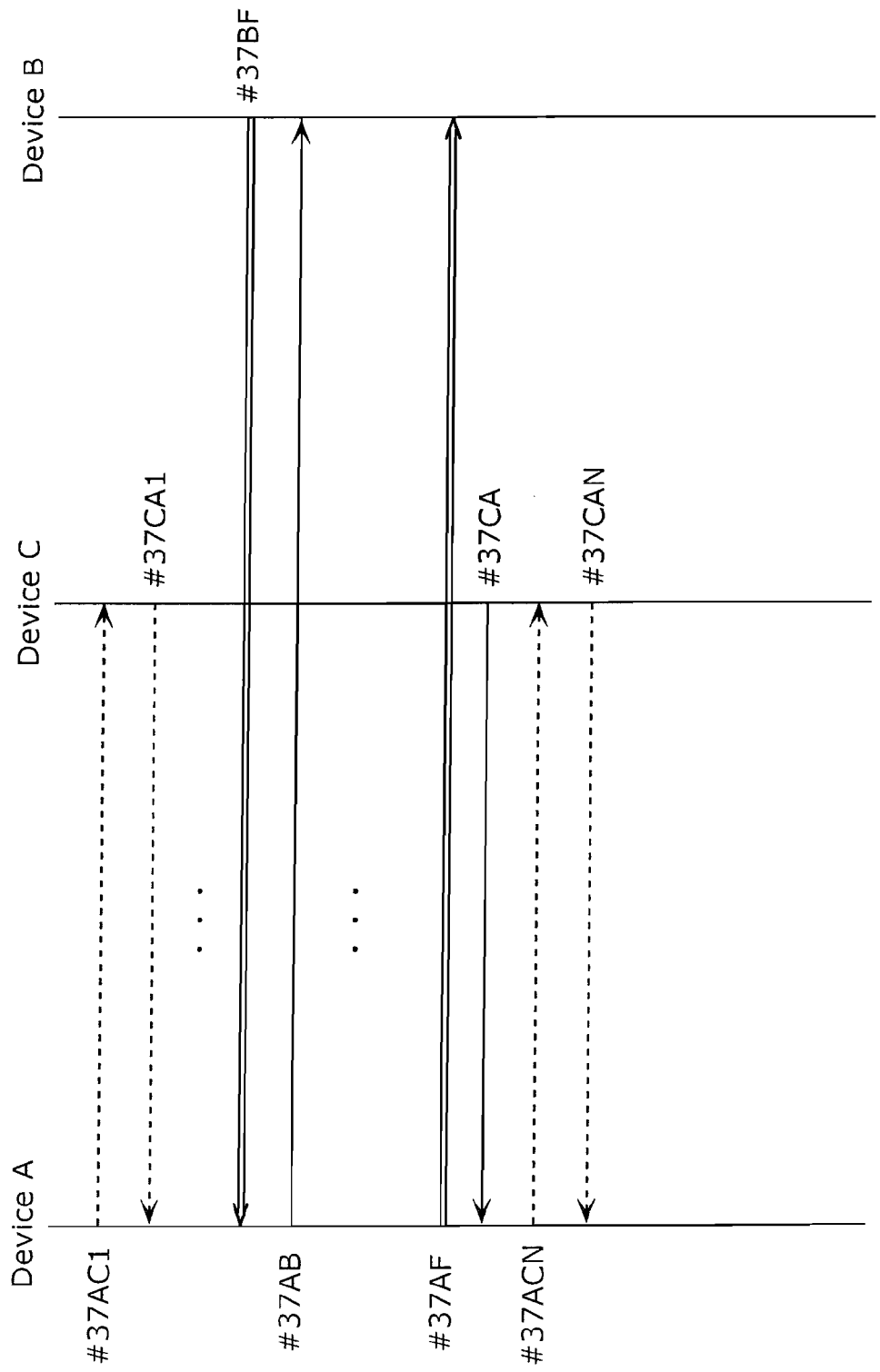
FIG. 37 is a diagram showing a sequence of a communication device according to the fourth embodiment of the present invention.

FIG. 37 is a diagram showing a sequence of a communication device in the present embodiment. As shown in FIG. 37, when duplication detection using GARP is performed by the device B403, the following packet exchange is performed by the device A402, the device B403 and the device C404.

(a) Operation Before Duplication Detection

The device A402 and the device C404 communicate with each other (#37AC1, #37CA1). At this time, the situation of the ARP table in the device A402 is as shown in FIG. 38, while the situation of the ARP table in the device C404 is as shown in FIG. 39.

Here, the device B403 is connected to the network 401 and transmits a GARP packet for duplication detection (#37BF).

(b) Operation of Device C404

The device C404 receives the GARP packet (#37BF) broadcasted from the device B403 to the network 401. The device C404 analyzes the contents of the received GARP packet (#37BF) so as to search whether a corresponding entry is present in the ARP table managed by the device C404. As a result of the search, in the device C404, the search hits the entry of the device A402 with which communication has been performed until that time. Thus, the entry is overwritten with the received GARP packet (#37BF). As a result, the ARP table of the device C404 is overwritten with the GARP packet (#37BF) and becomes as shown in FIG. 40.

(c) Operation of Device A402

The device A402 receives the GARP packet (#37BF) broadcasted from the device B403 to the network 401. The device A402 detects that the received GARP packet (#37BF) has duplication with the IP address having been set for the device A402.

When detecting duplication of the IP address, the device A402 transmits to the device B403 a duplication notification ARP packet (#37AB) for notifying that the IP address is duplicated. Further, the device A402 deletes the all information of the ARP table held in the device A402. The ARP table in the device A402 becomes as shown in FIG. 41.

(d) Operation in Device A402 and Device C404

At the time that packet transmission to the device C404 is to be started, since the ARP table managed by the device A402 is deleted, the device A402 broadcasts to the network 401 an ARP request packet (#37AF) for DL address resolution processing of the device C404. At this time, transmission is suspended for the transmission packet to the device C404.

The device C404 receives the ARP request packet (#37AF) broadcasted from the device A402 to the network 401. The device C404 analyzes the contents of the received ARP request packet (#37AF) so as to recognize that it is an ARP request packet addressed to the device C404. Thus, the device C404 transmits to the device A402 an ARP reply packet (#37CA) in which the DL address and the IP address of the device C404 are set up. At this time, the device C404 acquires the DL address and the IP address of the device A402 from the received ARP request packet (#37AF) so as to register them into the ARP table. The ARP table in the device C404 becomes as shown in FIG. 42.

The device A402 receives the ARP reply packet (#37CA) transmitted from the device C404. The device A402 analyzes the contents of the received ARP reply packet (#37CA) so as to recognize the DL address and the IP address of the device C404. Then, the device A402 registers them into the ARP table. The ARP table in the device A402 becomes as shown in FIG. 43.

At the same time as the entry registration of the device C404 into the ARP table, the device A402 transmits the packet (#37ACN) to the device C404 to which the transmission has been suspended.

After that, the packet (#37CAN) from the device C404 is also transmitted to the device A402.

<Processing in Device A402>

The processing flow is described further in detail with reference to FIGS. 36 and 37.

(a) GARP Packet Receiving Processing (#37BF)

The device A402 receives the GARP packet (#37BF) from the device B403. The received GARP packet (#37BF) is transferred via the interface processing unit 1201 to the ARP receiving unit 3604 (#360A). The received GARP packet (#37BF) is analyzed by the ARP receiving unit 3604, and duplication with the IP address having been set for the device A402 is checked by the duplication detecting unit 3603. In the present sequence, the device B403 transmits the GARP packet (#37BF) in a state where the same IP address as the device A402 is set up. Thus, a result "duplication" is obtained.

(b) Transmission Processing for Duplication Notification ARP Packet (#37AB) and Deletion of ARP Table In response to the result of "duplication", in the device A402, GARP packet (#37BF) information indicating duplication is transmitted from the duplication detecting unit 3603 to the duplication notification generating unit 3605. Further, the duplication detecting unit 3603 notifies the ARP information administration unit 3608 of the duplication.

When receiving the notification of "duplication" and the information of the GARP packet (#37BF), the duplication notification generating unit 3605 generates a duplication notification ARP packet (#37AB) for the device B403 having transmitted the GARP packet (#37BF), and transfers it to the ARP transmitting unit 3607.

The ARP transmitting unit 3607 transfers the received duplication notification ARP packet (#37AB) to the interface processing unit 1201, so as to perform transmission processing (#370B).

Further, when receiving the notification of "duplication", the ARP information administration unit 3608 deletes all entries of the ARP table managed by the ARP information administration unit 3608.

(c) Address Resolution Processing (#37AF) from Device A402 to Device C404

The device A402 resumes the transmission of the packet (#37ACN) to the device C404. At this time, the device A402 searches the ARP table managed by the ARP information administration unit 3608. However, since the ARP table are completely deleted, an entry corresponding to the device C404 is not hit.

Thus, the ARP information administration unit 3608 in which no hit has been obtained in the ARP table notifies to the ARP request generating unit 3609 an ARP request generation in order to resolve the address of the device C404.

When the notification of ARP request generation is received, the ARP request generating unit 3609 generates an ARP request packet (#37AF) to the device C404, and transfers it to the ARP transmitting unit 3607. The ARP transmitting unit 3607 transfers the ARP request packet (#37AF) to the interface processing unit 1201 so as to perform transmission processing (#360B).

At this time, transmission of the transmission packet (#37ACN) from the device A402 to the device C404 is suspended in the ARP information administration unit 3608.

(d) ARP Reply Processing (#37CA) from Device C404 to Device A402

The device A402 receives the ARP reply packet (#37CA) transmitted from the device C404. The ARP receiving unit 3604 having received the ARP reply packet (#37CA) recognizes that it is a reply from the device C404, and transfers the DL address and the IP address of the device C404 to the ARP information administration unit 3608.

The ARP information administration unit 3608 registers into the ARP table the DL address and the IP address of the device C404 transferred from the ARP receiving unit 3604, and transmits to the device C404 the packet (#36ACN), the transmission of which has been suspended.

As described above, in the present embodiment, the ARP tables of the device A402 and the device C404 can be updated without generation of excessive network traffic on the network 401, so that restoration of communication between the device A402 and the device C404 is achieved.

Fifth Embodiment

The fifth embodiment of the present invention is described below with reference to the drawings.

<Outline>

A communication device in the present embodiment has the features of the following (C4) to (C7).

(C4) The communication device further includes a detection notifying unit that transfers to the duplication detecting unit an address duplication notification notifying that the network layer address is duplicated, when, after the ARP transmitting unit has transmitted the update GARP packet, the ARP receiving unit receives an ARP reply packet reply packet in which the network layer address of the transmitting source matches the network layer address of the present communication device. The duplication notification generating unit generates an ARP reply packet and transfers it to the ARP transmitting unit, when a duplication detection notification notifying that the network layer address is duplicated is accepted from the duplication detecting unit. The update GARP generating unit generates an update GARP packet and transfers it to the ARP transmitting unit, when the duplication detection notification is accepted from the duplication detecting unit. The duplication detecting unit stops to transfer the duplication detection notification to the duplication notification generating unit and the update GARP generating unit, when the address duplication notification is accepted from the duplication notifying unit.

(C5) The communication device further includes: a duplication monitoring unit that outputs that the network layer address of the present communication device is duplicated on the network connected to the present communication device, when an address duplication notification notifying that the network layer address is duplicated is accepted; and a duplication notifying unit that transfers the address duplication notification to the duplication monitoring unit, when, after the ARP transmitting unit has transmitted the update GARP packet, the ARP receiving unit receives an ARP reply packet reply packet in which the network layer address of the transmitting source matches the network layer address of the present communication device.

Here, the features of the following (C6) and (C7) may be provided.

(C6) The duplication notifying unit transfers to the duplication monitoring unit the data link layer address of the transmitting source in a manner included in the address duplication notification. The duplication monitoring unit outputs the data link layer address of the transmitting source included in the address duplication notification.

(C7) The duplication notifying unit transfers to the duplication monitoring unit the network layer address of the transmitting source in a manner included in the address duplication notification. The duplication monitoring unit outputs the network layer address of the transmitting source included in the address duplication notification.

The communication device in the present embodiment is described below on the basis of the above-mentioned points.

<Network Configuration>

Note that the network configuration of the present embodiment is similar to that of the first embodiment. Hence, the description is omitted.

<Configuration of Communication Device>

The configuration of the communication device in the present embodiment is similar to that of the first embodiment. Hence, the description is omitted.

<Function Configuration>

Note that the function configuration of the present embodiment is similar to that of the first embodiment. Hence, the description is omitted.

<Detailed Function Configuration>

Figure 44:
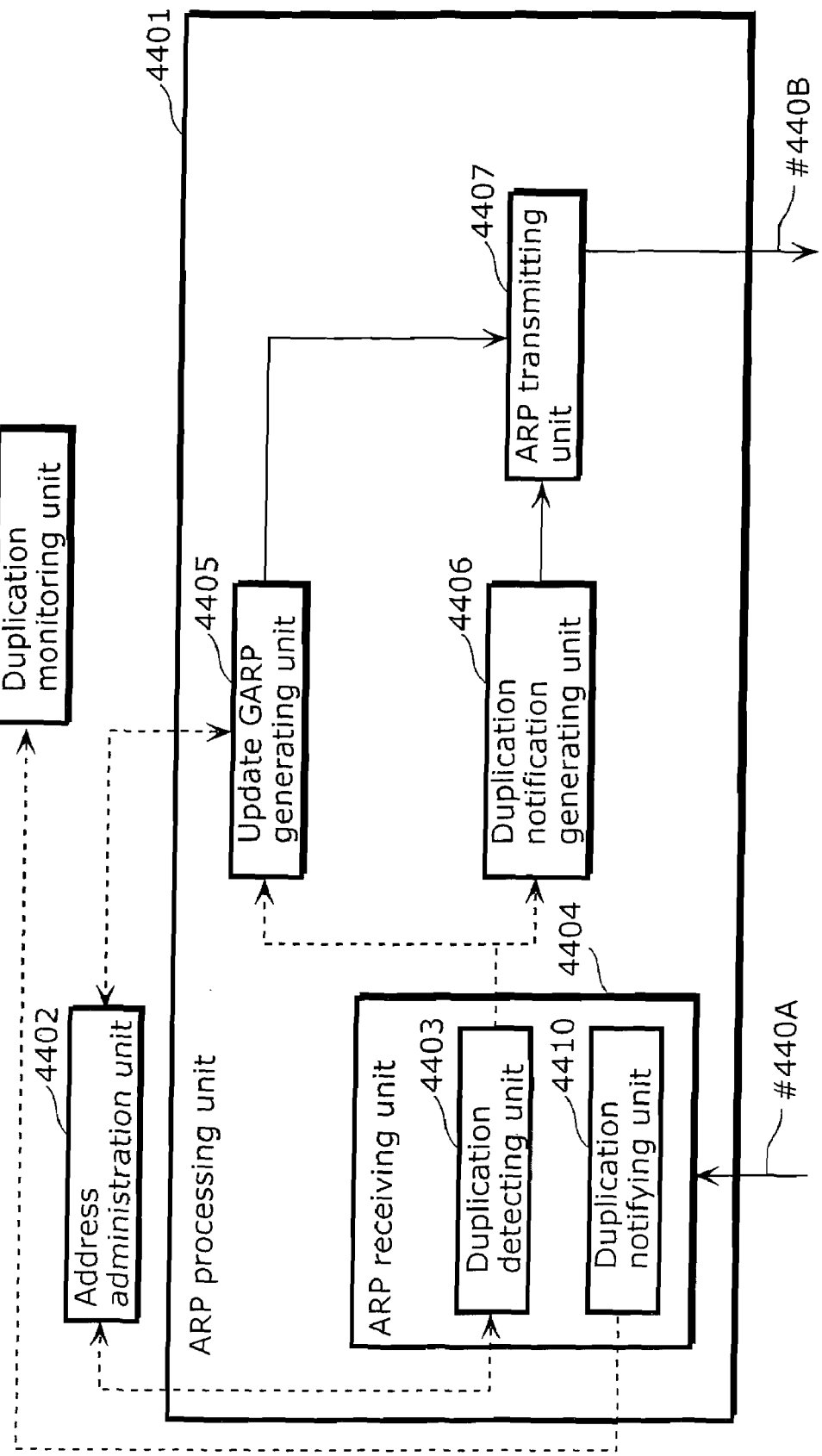
FIG. 44 is a diagram showing an exemplary function configuration of an ARP processing unit of a communication device according to the fifth embodiment of the present invention.

FIG. 44 is a diagram showing an exemplary function configuration of an ARP processing unit, an address administration unit and a duplication monitoring unit of a communication device according to the present embodiment. Note that among the arrows in the figure, a dash-dotted line indicates a control information flow, while a solid line indicates a packet flow.

The ARP processing unit 4401 corresponds to the ARP processing unit 1203 of FIG. 12 and, in this example, includes a duplication detecting unit 4403, an ARP receiving unit 4404, an update GARP generating unit 4405, a duplication notification generating unit 4406, an ARP transmitting unit 4408 and a duplication notifying unit 4410.

(a) Address Administration Unit 4402

The address administration unit 4402 of the present embodiment is similar to that of the first embodiment. Hence, the description is omitted.

(b) Duplication Detecting Unit 4403

The duplication detecting unit 4403 issues a duplication detection notification when a GARP packet is received in which the IP address of the device A1002 managed by the address administration unit 4402 matches the transmitting source IP address of the received ARP packet.

This duplication detection notification is notified to the update GARP generating unit 4405 and the duplication notification generating unit 4406.

In this duplication detection notification, the transmitting source DL address of the GARP packet is included as information. Note that the GARP packet itself may be transferred as the information.

Further, when accepting the address duplication notification, the duplication detecting unit 4403 stops the duplication detection notification. Note that the duplication detection notification to the update GARP generating unit 4405 alone may be stopped, while the duplication detection notification to the duplication notification generating unit 4406 is not stopped.

(c) ARP Receiving Unit 4404

Note that the ARP receiving unit 4404 of the present embodiment is similar to that of the third embodiment. Hence, the description is omitted.

(d) Update GARP Generating Unit 4405

Note that the update GARP generating unit 4405 of the present embodiment is similar to that of the first embodiment. Hence, the description is omitted.

(e) Duplication Notification Generating Unit 4406

The duplication notification generating unit 4406 of the present embodiment is similar to that of the first embodiment. Hence, the description is omitted.

(f) ARP Transmitting Unit 4408

The ARP transmitting unit 4408 of the present embodiment is similar to that of the first embodiment. Hence, the description is omitted.

(g) Duplication Notifying Unit 4410

When receiving the duplication notification ARP packet, the duplication notification receiving unit 4410 issues an address duplication notification. This address duplication notification is notified to the duplication detecting unit 4403 and the duplication monitoring unit 4412.

(h) Duplication Monitoring Unit 4412

Note that the duplication monitoring unit 4412 of the present embodiment is similar to that of the third embodiment. Hence, the description is omitted.

<Sequence of Duplication Detection Using GARP>

Figure 45:
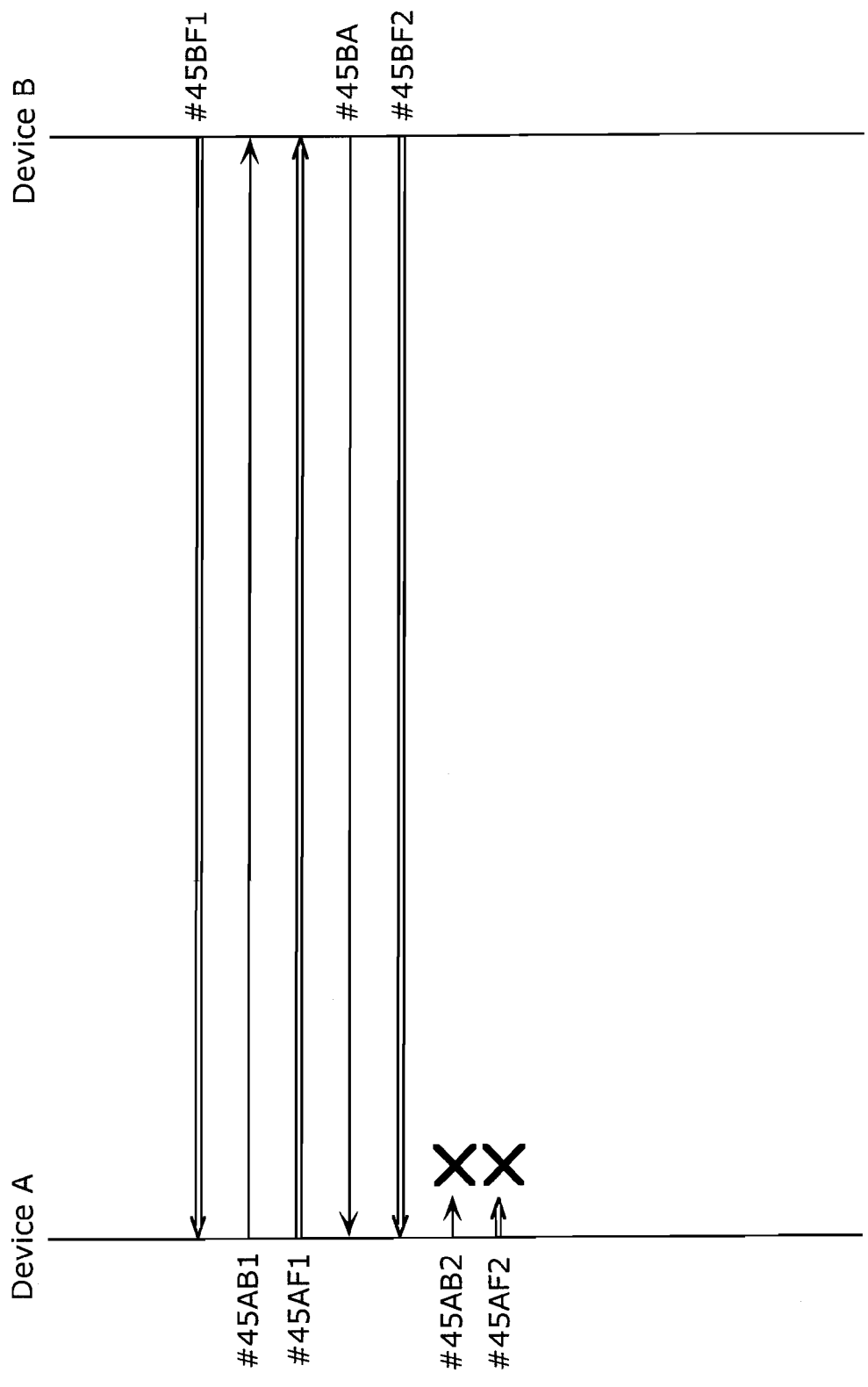
FIG. 45 is a diagram showing a sequence of a communication device according to the fifth embodiment of the present invention.

FIG. 45 is a diagram showing a sequence of a communication device in the present embodiment. As shown in FIG. 45, when the device B403 transmits a GARP packet that has a purpose other than duplication detection, the following packet exchange is performed between the device A402 and the device B403. Here, after transmitting the GARP packet, the device B403 continues to use the duplicated IP address, despite that the IP address duplication arises with the device A402. Further, the device B403 is assumed to have equipment partially similar to the present invention and have the function of receiving a GARP packet and transmitting an update GARP packet.

(a) Operation of Device B403

The device B403 broadcasts a GARP packet (#45BF1) that has a purpose other than duplication detection to the network 401.

(b) Operation of Device A402

The device A402 receives the GARP packet (#45BF1) transmitted from the device B403, and transmits an address duplication notification ARP packet (#45AB1) and an update GARP packet (#45AF1).

(c) Operation of Device B403 after Transmission of Update GARP Packet from Device A402

The device B403 neglects the duplication notification ARP packet (#45AB1) transmitted from the device A402, and receives the update GARP packet (#45AF1). Then, since the address is duplicated with the IP address having been set for the device B403, a duplication notification ARP packet (#45BA) is transmitted. Further, using the update GARP transmitting function of the device B403, the device B403 transmits an update GARP packet (#45BF2).

(d) Operation after Update GARP Packet Transmission from Device B403

The device A402 receives the duplication notification ARP packet (#45BA) and the update GARP packet (#45BF2) transmitted from the device B403.

However, when receiving the duplication notification ARP packet, the device A402 stops transmission of the duplication notification packet (#45AB2) and the update GARP packet (#45AF2).

<Processing Flow in Device A404>

(a) GARP Packet (#45BF1) Receiving Processing

Note that GARP packet (#45BF1) receiving processing is similar to that of the first embodiment. Hence, the description is omitted.

(b) Transmission Processing for Update GARP Packet (#45AF1) and Duplication Notification ARP Packet (#45AB1)

The transmission processing for update GARP packet (#45AF1) and duplication notification ARP packet (#45AB1) is similar to that of the first embodiment. Hence, the description is omitted.

(c) Receiving Processing for Duplication Notification ARP Packet (#45BA) and Update GARP Packet (#45BF2)

The device A402 receives the duplication notification ARP packet (#45BA) and the update GARP packet (#45BF2) transmitted from the device B403.

First, processing for the duplication notification ARP packet (#45BA) is described below.

When receiving a duplication notification ARP packet indicating IP address duplication with the IP address of the device B403, the duplication notifying unit 4410 in the ARP receiving unit 4404 issues an address duplication notification to the duplication detecting unit 4403 and the duplication monitoring unit 4412.

When accepting the address duplication notification from the duplication notifying unit 4410, the duplication detecting unit 4403 stops duplication detection notification to the update GARP generating unit 4405 and the duplication notification generating unit 4406. Note that the duplication detection notification to the update GARP generating unit 4405 may solely be stopped.

When accepting the address duplication notification from the duplication notifying unit 4410, the duplication monitoring unit A412 recognizes that the IP address of the device A402 is duplicated on the network 401. Note that in response to the address duplication notification, the duplication monitoring unit 4412 may have the functions of turning ON an LED when one is provided in the device A2402, displaying the duplication when a display function is provided, and generating sound when a speaker is provided. Further, the function of deleting the IP address "192.168.0.100" set for the device A2402 and then re-setting another IP address having the same network address may be provided.

Next, processing for the update GARP packet (#45BF2) is described below.

When an update GARP packet (#45BF2) is received from the device B403, processing is performed in the duplication detecting unit 4403. At this time, since the duplication detecting unit 4403 has accepted the address duplication notification from the duplication notifying unit 4410, the duplication detecting unit 4403 does not perform duplication detection notification from the duplication detecting unit 4403 to the update GARP generating unit 4405 and the duplication notification generating unit 4406.

As a result, processing is performed neither in the update GARP generating unit 4405 nor in the duplication notification generating unit 4406. Thus, the update GARP packet (#45AF2) and the duplication notification ARP packet (#45AB2) are not transmitted.

Note that in a case that only the duplication detection notification to the update GARP generating unit 4405 is stopped, only the update GARP generating unit 4405 does not perform the processing. Thus, the duplication notification ARP packet (#45AB2) is transmitted, whereas the update GARP packet (#45AF2) is not transmitted.

As described above, according to the present embodiment, in the installation that although the IP address is duplicated in the device B403, the duplicated IP address is held intact, exchange of update GARP packets is stopped so that reduction of wasteful network traffic is achieved.

Further, since the function of detecting duplication is provided, the user can be prompted to change the IP address setting.

Sixth Embodiment

Next, the sixth embodiment of the present invention is described below with reference to the drawings.
<Outline>
A communication device in the present embodiment has the features of the following (C16) to (C18).

(C16) The communication device includes: an address duplication searching unit that searches for duplication of a network layer address by using a network layer address for address duplication search; and a GARP generating unit that generates a search GARP packet in which the network layer address for address duplication search is set up as a network layer address of the transmission destination. The ARP transmitting unit transmits the search GARP packet generated by the GARP generating unit. The duplication detecting unit transfers an address duplication notification notifying that the network layer address is duplicated, when, during the time that the ARP transmitting unit transmits the search GARP packet and that the address duplication searching unit searches for address duplication, a duplication ARP packet is received in which the network layer address of the transmission destination matches the network layer address for search.

(C17) The communication device further includes a restoration GARP generating unit that sets up the data link layer address of the transmitting source of the duplication ARP packet as a data link layer address of the transmitting source and generates a restoration GARP packet in which the network layer address for address duplication search is set up as the network layer address of the transmission destination. The duplication detecting unit transfers to the address duplication searching unit the data link layer address of the transmitting source of the duplication ARP packet in a manner included in the address duplication notification. The address duplication searching unit transfers to the restoration GARP generating unit the data link layer address of the transmitting source of the duplication ARP packet included in the address duplication notification and the network layer address for address duplication search. The ARP transmitting unit sets LIP the data link layer address of the transmission destination of the restoration GARP packet as a data link layer broadcast address, and sets up the data link layer address of the transmitting source of the restoration GARP packet as a data link layer address set in the present communication device, so as to transmit the restoration GARP packet.

(C18) The restoration GARP generating unit immediately generates a restoration GARP packet and transfer it to the ARP transmitting unit, when a restoration GARP generation notification that instructs to generate a restoration GARP packet is accepted from the address duplication searching unit.

Figure 51A:
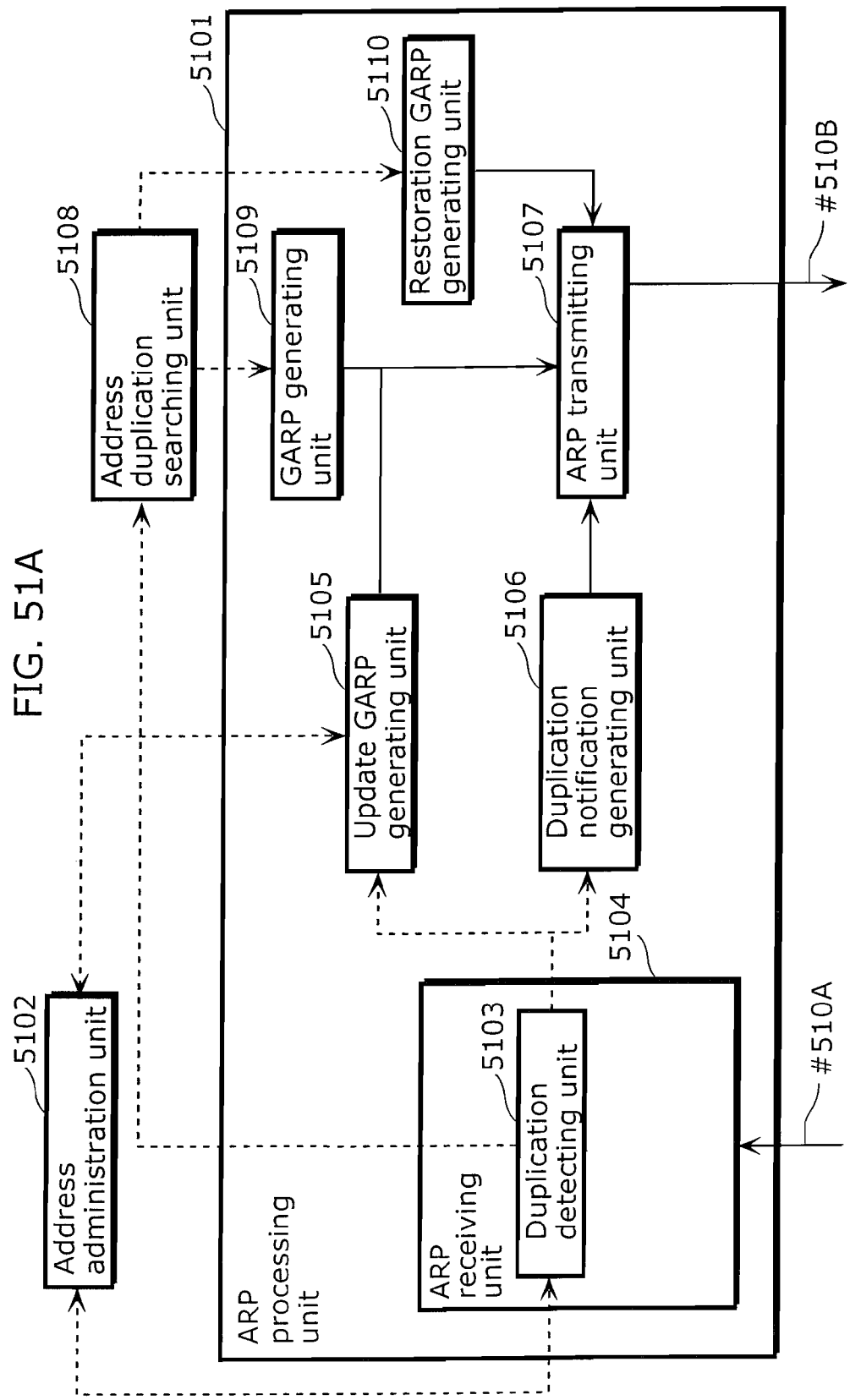
FIG. 51A is a diagram showing an exemplary function configuration of an ARP processing unit of a communication device according to the sixth embodiment of the present invention.

On the basis of the above-mentioned points, the communication device in the present embodiment is described below.
<Network Configuration>
The network configuration is similar to that of the first embodiment. However, in the device A1002, the IP address "192.168.0.100" may be already set for the device A1002, or may be not set up.
<Configuration of Communication Device>
Note that the configuration of the communication device in the present embodiment is similar to that of the first embodiment. Hence, the description is omitted.
<Function Configuration>
The function configuration of the present embodiment is similar to that of the first embodiment. Hence, the description is omitted.
<Detailed Function Configuration>
FIG. 51A is a diagram showing an exemplary function configuration of an ARP processing unit, an address administration unit and an address duplication searching unit of a communication device according to the present embodiment. Note that among the arrows in the figure, a dash-dotted line indicates a control information flow, while a solid line indicates a packet flow.

The ARP processing unit 5101 corresponds to the ARP processing unit 1203 of FIG. 12 and, in this example, includes a duplication detecting unit 5103, an ARP receiving unit 5104, an update GARP generating unit 5105, a duplication notification generating unit 5106, an ARP transmitting unit 5107, a GARP generating unit 5109 and a restoration GARP generating unit 5110. Note that description is omitted for functions similar to those of the first embodiment.

(a) Address Administration Unit 5102
Note that the address administration unit 5102 of the present embodiment is similar to that of the first embodiment. Hence, the description is omitted.

(b) Duplication Detecting Unit 5103
When the transmitting source IP address of the received ARP packet matches the IP address of the device A1002 managed by the address administration unit 5102, the duplication detecting unit 5103 issues a duplication detection notification to the update GARP generating unit 5105 and the duplication notification generating unit 5106.

Further, in a state that the address duplication searching unit 5108 is performing address duplication search for the device A1002 (see function unit (g) address duplication searching unit), when the transmitting source IP address of the received ARP packet matches the IP address of address duplication search, the duplication detecting unit 5103 issues a duplication detection notification to the address duplication searching unit 5108.

Here, these duplication detection notifications include the transmitting source DL address of the received GARP packet and the transmitting source DL address of the received ARP packet. Note that the received GARP packet or the received ARP packet itself may be transferred as the duplication detection notification.

(c) ARP Receiving Unit 5104

Note that the ARP receiving unit 5104 of the present embodiment is similar to that of the first embodiment. Hence, the description is omitted.

(d) Update GARP Generating Unit 5105

The update GARP generating unit 5105 of the present embodiment is similar to that of the first embodiment. Hence, the description is omitted.

(e) Duplication Notification Generating Unit 5106

The duplication notification generating unit 5106 of the present embodiment is similar to that of the first embodiment. Hence, the description is omitted.

(f) ARP Transmitting Unit 5107

The ARP transmitting unit 5107 of the present embodiment is similar to that of the first embodiment. Hence, the description is omitted.

(g) Address Duplication Searching Unit 5108

The address duplication searching unit 5108 notifies an IP address for address duplication search (referred to as a duplication search IP address, hereinafter) to the GARP generating unit 5109. Further, when accepting the duplication detection notification from the duplication detecting unit 5103, the address duplication searching unit 5108 issues a restoration GARP generation notification to the restoration GARP generating unit 5110. Here, the restoration GARP generation notification includes the duplication search IP address and the transmitting source DL address included in the duplication detection notification.

Meanwhile, when a duplication detection notification is not accepted even after a predetermined time has elapsed, the address duplication searching unit 5108 concludes that there is no communication device having a duplicated IP address on the network 1001, and hence terminates the address duplication search processing. Here, the state in which the address duplication searching unit 5108 is waiting for the predetermined time is adopted as an address duplication search state.

(h) GARP Generating Unit 5109

When accepting the duplication search IP address from the address duplication searching unit 5108, the GARP generating unit 5109 generates a Gratuitous ARP packet (referred to as a GARP packet, hereinafter). At this time, in the generating of the GARP packet, the accepted duplication search IP address is set up as the transmitting source IP address 5006 and the destination IP address 5008. The DL address of the device A1002 managed by the address administration unit 5102 is set up as the transmitting source DL address 5005. The destination DL address 5007 is not set up. Then, the GARP packet generated as described here is transferred to the ARP transmitting unit 5107.

Note that the DL address of the device A1002 need not be managed by the address administration unit 5102, and may be acquired directly from the communication unit 1102.

(i) Restoration GARP Generating Unit 5110

When accepting the restoration GARP generation notification from the address duplication searching unit 5108, the restoration GARP generating unit 5110 generates a Gratuitous ARP packet (referred to as a restoration GARP packet, hereinafter) on the basis of the accepted restoration GARP generation notification. At this time, in the generating of the restoration GARP packet, the transmitting source DL address included in the accepted restoration GARP generation notification is set up as the transmitting source DL address 5005. The duplication search IP address included in the accepted restoration GARP generation notification is set up as the transmitting source IP address 5006 and the destination IP address 5008. The destination DL address 5007 is not set up.

Then, the restoration GARP packet generated as described here is transferred to the ARP transmitting unit 5107.

Note that the DL address of the device A1002 need not be managed by the address administration unit 5102, and may be acquired directly from the communication unit 1102.

Further, the restoration GARP generating unit 5110 may generate a plurality of restoration GARP packets and then transfer the generated plurality of restoration GARP packets to the ARP transmitting unit 5107.

<Sequence of Duplication Detection Using GARP>

Figure 46:
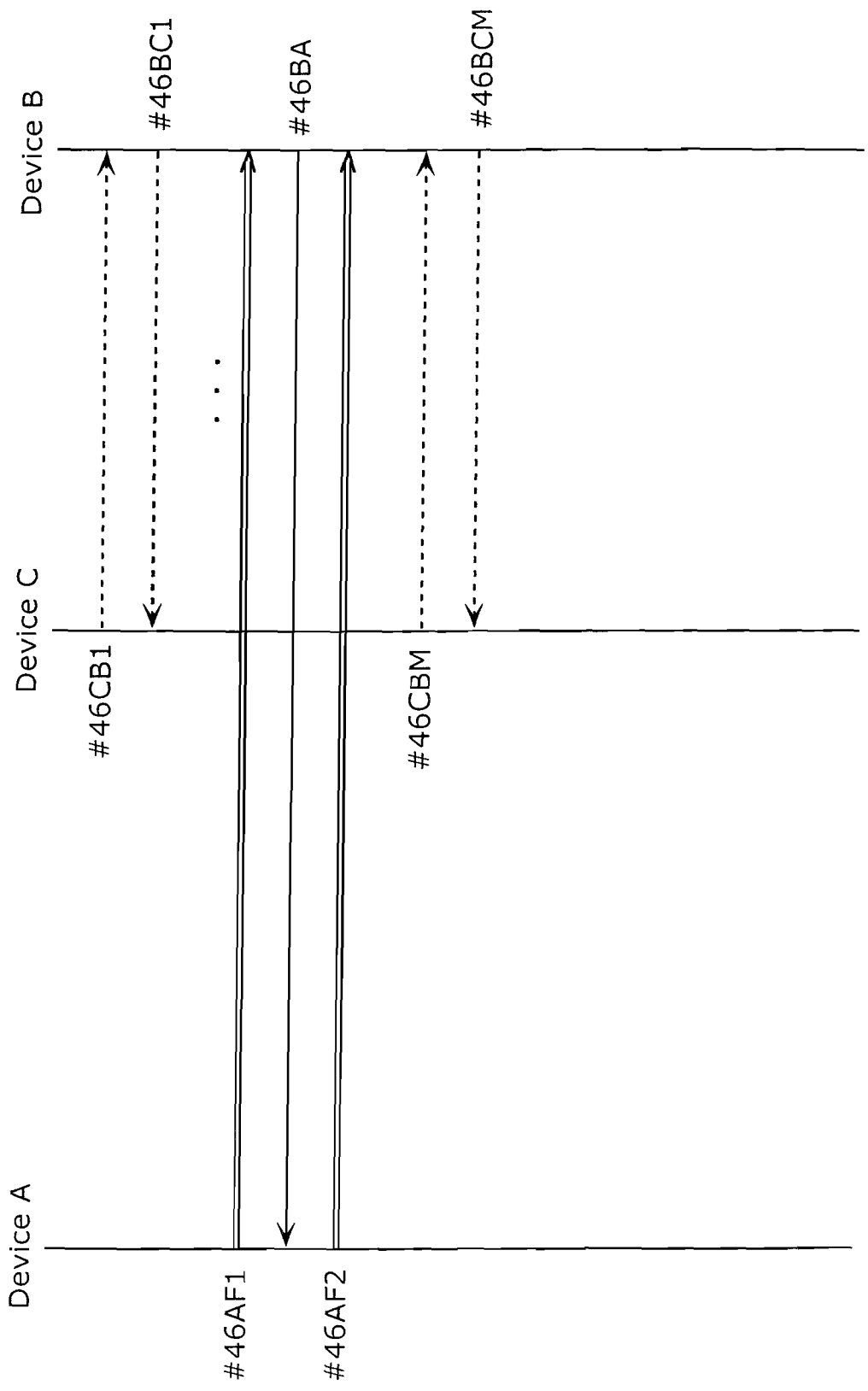
FIG. 46 is a diagram showing a sequence of a communication device according to the sixth embodiment of the present invention.

FIG. 46 is a diagram showing a sequence of a communication device in the present embodiment. As shown in FIG. 46, in contrast to the first embodiment, when duplication detection using GARP is performed by the device A1002, the following packet exchange is performed by the device A1002, the device B1003 and the device C1004.

(a) Operation Before Duplication Detection

The device B1003 and the device C1004 communicate with each other (#46CB1, #46BC1). At this time, the situation of the ARP table in the device C1004 is as shown in FIG. 47.

Here, the device A1002 is connected to the network 1001 and transmits a GARP packet for duplication detection (#46AF1).

(b) Operation of Device C1004

The device C1004 receives the GARP packet (#46AF1) broadcasted from the device A1002 to the network 1001, and analyzes the contents of the received GARP packet (#46AF1) so as to search the ARP table managed by the device C1004 for an entry having duplication with the transmitting source IP address of the received GARP packet (#46AF1).

As a result of the search, in this case, the search hits the entry of the device B1003 with which communication has been performed until that time. Then, the hit entry is overwritten with the information of the received GARP packet (#46AF1). As a result, the ARP table of the device C1004 is overwritten with the GARP packet (#46AF1) as shown in FIG. 48.

(c) Operation of Device B1003

The device B1003 receives the GARP packet (#46AF1) broadcasted from the device A1002 to the network 1001. The device B1003 detects that the transmitting source IP address of the received GARP packet (#46AF1) is duplicated with the IP address having been set for the device B1003, and then transmits to the device A1002 a duplication notification ARP packet (#46BA) for notifying that the IP address is duplicated.

(d) Operation of Device A1002 after Transmission of Duplication Notification ARP Packet (#46BA) from Device B1003

The device A1002 receives the duplication notification ARP packet (#46BA) transmitted from the device B1003. On the basis of the received duplication notification ARP packet (#46BA), duplication of the IP address is detected. As shown in FIG. 50, a restoration GARP packet (#46AF2) is generated in which the DL address "BB:BB:BB:BB:BB:BB" of the device B1003 which is the transmitting source DL address of the received duplication notification ARP packet is set up as the transmitting source DL address 5005. The generated restoration GARP packet (#46AF2) is transmitted.

Note that as shown in FIG. 50, in the restoration GARP packet (#46AF2) transmitted from the device A1002, data link layer broadcast of "FF:FF:FF:FF:FF:FF" is set up as the destination DL address 5009 of the DL header part 5001. "AA:AA:AA:AA:AA:AA" which is the DL address of the device A1002 is set up as the transmitting source DL address 5010.

(e) Operation of Device C1004 after Restoration GARP Packet (#46AF2) Transmission from Device A1002

The device C1004 receives the restoration GARP packet (#46AF2) broadcasted from the device A1002 to the network 1001, and analyzes the contents of the received restoration GARP packet (#46AF2) so as to search the ARP table managed by the device C1004. As a result of the search, the search hits the entry of the device B1003 overwritten with the GARP packet (#46AF1) generated by the duplication detection of the device A1002. The hit entry is overwritten with the information of the restoration GARP packet (#46AF2). As a result, the ARP table of the device C1004 is overwritten with the restoration GARP packet (#46AF2) as shown in FIG. 49.

(f) Operation after Duplication Detection

As a result of the above-mentioned sequence, the ARP table of the device C1004 returns to the state that is prior to the duplication detection of the device A1002. Thus, the device B1003 and the device C1004 enter a state in which mutual communication is available (#46CBM, #46BCM) similarly to the state prior to the duplication detection.

<Processing Flow in Device A1002>

Next, a processing flow in the device A1002 is described below with reference to FIGS. 51A and 46.

(a) GARP Packet (#46AF1) Transmission Processing

In the device A1002, the IP address "192.168.0.100" with which address duplication detection is to be performed is notified from the address duplication searching unit 5108 to the GARP generating unit 5109.

Note that when the address duplication detection is performed, the IP address "192.168.0.100" need not be set for the device A1002.

When accepting the IP address "192.168.0.100" from the address duplication searching unit 5108, the GARP generating unit 5109 generates a GARP packet (#46AF1) in which the accepted IP address is set up as the destination. The generated GARP packet (#46AF1) is transferred to the ARP transmitting unit 5107.

When accepting the GARP packet (#46AF1) from the GARP generating unit 5109, the ARP transmitting unit 5107 sets up the DL header part 5001 of the accepted GARP packet (#46AF1). Then, the GARP packet (#46AF1) in which the DL header part 5001 has been set up is transmitted by packet (#510B) via the interface processing unit 1201.

(b) Receiving Processing for Duplication Notification ARP Packet (#46BA)

Then, the device A1002 receives the duplication notification ARP packet (#46BA) transmitted from the device B1003. Note that the received duplication notification ARP packet (#46BA) is transferred via the interface processing unit 1201 to the ARP receiving unit 5104 (#510A).

When accepting the ARP packet (#46BA) transferred via the interface processing unit 1201, the duplication detecting unit 5103 in the ARP receiving unit 5104 analyzes the accepted ARP packet (#46BA) and compares the transmitting source IP address 106 of the accepted ARP packet with the IP address with which address duplication search has been performed by the address duplication searching unit 5108. As a result of comparison, when there is a match, the accepted ARP packet (#46BA) is adopted as a duplication notification ARP packet, and the transmitting source DL address of the duplication notification ARP packet (#46BA) is notified to the address duplication searching unit 5108.

Meanwhile, when a duplication notification ARP packet (#46BA) is not received for a predetermined time, the address duplication searching unit 5108 concludes that a communication device having duplication with the IP address "192.168.0.100" with which address duplication search has been performed is not present on the network 1001, and hence terminates the address duplication search.

Note that when accepting the transmitting source DL address from the duplication detecting unit 5103, the address duplication searching unit 5108 issues to the restoration GARP generating unit 5110 a restoration GARP generation notification that includes the accepted transmitting source DL address and the IP address with which address duplication search has been performed.

(c) Restoration GARP Packet (#46AF2) Transmission Processing

When accepting the restoration GARP generation notification from the address duplication searching unit 5108, the restoration GARP generating unit 5110 generates a restoration GARP packet (#46AF2). At this time, as shown in FIG. 50, in the generating of the restoration GARP packet (#46AF2), the restoration GARP generating unit 5110 sets up as the transmitting source DL address 5005 the DL address "BB:BB:BB:BB:BB:BB" of the device B1003 which is the transmitting source DL address included in the accepted restoration GARP generation notification. "192.168.0.100" which is the accepted duplication search IP address is set up as the transmitting source IP address 5006 and the destination IP address 5008. The destination DL address 5007 is not set up. Then, the restoration GARP packet (#46AF2) generated as described here is transferred to the ARP transmitting unit 5107.

When accepting the restoration GARP packet (#46AF2) from the restoration GARP generating unit 5110, the ARP transmitting unit 5107 sets up the DL header part 5001. Then, the restoration GARP packet (#46AF2) in which the DL header part 5001 has been set up is transmitted by packet (#510B) via the interface processing unit 1201. Note that the transmitted restoration GARP packet is as shown in FIG. 50.

<Processing in Case that Device B1003 has Update GARP Transmitting Function>

Figure 78:
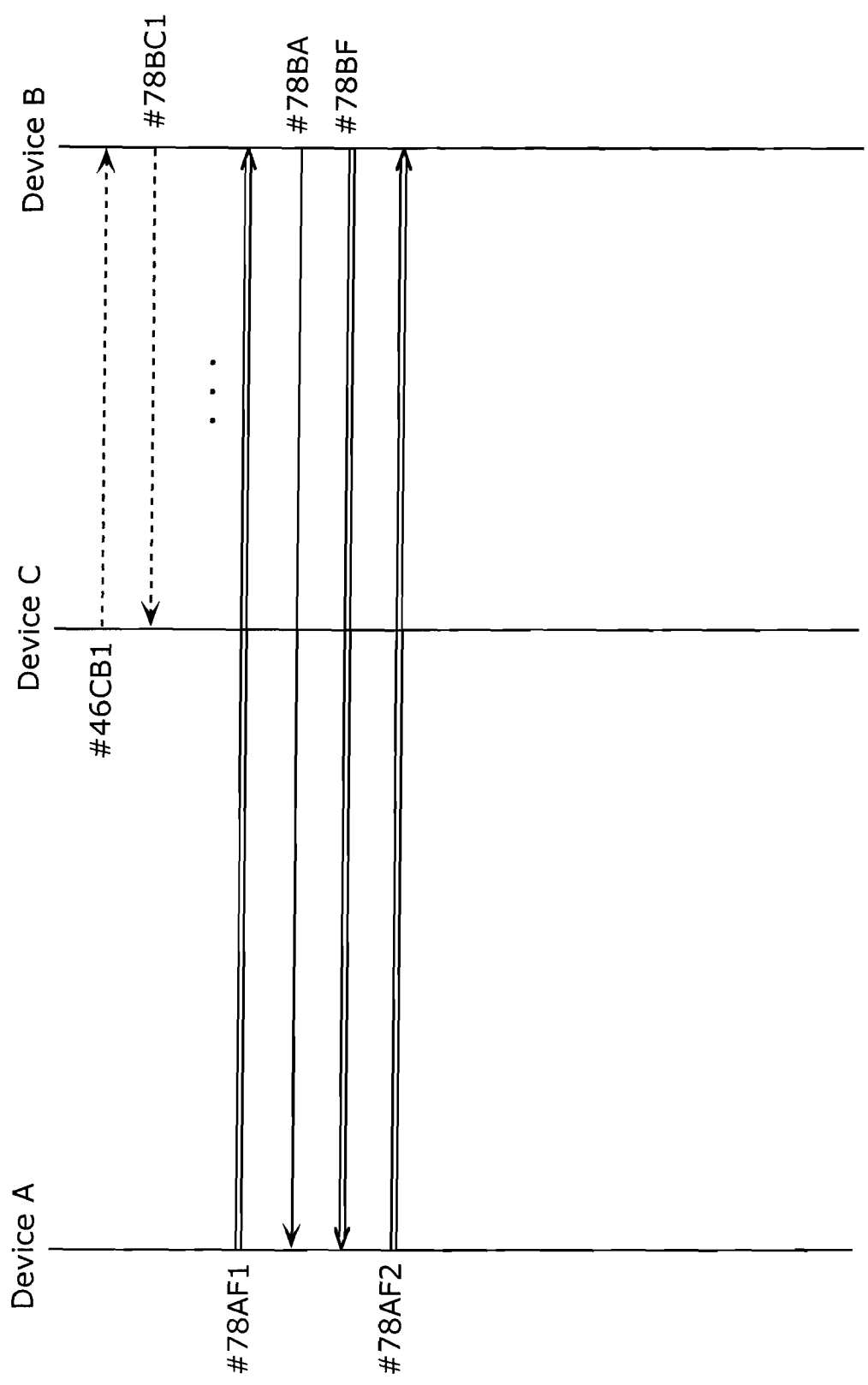
FIG. 78 is a diagram showing a sequence of a communication device according to the sixth embodiment of the present invention.

An embodiment is described below with reference to FIG. 78 for a case that the device B1003 has the function of transmitting a duplication notification ARP packet notifying duplication and an update GARP packet when a GARP packet for duplication detection of the device A1002 is received.

The sequence is the same as that described above until the step in which the device B1003 receives the GARP packet (#78AF1) transmitted from the device A1002 and transmits a duplication notification ARP packet (#78BA).

Then, after receiving the GARP packet (#78AF1) transmitted from the device A1002, the device B1003 transmits an update GARP packet (#78BF) in order to restore the ARP table of the device B1003.

The device A1002 receives the update GARP packet (#78BF) transmitted from the device B1003, but neglects the update GARP packet. Note that when receiving the update GARP packet (#78BF) transmitted from the device B1003, the device A1002 may stop the transmission of the restoration GARP packet (#78AF2).

As described above, in the present embodiment, when the device A1002 performs duplication detection, the rewritten ARP table of the device C1004 can be restored. This permits restoration of communication with the device B1003 and the device C1004.

Further, even in a case that the device that performs duplication detection on the network has an update GARP packet transmitting function, communication restoration is achieved satisfactorily.

Seventh Embodiment

The seventh embodiment of the present invention is described below with reference to the drawings.

<Outline>

A communication device in the present embodiment has the features of the following (C19) to (C21).

(C19) The communication device further includes a duplication monitoring unit that outputs that the network layer address of the present communication device is duplicated on the network connected to the present communication device, when an address duplication notification is accepted from the address duplication searching unit. The address duplication searching unit transfers an address duplication notification to the duplication monitoring unit when a duplication ARP packet in which the network layer address of the transmitting source matches the network layer address of the present communication device is received and when the address duplication notification is received from the duplication detecting unit.

(C20) The address duplication searching unit transfers to the duplication monitoring unit the data link layer address of the transmitting source of the duplication ARP packet in a manner included in the address duplication notification. The duplication monitoring unit outputs the data link layer address of the transmitting source of the duplication ARP packet included in the address duplication notification.

(C21) The address duplication searching unit transfers to the duplication monitoring unit the network layer address of the transmitting source of the duplication ARP packet in a manner included in the address duplication notification. The duplication monitoring unit outputs the network layer address of the transmitting source of the duplication ARP packet included in the address duplication notification.

On the basis of the above-mentioned points, the communication device in the present embodiment is described below.

<Network Configuration>

The network configuration of the present embodiment is similar to that of the sixth embodiment. Hence, the description is omitted.

<Configuration of Communication Device>

The configuration of the communication device in the present embodiment is similar to that of the sixth embodiment. Hence, the description is omitted.

<Function Configuration>

Note that the function configuration of the present embodiment is similar to that of the sixth embodiment. Hence, the description is omitted.

<Detailed Function Configuration>

Figure 51B:
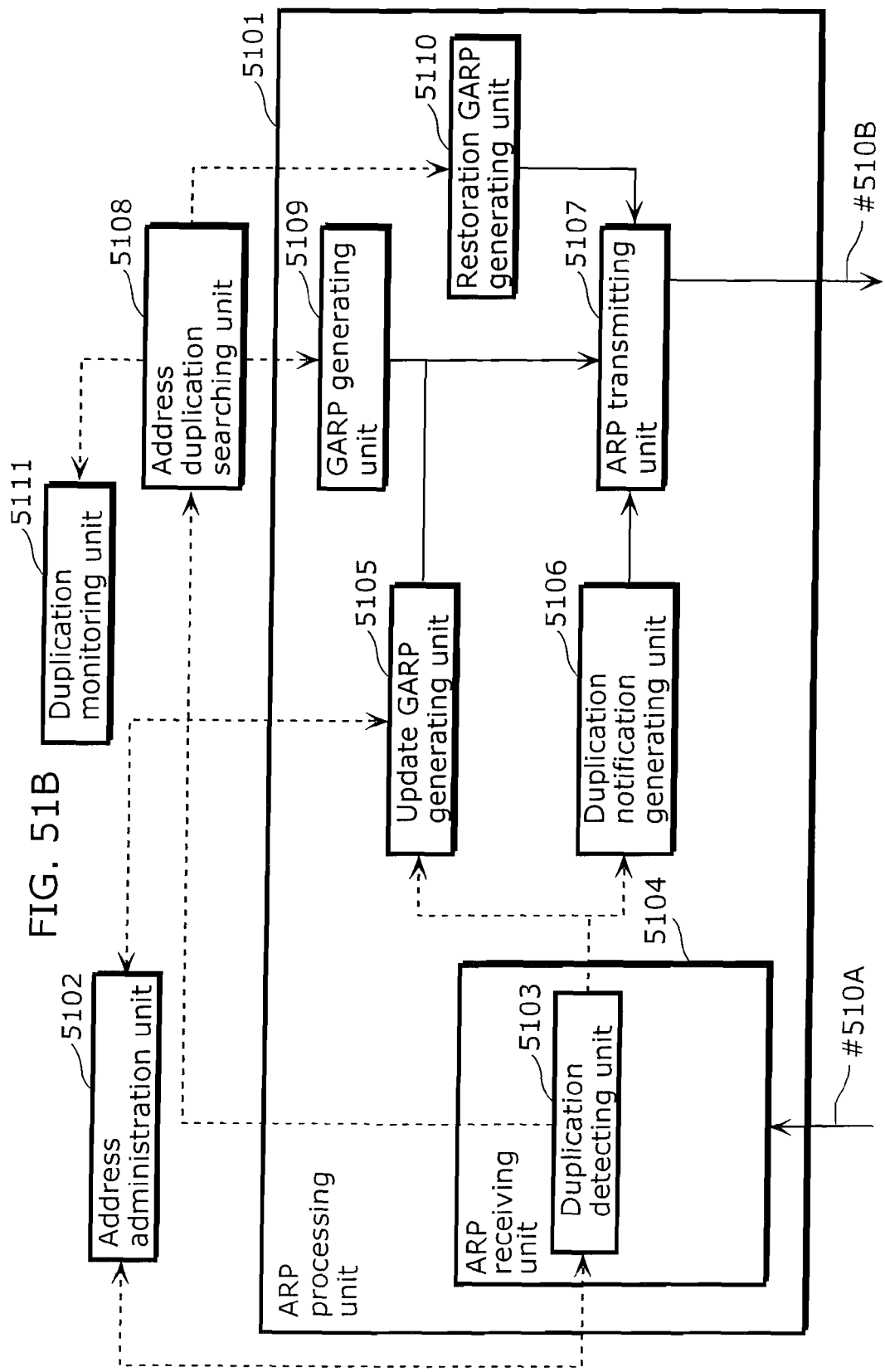
FIG. 51B is a diagram showing an exemplary function configuration of an ARP processing unit of a communication device according to the seventh embodiment of the present invention.

FIG. 51B is a diagram showing an exemplary function configuration of an ARP processing unit, an address administration unit, an address duplication searching unit and a duplication monitoring unit according to the present embodiment. Note that among the arrows in the figure, a dash-dotted line indicates a control information flow, while a solid line indicates a packet flow.

The ARP processing unit 5101 corresponds to the ARP processing unit 1203 of FIG. 12 and, in this example, includes a duplication detecting unit 5103, an ARP receiving unit 5104, an update GARP generating unit 5105, a duplication notification generating unit 5106, an ARP transmitting unit 5107, an address duplication searching unit 5108, a GARP generating unit 5109 and a restoration GARP generating unit 5110. Note that description is omitted for functions similar to those of the sixth embodiment.

(a) Address Administration Unit 5102

The address administration unit 5102 is similar to that of the sixth embodiment. Hence, the description is omitted.

(b) Duplication Detecting Unit 5103

Note that the duplication detecting unit 5103 is similar to that of the sixth embodiment. Hence, the description is omitted.

(c) ARP Receiving Unit 5104

Note that the ARP receiving unit 5104 is similar to that of the sixth embodiment. Hence, the description is omitted.

(d) Update GARP Generating Unit 5105

Note that the update GARP generating unit 5105 is similar to that of the sixth embodiment. Hence, the description is omitted.

(e) Duplication Notification Generating Unit 5106

Note that the duplication notification generating unit 5106 is similar to that of the sixth embodiment. Hence, the description is omitted.

(f) ARP Transmitting Unit 5107

Note that the ARP transmitting unit 5107 is similar to that of the sixth embodiment. Hence, the description is omitted.

(g) Address Duplication Searching Unit 5108

The address duplication searching unit 5108 notifies an IP address for address duplication search (referred to as a duplication search IP address, hereinafter) to the GARP generating unit 5109. Further, when accepting the duplication detection notification from the duplication detecting unit 5103, the address duplication searching unit 5108 issues a restoration GARP generation notification to the restoration GARP generating unit 5110. Here, the restoration GARP generation notification includes the duplication search IP address and the transmitting source DL address included in the duplication detection notification.

Meanwhile, when a duplication detection notification is not accepted even after a predetermined time has elapsed, the address duplication searching unit 5108 concludes that there is no communication device having a duplicated IP address on the network 1001, and hence terminates the address duplication search processing.

Further, the address duplication searching unit 5108 transfers the duplication detection notification to the duplication monitoring unit 5111.

(h) GARP Generating Unit 5109

Note that the GARP generating unit 5109 is similar to that of the sixth embodiment. Hence, the description is omitted.

(i) Restoration GARP Generating Unit 5110

The restoration GARP generating unit 5110 is similar to that of the sixth embodiment. Hence, the description is omitted.

(j) Duplication Monitoring Unit 5111

When accepting the duplication detection notification from the address duplication searching unit 5108, the duplication monitoring unit 5111 recognizes the occurrence of IP address duplication on the network 1001.

Note that when the duplication detection notification is accepted from the address duplication searching unit 5108, the duplication monitoring unit 5111 may have the functions of turning ON an LED when the LED is provided in the device A1002, displaying the duplication when a display function is provided, and generating sound when a speaker is provided.

Further, the DL address of the communication device in which duplication has been detected may be displayed, while the actual IP address causing duplication may be outputted as information.

<Sequence of Duplication Detection Using GARP>

Note that the sequence of the duplication detection using GARP according to the present embodiment is similar to that of the sixth embodiment. Hence, the description is omitted.

<Processing Flow in Device A1002>

Next, a processing flow in the device A1002 is described below with reference to FIGS. 51B and 46.

(a) GARP Packet (#46A1) Transmission Processing

Here, GARP packet (#46AF1) transmission processing is similar to that of the sixth embodiment. Hence, the description is omitted.

(b) Receiving Processing for Duplication Notification ARP Packet (#46BA)

Note that, in the receiving processing for the duplication notification ARP packet (#46BA), the following processing is performed in addition to the processing similar to the sixth embodiment.

When accepting the notification of the transmitting source DL address, the address duplication searching unit 5108 transfers a duplication notification to the duplication monitoring unit 5111.

When accepting the duplication notification from the address duplication searching unit 5108, the duplication monitoring unit 5111 outputs that the address is duplicated. Note that the duplication monitoring unit 5111 may have the functions of turning ON an LED when the LED is provided in the device A1002, displaying the duplication when a display function is provided, and generating sound when a speaker is provided. Further, the DL address of the communication device in which duplication has been detected may be displayed, while the actual IP address causing duplication may be outputted as information.

(c) Restoration GARP Packet (#46AF2) Transmission Processing

Note that restoration GARP packet (#46AF2) transmission processing is similar to that of the sixth embodiment. Hence, the description is omitted.

As described above, in the present embodiment, when the device A1002 performs address duplication detection, the rewritten ARP table of the device C1004 can be restored. Further, the user can be notified that IP address duplication occurs on the network 1001.

Eighth Embodiment

The eighth embodiment of the present invention is described below with reference to the drawings.

<Outline>

A communication device in the present embodiment has the features of the following (C22) to (C24).

(C22) The restoration GARP generating unit generates a plurality of restoration GARP packets when a restoration GARP generation notification is accepted from the address duplication searching unit. The ARP transmitting unit transmits the plurality of restoration GARP packets generated by the restoration GARP generating unit.

(C23) The communication device further includes a restoration GARP delaying unit that delays by a predetermined time a restoration GARP packet accepted from the restoration GARP generating unit and transfer it to the ARP transmitting unit. The restoration GARP generating unit generates a plurality of restoration GARPs, then transfers to the ARP transmitting unit at least one of the generated restoration GARP packets, and transfers to the restoration GARP delaying unit at least one of the generated restoration GARP packets.

(C24) The address duplication searching unit stops to transfer the address duplication notification to the restoration GARP generating unit, when the address duplication notification is accepted and when the restoration GARP delaying unit is delaying by a predetermined time the restoration GARP packet having already been accepted from the restoration GARP generating unit.

On the basis of the above-mentioned points, the communication device in the present embodiment is described below.

<Network Configuration>

The network configuration is similar to that of the third embodiment. However, in the device A2402, the IP address "192.168.0.100" may be already set for the device A2402, or may not be set for the device A2402.

<Configuration of Communication Device>

Note that the configuration of the communication device in the present embodiment is similar to that of the first embodiment. Hence, the description is omitted.

<Function Configuration>

Note that the function configuration of the present embodiment is similar to that of the first embodiment. Hence, the description is omitted.

<Detailed Function Configuration>

Figure 52:
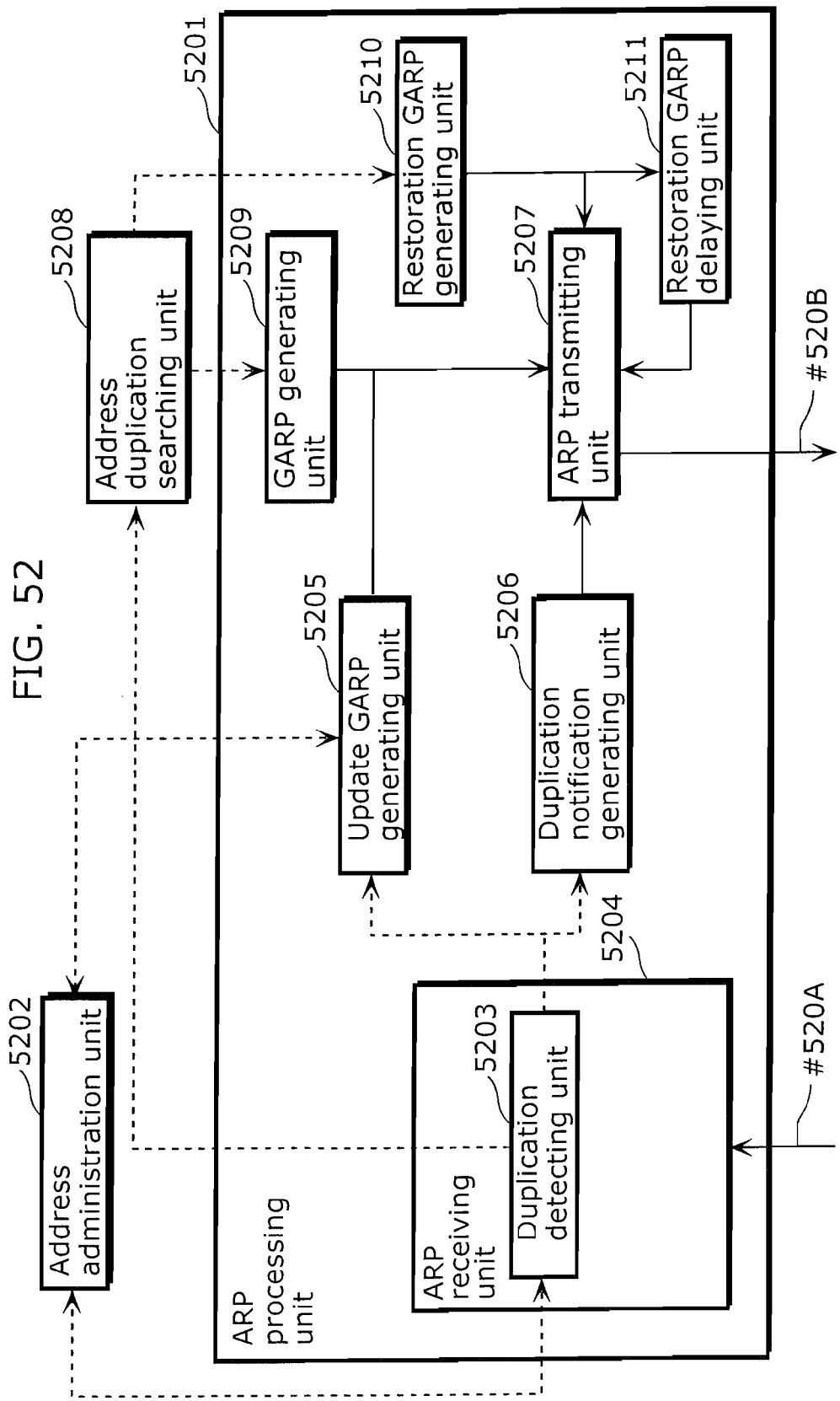
FIG. 52 is a diagram showing an exemplary function configuration of an ARP processing unit of a communication device according to the eighth embodiment of the present invention.

FIG. 52 is a diagram showing an exemplary function configuration of an ARP processing unit, an address administration unit and an address duplication searching unit of a communication device according to the present embodiment. Note that among the arrows in the figure, a dash-dotted line indicates a control information flow, while a solid line indicates a packet flow.

The ARP processing unit 5201 corresponds to the ARP processing unit 1203 of FIG. 12 and, in this example, includes a duplication detecting unit 5203, an ARP receiving unit 5204, an update GARP generating unit 5205, a duplication notification generating unit 5206, an ARP transmitting unit 5207, a GARP generating unit 5209, a restoration GARP generating unit 5210 and a restoration GARP delaying unit 5211. Note that description is omitted for functions similar to those of the sixth embodiment.

(a) Address Administration Unit 5202

Note that the address administration unit 5202 is similar to that of the sixth embodiment. Hence, the description is omitted.

(b) Duplication Detecting Unit 5203

Note that the duplication detecting unit 5203 is similar to that of the sixth embodiment. Hence, the description is omitted.

(c) ARP Receiving Unit 5204

Note that the ARP receiving unit 5204 is similar to that of the sixth embodiment. Hence, the description is omitted.

(d) Update GARP Generating Unit 5205

Note that the update GARP generating unit 5205 is similar to that of the sixth embodiment. Hence, the description is omitted.

(e) Duplication Notification Generating Unit 5206

Note that the duplication notification generating unit 5206 is similar to that of the sixth embodiment. Hence, the description is omitted.

(f) ARP Transmitting Unit 5207

Note that the ARP transmitting unit 5207 is similar to that of the sixth embodiment. Hence, the description is omitted.

(g) Address Duplication Searching Unit 5208

The address duplication searching unit 5208 notifies an IP address for address duplication search (referred to as a duplication search IP address, hereinafter) to the GARP generating unit 5209. Further, when accepting the duplication detection notification from the duplication detecting unit 5203, the address duplication searching unit 5208 issues a restoration GARP generation notification to the restoration GARP generating unit 5210. Here, the restoration GARP generation notification includes the duplication search IP address and the transmitting source DL address included in the duplication detection notification.

Meanwhile, when a duplication detection notification is not accepted even after a predetermined time has elapsed, the address duplication searching unit 5208 concludes that there is no communication device having a duplicated IP address on the network 2401, and hence terminates the address duplication search processing.

(h) GARP Generating Unit 5209

The GARP generating unit 5209 is similar to that of the sixth embodiment. Hence, the description is omitted.

(i) Restoration GARP Generating Unit 5210

When accepting the restoration GARP generation notification from the address duplication searching unit 5208, the restoration GARP generating unit 5210 generates a Gratuitous ARP packet (referred to as a restoration GARP packet, hereinafter) on the basis of the accepted restoration GARP generation notification. At this time, the transmitting source DL address included in the accepted restoration GARP generation notification is set up as the transmitting source DL address 5005. The duplication search IP address included in the accepted restoration GARP generation notification is set up as the transmitting source IP address 5006 and the destination IP address 5008. The destination DL address 5007 is not set up. Then, a plurality of the restoration GARP packets generated as described here are transferred separately to the ARP transmitting unit 5107 and the restoration GARP delaying unit 5211.

For example, when three or more update GARP packets are generated, the restoration GARP generating unit 5210 may transfer one restoration GARP packet to the ARP transmitting unit 5207 and transfer the remaining restoration GARP packets to the restoration GARP delaying unit 5211. In contrast, the restoration GARP generating unit 5210 may transfer one restoration GARP packet to the restoration GARP delaying unit 5211 and transfer the remaining restoration GARP packets to the ARP transmitting unit 5207.

(j) Restoration GARP Delaying Unit 5211

When accepting an update GARP packet from the restoration GARP generating unit 5210, the restoration GARP delaying unit 5211 does not immediately transfer the accepted restoration GARP packet to the ARP transmitting unit 5207, and holds it until a predetermined time T elapses. When a predetermined time T has elapsed, the accepted restoration GARP packet is transferred to the ARP transmitting unit 5207. In the following description, the restoration GARP packet transferred to the ARP transmitting unit 5207 in such a delayed manner is referred to as a delayed restoration GARP packet in some cases.

<Sequence of Duplication Detection Using GARP>

Figure 53:
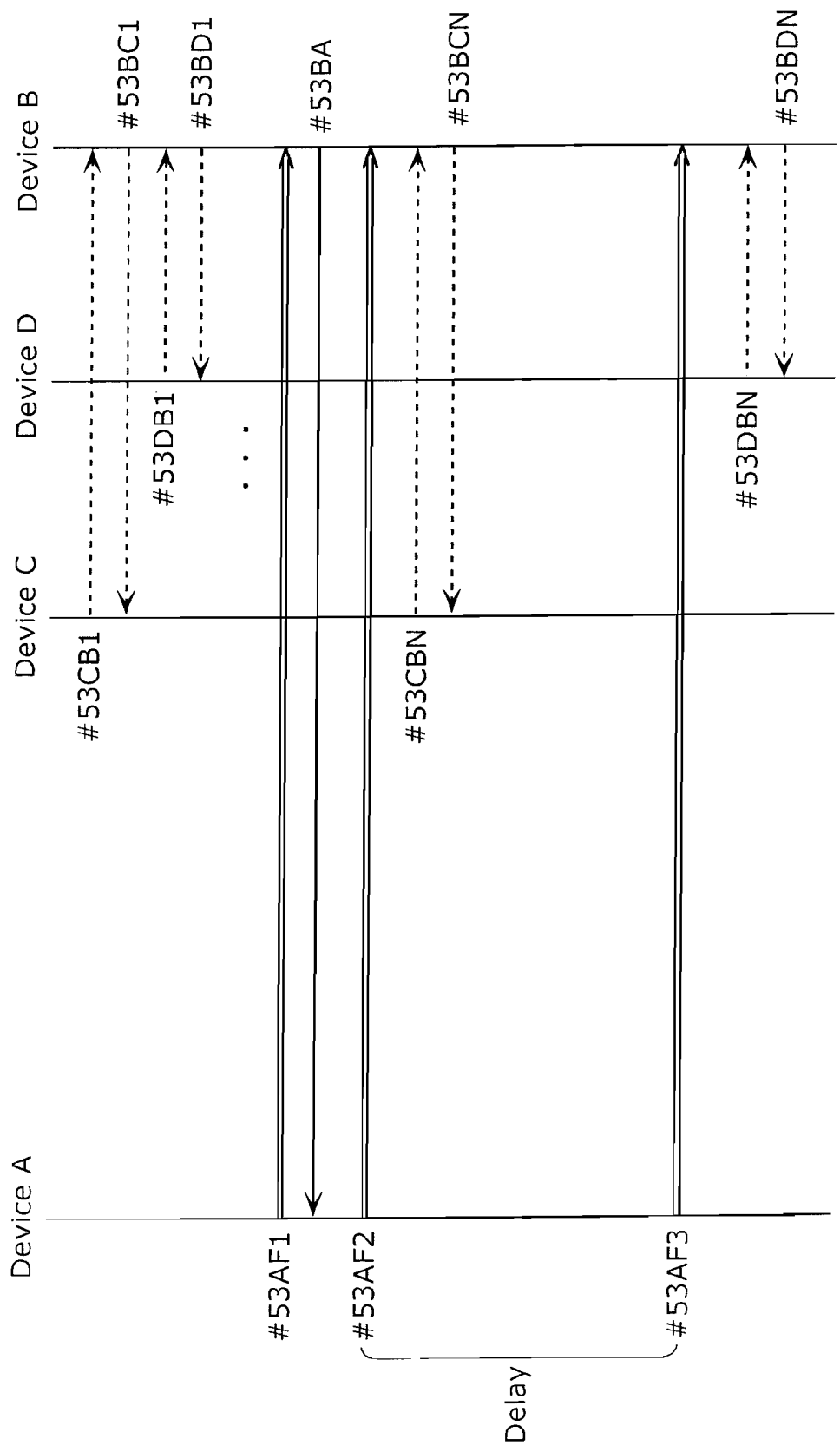
FIG. 53 is a diagram showing a sequence of a communication device according to the eighth embodiment of the present invention.

FIG. 53 is a diagram showing a sequence of a communication device in the present embodiment. As shown in FIG. 53, in contrast to the third embodiment, when duplication detection using GARP is performed by the device A2402, the following packet exchange is performed by the device A2402, the device B2403, the device C2404 and the device D2405.

(a) Operation Before Duplication Detection

The device B2403, the device C2404 and the device D2405 communicate with each other (#53CB1, #53BC1 and #53DB1, #53BD1). At this time, the situation of the ARP table in the device C2404 is as shown in FIG. 54, while the situation of the ARP table in the device D2405 is as shown in FIG. 55.

Then, the device A2402 is connected to the network 2401, so that the device A2402 transmits a GARP packet for duplication detection (#53AF1).

(b) Operation of Device C2404

The device C2404 receives the GARP packet (#53AF1) broadcasted from the device A2402 to the network 2401, and analyzes the contents of the received GARP packet (#53AF1) so as to search for an entry having duplication with the transmitting source IP address of the received GARP packet in the ARP table managed by the device C2404. As a result of the search, in this case, the search hits the entry of the device B2403 with which communication has been performed until that time. Then, the hit entry is overwritten with the information of the received GARP packet (#53AF1). As a result, the ARP table of the device C2404 is overwritten with the GARP packet (#53AF1) as shown in FIG. 56.

(c) Operation of Device D2405

The device D2405 receives the GARP packet (#53AF1) broadcasted from the device A2402 to the network 2401. Then, the device D2405 analyzes the contents of the received GARP packet (#53AF1) so as to search the ARP table managed by the device D2405 for an entry having duplication with the transmitting source IP address of the received GARP packet. As a result of the search, in this case, the search hits the entry of the device B2403 with which communication has been performed until that time. The hit entry is overwritten with the information of the received GARP packet (#53AF1). At this time, by a reason similar to the case that the "time until the update is accepted" is 0 in FIG. 55, since sufficient time has not yet elapsed after the ARP table was updated, the hit entry can be updated immediately. As a result, the ARP table of the device D2405 is overwritten with the update GARP packet (#53AF1) as shown in FIG. 57. Further, the time until the update is accepted is initialized and set to be a predetermined time of U seconds.

(d) Operation of Device B2403

The device B2403 receives the GARP packet (#53AF1) broadcasted from the device A2402 to the network 2401. The device B2403 detects that the received GARP packet (#53AF1) has duplication with the IP address having been set for the device B2403, and then transmits to the device A2402 a duplication notification ARP packet (#53BA) for notifying that the IP address is duplicated.

(e) Operation of Device A2402 after Transmission of Duplication Notification ARP Packet (#53BA) from Device B2403

The device A2402 receives the duplication notification ARP packet (#53BA) transmitted from the device B2403. On the basis of the received duplication notification ARP packet (#53BA), duplication of the IP address is detected. As shown in FIG. 50, a restoration GARP packet (#53AF2) is generated in which the DL address "BB:BB:BB:BB:BB:BB" of the device B2403 which is the transmitting source DL address of the received duplication notification ARP packet is set up as the transmitting source DL address 5005. The generated restoration GARP packet (#53AF2) is transmitted.

Note that as shown in FIG. 50, in the restoration GARP packet (#53AF2) transmitted from the device A2402, a data link layer broadcast of "FF:FF:FF:FF:FF:FF" is set up as the destination DL address 5009 of the DL header part 5001. "AA:AA:AA:AA:AA:AA" which is the DL address of the device A2402 is set up as the transmitting source DL address 5010.

(f) Operation of Device C2404 after Restoration GARP Packet (#53AF2) Transmission from Device A2402

The device C2404 receives the restoration GARP packet (#53AF2) broadcasted from the device A2402 to the network 2401, and analyzes the contents of the received restoration GARP packet (#53AF2) so as to search the ARP table managed by the device C2404 for an entry having duplication with the transmitting source IP address of the received restoration GARP packet (#53AF2).

As a result of the search, in this case, the search hits the entry corresponding to the device B2403 overwritten with the GARP packet (#53A1) for duplication detection of the device A2402. Then, the hit entry is overwritten with the information of the received restoration GARP packet (#53AF2). As a result, the ARP table of the device C2404 is overwritten with the restoration GARP packet (#53AF2) as shown in FIG. 58. At this point, the device C2404 can communicate with the device B2403.

(g) Operation of Device D2405 after Restoration GARP Packet (#53AF2) Transmission from Device A2402

The device D2405 receives the restoration GARP packet (#53AF2) broadcasted from the device A2402 to the network 2401, and analyzes the contents of the received restoration GARP packet (#53AF2) so as to search the ARP table managed by the device D2405 for an entry having duplication with the transmitting source IP address of the received restoration GARP packet (#53AF2).

As a result of the search, in this case, the search hits the entry corresponding to the device B2403 overwritten with the GARP packet (#53AF1) for duplication detection of the device A2402. However, since a predetermined time U until the update is accepted has not yet elapsed, the ARP table of the device D2405 is not overwritten and remains as shown in FIG. 57. At this point, the device D2405 cannot communicate with the device B2403.

(h) Operation of Device A2402 after Predetermined Time V has Elapsed Since Transmission of Duplication Notification ARP Packet (#53BA) from the Device B2403

After a predetermined time V has elapsed, the device A2402 broadcasts a delayed restoration GARP packet (#53AF3) to the network 2401. This delayed restoration GARP packet (#53AF3) is the same packet as the restoration GARP packet (#53AF2) transmitted in the processing (e).

(i) Operation of Device C2404 after Delayed Restoration GARP Packet (#53AF3) Transmission from Device A2402

The device C2404 receives the delayed restoration GARP packet (#53AF3) broadcasted from the device A2402 to the network 2401, and analyzes the contents of the received delayed restoration GARP packet (#53AF3) so as to search the ARP table managed by the device C2404 for an entry having duplication with the transmitting source IP address of the received delayed restoration GARP packet (#53AF3).

As a result of the search, in this case, the search hits the entry corresponding to the device B2403 overwritten with the restoration GARP packet (#53AF2) for duplication detection of the device A2402. However, this hit entry has already been corrected with the restoration GARP packet transmitted from the device A2402. Thus, when the delayed restoration GARP packet (#53AF3) is received, no processing is performed so that the entry remains as shown in FIG. 58. Note that the ARP table expiration time may be updated at this time.

(j) Operation of Device D2405 after Delayed Restoration GARP Packet (#53AF3) Transmission from Device A2402

The device D2405 receives the delayed restoration GARP packet (#53AF3) broadcasted from the device A2402 to the network 2401, and analyzes the contents of the received delayed restoration GARP packet (#53AF3) so as to search the ARP table managed by the device D2405 for an entry having duplication with the transmitting source IP address of the received delayed restoration GARP packet (#53AF3).

As a result of the search, in this case, the search hits the entry corresponding to the device B2403 overwritten with the GARP packet (#53AF1) for duplication detection of the device A2402. Further, since a predetermined time V has elapsed for this hit entry after the device B2403 has transmitted the duplication notification ARP packet (#53BA), the time until the update is accepted is 0 seconds as shown in FIG. 59. Thus, the ARP table of the device D2405 is overwritten with the delayed restoration GARP packet (#53AF3) so as to become as shown in FIG. 60. At this point, the device D2405 can communicate with the device B2403.

(k) Operation after Duplication Detection

As a result of the above-mentioned sequence, the ARP tables of the device C2404 and the device D2405 return to the state that is prior to the duplication detection of the device A2402. Thus, the device B2403, the device C2404 and the device D2405 enter a state in which mutual communication is available (#53CBN, #53BCN, #53DBN, #53BDN) similar to the state prior to the duplication detection.

<Processing Flow in Device A2402>

Next, a processing flow in the device A2402 is described below with reference to FIGS. 52 and 53.

(a) GARP Packet (#53AF1) Transmission Processing

In the device A2402, the IP address "192.168.0.100" with which address duplication detection is to be performed is notified From the address duplication searching unit 5208 to the GARP generating unit 5209.

Note that when the address duplication detection is performed, the IP address "192.168.0.100" need not be set for the device A2402.

When accepting the IP address "192.168.0.100" from the address duplication searching unit 5208, the GARP generating unit 5209 generates a GARP packet (#53AF1) in which the accepted IP address is set up as the destination. The generated GARP packet (#53AF1) is transferred to the ARP transmitting unit 5207.

When accepting the GARP packet (#53AF1) from the GARP generating unit 5209, the ARP transmitting unit 5207 sets up the DL header part 5001 of the accepted GARP packet (#53AF1). Then, the GARP packet (#53AF1) in which the DL header part 5001 has been set up is transmitted by packet (#520B) via the interface processing unit 1201.

(b) Receiving Processing for Duplication Notification ARP Packet (#53BA)

Then, the device A2402 receives the duplication notification ARP packet (#53BA) transmitted from the device B2403. Note that the received duplication notification ARP packet (#53BA) is transferred via the interface processing unit 1201 to the ARP receiving unit 5204 (#520A).

When accepting the ARP packet (#53BA) transferred via the interface processing unit 1201, the duplication detecting unit 5203 in the ARP receiving unit 5204 analyzes the received ARP packet (#53BA) and compares the transmitting source IP address 106 of the accepted ARP packet with the IP address with which address duplication search has been performed by the address duplication searching unit 5208. As a result of comparison, when the IP addresses match each other, the accepted ARP packet (#53BA) is adopted as a duplication notification ARP packet, and the transmitting source DL address of the duplication notification ARP packet (#53BA) is notified to the address duplication searching unit 5208.

Meanwhile, when a duplication notification ARP packet (#53BA) is not received for a predetermined time, the address duplication searching unit 5208 determines that a communication device having duplication with the IP address "192.168.0.100" with which address duplication search has been performed is not present on the network 2401, and hence terminates the address duplication search.

Note that when accepting the transmitting source DL address from the duplication detecting unit 5203, the address duplication searching unit 5208 notifies to the restoration GARP generating unit 5210 the accepted transmitting source DL address and the IP address with which address duplication search has been performed.

(c) Restoration GARP Packet (#53AF2) Transmission Processing

When accepting the restoration GARP generation notification from the address duplication searching unit 5208, the restoration GARP generating unit 5210 generates a restoration GARP packet (#53AF2). At this time in the generating of the restoration GARP packet (#53AF2), as shown in FIG. 50, the restoration GARP generating unit 5210 sets up as the transmitting source DL address 5005 the transmitting source DL address "BB:BB:BB:BB:BB:BB" included in the accepted restoration GARP generation notification. The duplication search IP address "192.168.0.100" included in the accepted restoration GARP generation notification is set up as the destination IP address 5008 and the transmitting source IP address 5006. The destination DL address 5007 is not set up. Then, the restoration GARP packet (#53AF2) generated as described here is transferred to the ARP transmitting unit 5207.

Further, the restoration GARP generating unit 5210 copies the generated restoration GARP packet and transfers the copied restoration GARP packet (#53AF3) to the restoration GARP delaying unit 5211.

Rote that the restoration GARP generating unit 5210 may transfer the copied restoration GARP packet (#53AF3) to the restoration GARP delaying unit 5211, or alternatively may transfer to the restoration GARP delaying unit 5211 the transmitting source DL address "BB:BB:BB:BB:BB:BB" included in the restoration GARP generation notification accepted from the address duplication searching unit 5208 and the duplication search IP address "192.168.0.100". At this time, the restoration GARP delaying unit 5211 has the function of generating the restoration GARP packet (#53AF3) in the restoration GARP delaying unit 5211 when the information transferred from the restoration GARP generating unit 5210 is the transmitting source DL address and the duplication search IP address.

Note that when accepting the restoration GARP packet from the restoration GARP generating unit 5210, the ARP transmitting unit 5207 sets up the DL header part 5001. Then, the restoration GARP packet (#53AF3) in which the DL header part 5001 has been set up is transmitted by packet via the interface processing unit 1201. Note that the transmitted restoration GARP packet is as shown in FIG. 50.

(d) Delayed Restoration GARP Packet (#53AF3) Transmission Processing

When accepting an update GARP packet (#53AF3) from the restoration GARP generating unit 5210, the restoration GARP delaying unit 5211 does not immediately transfer the accepted restoration GARP packet to the ARP transmitting unit 5207, and holds it until a predetermined time V elapses. When the predetermined time V has elapsed, the accepted restoration GARP packet (#53AF3) is transferred to the ARP transmitting unit 5207.

Note that when the transmitting source DL address and the duplication search IP address are accepted in place of the restoration GARP packet (#53AF3) from the restoration GARP delaying unit 5211, the restoration GARP delaying unit 5211 generates a restoration GARP packet (#53AF3) after a predetermined time V has elapsed by using the transmitting source DL address and the duplication search IP address which have been received. The generated restoration GARP packet (#53AF3) is transferred to the ARP transmitting unit 5207.

Note that in the restoration GARP packet having been transferred from the restoration GARP delaying unit 5211 to the ARP transmitting unit 5207, the DL header part 5001 is set up, and then the packet is transmitted by packet via the interface processing unit 1201. Here, the transmitted restoration GARP packet is as shown in FIG. 50.

<Processing in Case that Device B2403 has Update GARP Transmitting Function>

Figure 75:
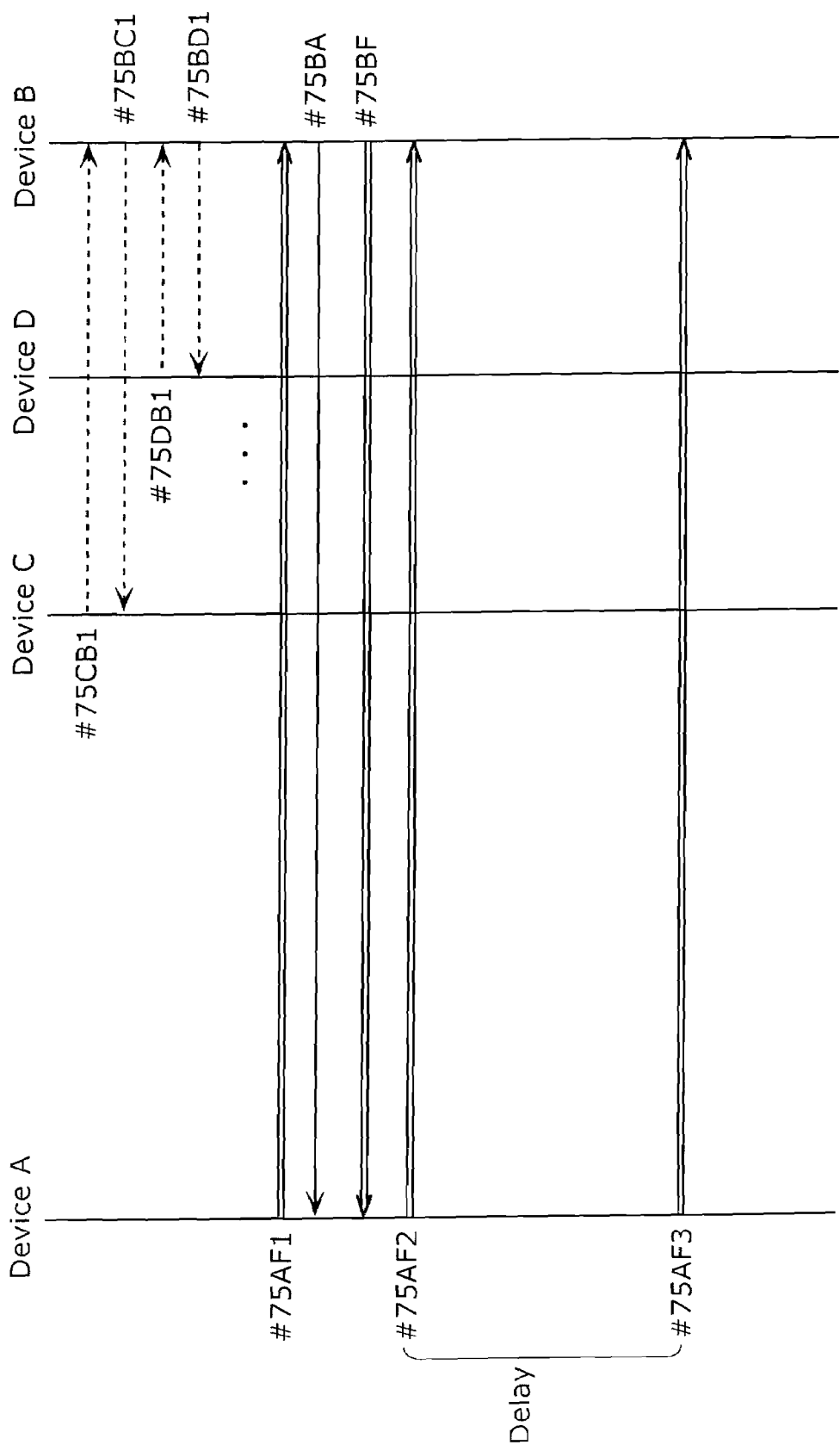
FIG. 75 is a diagram showing a sequence of a communication device according to the eighth embodiment of the present invention.

An embodiment is described below with reference to FIG. 75 for a case that the device B4203 has the function of transmitting a duplication notification ARP packet notifying duplication and an update GARP packet when a GARP packet for duplication detection of the device A4202 is received.

The sequence is the same as that described above until the step that the device B2403 receives the GARP packet (#75AF1) transmitted from the device A2402 and transmits a duplication notification ARP packet (#75BA).

Then, after receiving the GARP packet (#75AF1) transmitted from the device A2402, the device B2403 transmits an update GARP packet (#75BF) in order to restore the ARP table of the device B2403.

The device A2402 receives the update GARP packet (#75BF) transmitted from the device B2403, but neglects it, and transmits a restoration GARP packet (#75AF2). Note that after receiving the update GARP packet (#75BF) transmitted from the device B2403, the device A2402 may stop the transmission of the restoration GARP packet (#75AF2).

Further, after a predetermined time has elapsed, the device A2402 transmits a delayed restoration GARP packet (#75AF3).

As described above, in the present embodiment, when the device B2403 performs address duplication search, restoration is achieved in the rewritten ARP table of the device C2404 and the ARP table of the device D2405 in which update of the ARP table is limited for a predetermined time. This permits restoration of communication with the device A2402, the device C2404 and the device D2405 which have various types of installation.

Further, even in a case that the device that performs duplication search on the network has an update GARP packet transmitting function, The ARP tables of the device C2404 and the device D2405 can be restored satisfactorily.

Ninth Embodiment

The ninth embodiment of the present invention is described below with reference to the drawings.

<Outline>

A communication device in the present embodiment has the following feature (C25).

(C25) The communication device includes: an address duplication searching unit that searches for duplication of a network layer address by using a network layer address for address duplication search; a GARP generating unit that generates a search GARP packet in which the network layer address for address duplication search is set up as the network layer address of the transmission destination; and an ARP search generating unit that generates a search ARP request packet in which the network layer address for address duplication search is set up as the transmission destination network layer address, the transmitting source network layer address is unspecified, the data link layer address of the transmission destination is unspecified, and the data link layer address of the transmitting source is set up as the data link layer address of the present communication device. The ARP transmitting unit transmits the search GARP packet generated by the GARP generating unit, and transmits the search ARP request packet generated by the ARP search generating unit. The duplication detecting unit transfers to the address duplication searching unit an address duplication notification notifying that the network layer address is duplicated, when, during the time that the address duplication searching unit searches for address duplication, the ARP receiving unit receives a duplication ARP packet in which the network layer address of the transmission destination matches the network layer address for address duplication search.

On the basis of the above-mentioned points, the communication device in the present embodiment is described below.

<Network Configuration>

Figure 61:
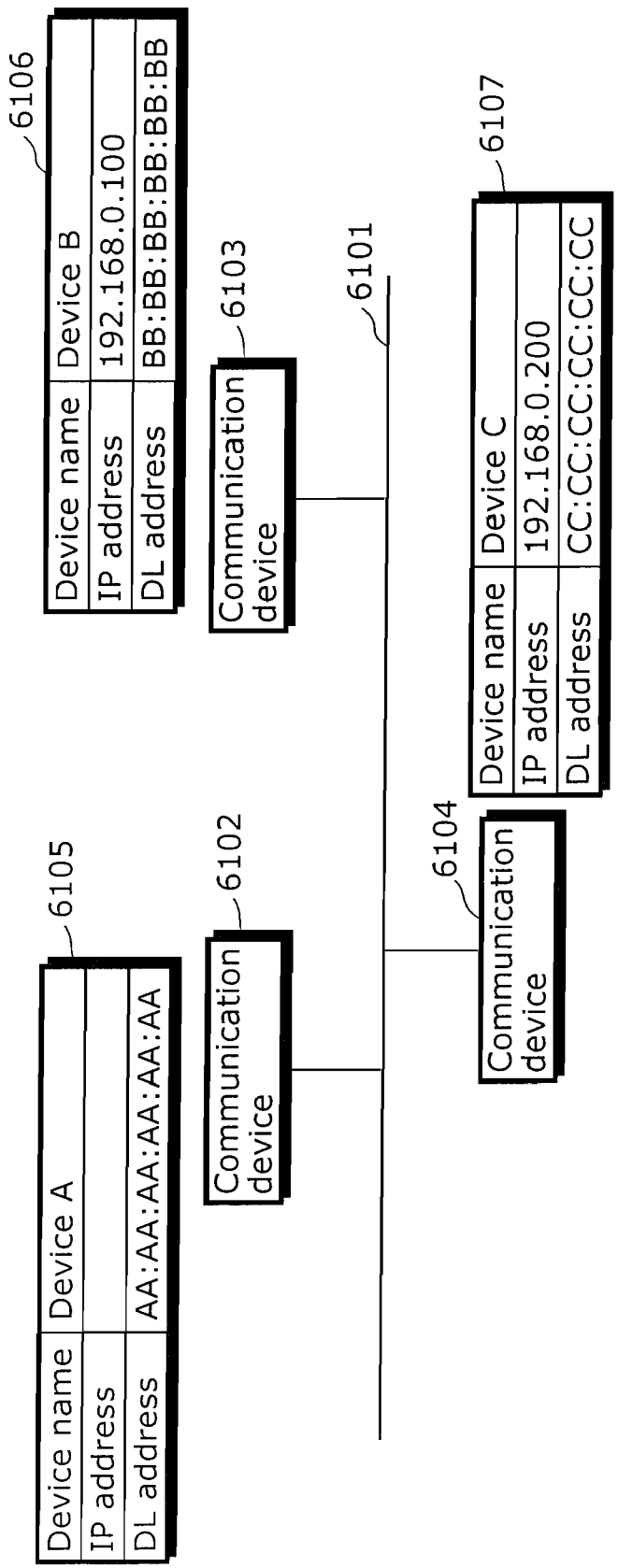
FIG. 61 is a diagram showing a network configuration and an example setting of a communication device according to the ninth embodiment of the present invention.

FIG. 61 is a diagram showing a network configuration and an example setting of a communication device in the present embodiment. As shown in FIG. 61, a communication device 6102 (referred to as a device A6102, hereinafter), a communication device 6103 (referred to as a device B6103, hereinafter) and a communication device 6104 (referred to as a device C6104, hereinafter) are connected to the network 6101. Here, for simplicity of description, the present embodiment is described for the case that the three communication devices are connected to the network 6101. However, even when a plurality of communication devices each corresponding to the device B6103 and communication devices each corresponding to the device C6104 are present, the operation is similar.

The device A6102, the device B6103 and the device C6104 are devices having a communication function of connecting by cable or wireless. They are, for example, devices provided with an Ethernet (registered trademark) interface, like PCs or home electronic appliance devices capable of network communication. The network 6101 is a LAN which is a network employing cable or wireless.

The device A6102 has the function of a communication device in the present embodiment, and holds a DL address "AA:AA:AA:AA:AA:AA".

The device B6103 holds a DL address "BB:BB:BB:BB:BB:BB". Then, an IP address "192.168.0.100" is set for it. Here, the device B6103 also may have the function of a communication device in the present embodiment.

The device C6104 holds a DL address "CC:CC:CC:CC:CC:CC". Then, an IP address "192.168.0.200" is set for it. Note that the device C6104 also may have the function of a communication device in the present embodiment.

<Configuration of Communication Device>

The configuration of the communication device in the present embodiment is similar to that of the first embodiment. Hence, the description is omitted.

<Function Configuration>

The function configuration of the present embodiment is similar to that of the first embodiment. Hence, the description is omitted.

<Detailed Function Configuration>

Figure 62:
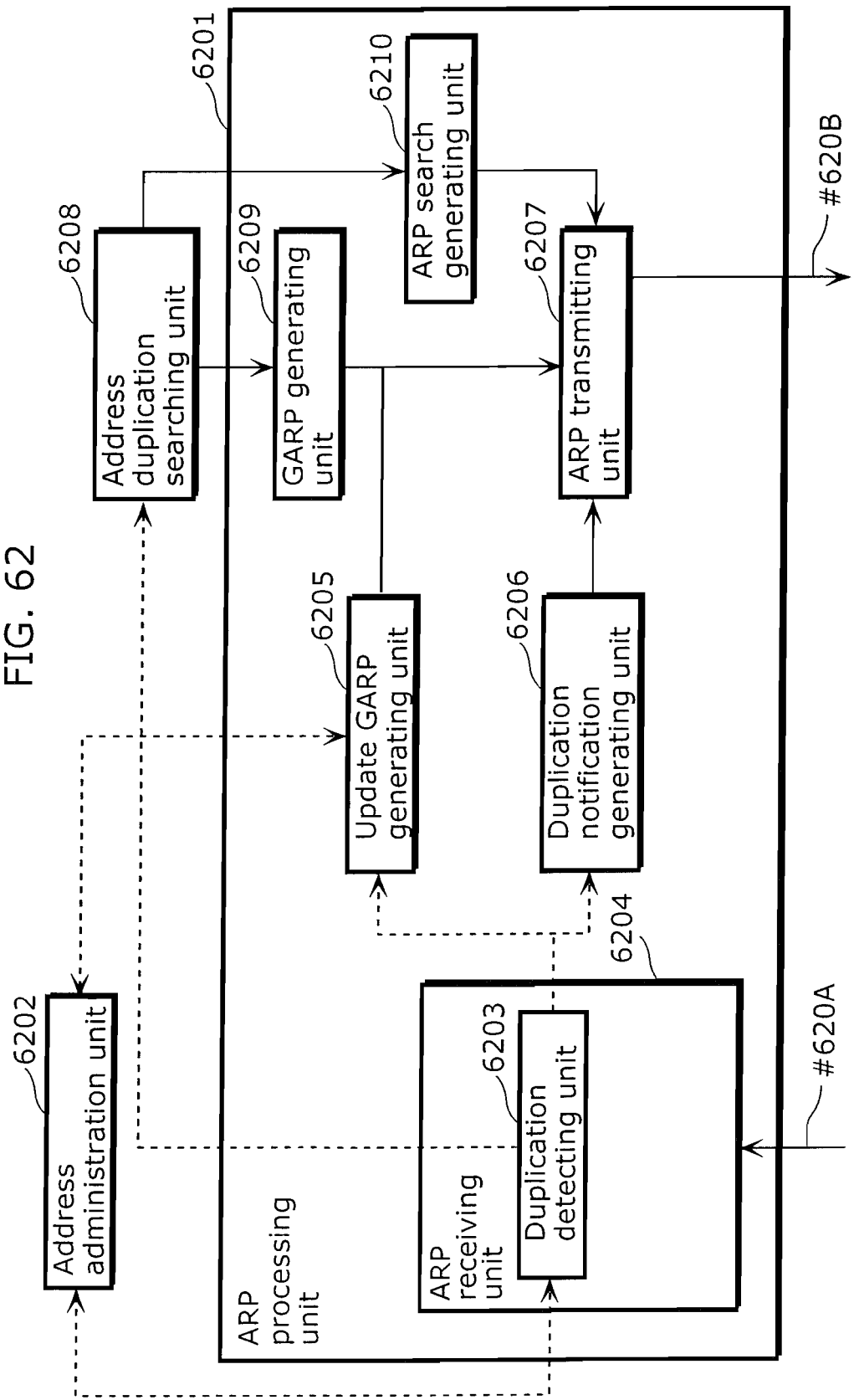
FIG. 62 is a diagram showing an exemplary function configuration of an ARP processing unit of a communication device according to the ninth embodiment of the present invention.

FIG. 62 is a diagram showing an exemplary function configuration of an ARP processing unit, an address administration unit and an address duplication searching unit of a communication device according to the present embodiment. Note that among the arrows in the figure, a dash-dotted line indicates a control information flow, while a solid line indicates a packet flow.

The ARP processing unit 6201 corresponds to the ARP processing unit 1203 of FIG. 12 and, in this example, includes a duplication detecting unit 6203, an ARP receiving unit 6204, an update GARP generating unit 6205, a duplication notification generating unit 6206, an ARP transmitting unit 6207, a GARP generating unit 6209 and an ARP search generating unit 6210. Note that description is omitted for functions similar to those of the first embodiment.

(a) Address Administration Unit 6202

The address administration unit 6202 of the present embodiment is similar to that of the first embodiment. Hence, the description is omitted.

(b) Duplication Detecting Unit 6203

When the transmitting source IP address of the received ARP packet matches the IP address of the device A6202 managed by the address administration unit 6202, the duplication detecting unit 6203 issues a duplication detection notification to the update GARP generating unit 6205 and the duplication notification generating unit 6106.

Further, in a state that the address duplication searching unit 6208 is performing address duplication search for the device A6202 (see function unit (g) address duplication searching unit), when the transmitting source IP address of the received ARP packet matches the IP address of address duplication search, the duplication detecting unit 6203 issues a duplication detection notification to the address duplication searching unit 6208.

Here, these duplication detection notifications include the transmitting source DL address of the received GARP packet and the transmitting source DL address of the received ARP packet. Here, the received GARP packet or the received ARP packet itself may be transferred as the duplication detection notification.

(c) ARP Receiving Unit 6204

The ARP receiving unit 6204 of the present embodiment is similar to that of the first embodiment. Hence, the description is omitted.

(d) Update GARP Generating Unit 6205

The update GARP generating unit 6205 of the present embodiment is similar to that of the first embodiment. Hence, the description is omitted.

(e) Duplication Notification Generating Unit 6206

The duplication notification generating unit 6206 of the present embodiment is similar to that of the first embodiment. Hence, the description is omitted.

(f) ARP Transmitting Unit 6207

The ARP transmitting unit 6207 of the present embodiment is similar to that of the first embodiment. Hence, the description is omitted.

(g) Address Duplication Searching Unit 6208

The address duplication searching unit 6208 notifies the IP address for address duplication search (referred to as a duplication search IP address, hereinafter) to the GARP generating unit 6209 and the ARP search generating unit 6210.

Further, when accepting the duplication detection notification from the duplication detecting unit 6203, the address duplication searching unit 6208 recognizes that the duplication search IP address of the present duplication search is duplicated.

Meanwhile, when a duplication detection notification is not accepted even after a predetermined time has elapsed, the address duplication searching unit 6208 concludes that there is no communication device having a duplicated IP address on the network 6201, and hence terminates the address duplication search processing. Here, the state that the address duplication searching unit 6208 is waiting for the predetermined time is adopted as an address duplication search state.

(h) GARP Generating Unit 6109

When accepting the duplication search IP address from the address duplication searching unit 6108, the GARP generating unit 6109 generates a Gratuitous ARP packet (referred to as a GARP packet, hereinafter). At this time, in the generating of the GARP packet, the accepted duplication search IP address is set up as the transmitting source IP address 106 and the destination IP address 108. The DL address of the device A6102 managed by the address administration unit 6102 is set up as the transmitting source DL address 106. The destination DL address 107 is not set up. Then, the GARP packet generated as described here is transferred to the ARP transmitting unit 6107.

Note that the DL address of the device A6202 need not be managed by the address administration unit 6202, and may be acquired directly from the communication unit 1102.

(i) ARP Search Generating Unit 6210

When accepting the duplication search IP address from the address duplication searching unit 6108, the ARP search generating unit 6210 generates an ARP request packet (referred to as an ARP search packet, hereinafter) on the basis of the accepted duplication search IP address. At this time, in the generating of the ARP search packet, the accepted duplication search IP address is set up as the destination IP address 108. The DL address of the device A6102 managed by the address administration unit 6102 is set up as the transmitting source DL address 105. The destination DL address 107 and the transmitting source IP address 106 are not set up. Then, the ARP search packet generated as described here is transferred to the ARP transmitting unit 6207.

<Sequence of Duplication Detection by Device A6102>

Figure 63:
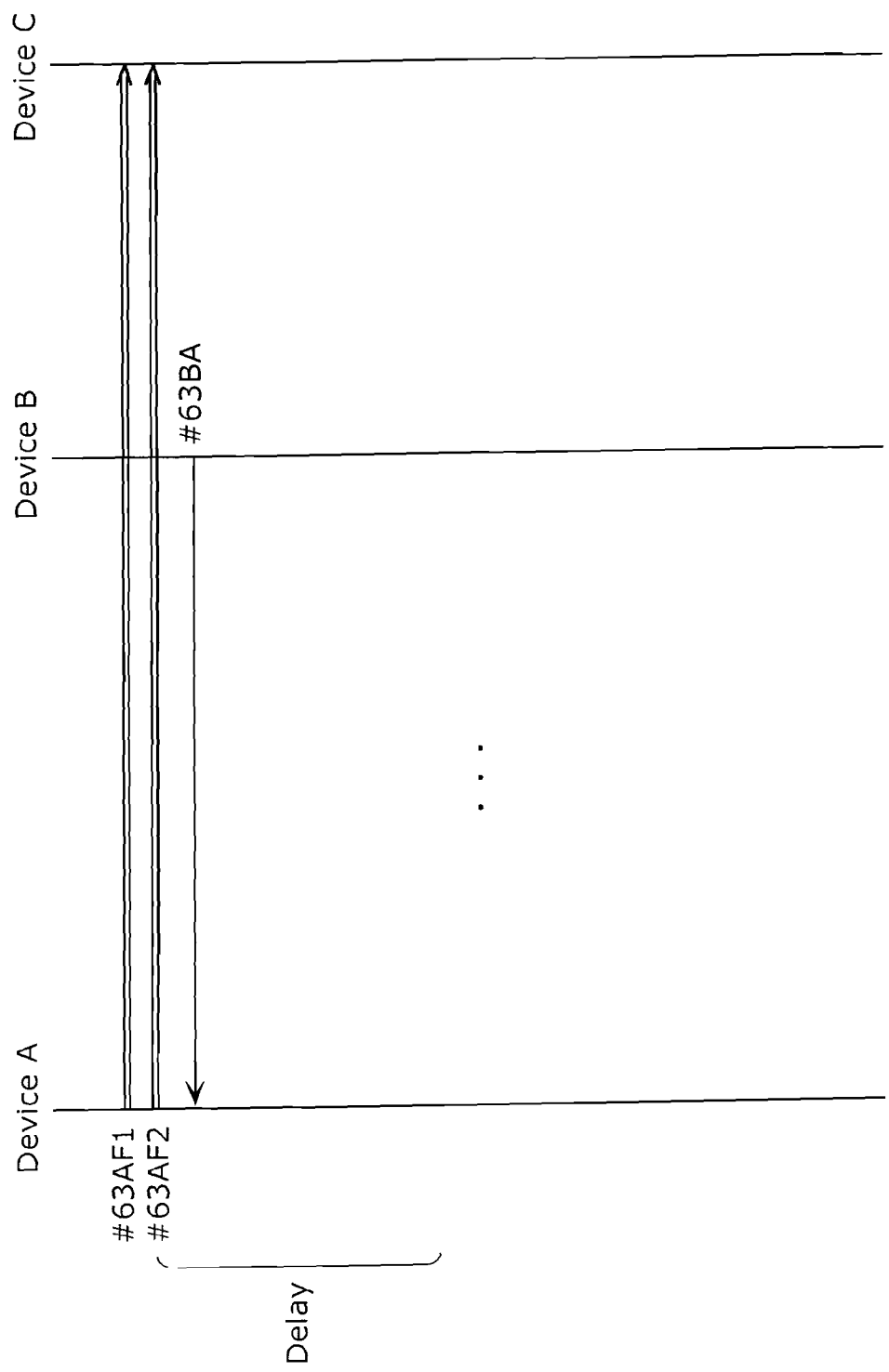
FIG. 63 is a diagram showing a sequence of a communication device according to the ninth embodiment of the present invention.

FIG. 63 is a diagram showing a sequence of a communication device in the present embodiment. As shown in FIG. 63, when duplication detection using a GARP packet and an ARP search packet is performed by the device A6102, the following packet exchange is performed by the device A6102 and the device B6103.

(a) Device A6102 Starts Duplication Detection

For the IP address "192.168.0.100", the device A6102 broadcasts to the network 6101 a GARP packet (#63AF1) and an ARP search packet (#63AF2) for duplication detection.

Note that the order of transmission of the GARP packet (#63AF1) and the ARP search packet (#63AF2) may be reversed.

(b) Operation of Device B6103

The device B6103 receives the GARP packet (#63AF1) and the ARP search packet (#63AF2) transmitted from the device A6102. The device B6103 detects that the transmitting source IP address of the received GARP packet (#63AF1) is duplicated with the IP address having been set for the device B6103. Further, the received ARP search packet (#63AF2) is discarded because the transmitting source IP address is not set up. As a result, the device B6303 transmits to the device A6102 a duplication notification ARP packet (#63BA) for notifying that the IP address is duplicated.

(c) Operation of Device A6102 after Transmission of Duplication Notification ARP Packet (#63BA) From Device B6103

The device A6102 receives the duplication notification ARP packet (#63BA) transmitted from the device B6103. On the basis of the received duplication notification ARP packet (#63BA), it is recognized that the IP address "192.168.0.100" is present already on the network 6101.

Note that when a duplication notification ARP packet (#63BA) is not received in a predetermined time, the device A6102 recognizes that the IP address "192.168.0.100" is not present on the network 6101.

<Sequence of Duplication Detection by Device C6103>

Figure 64:
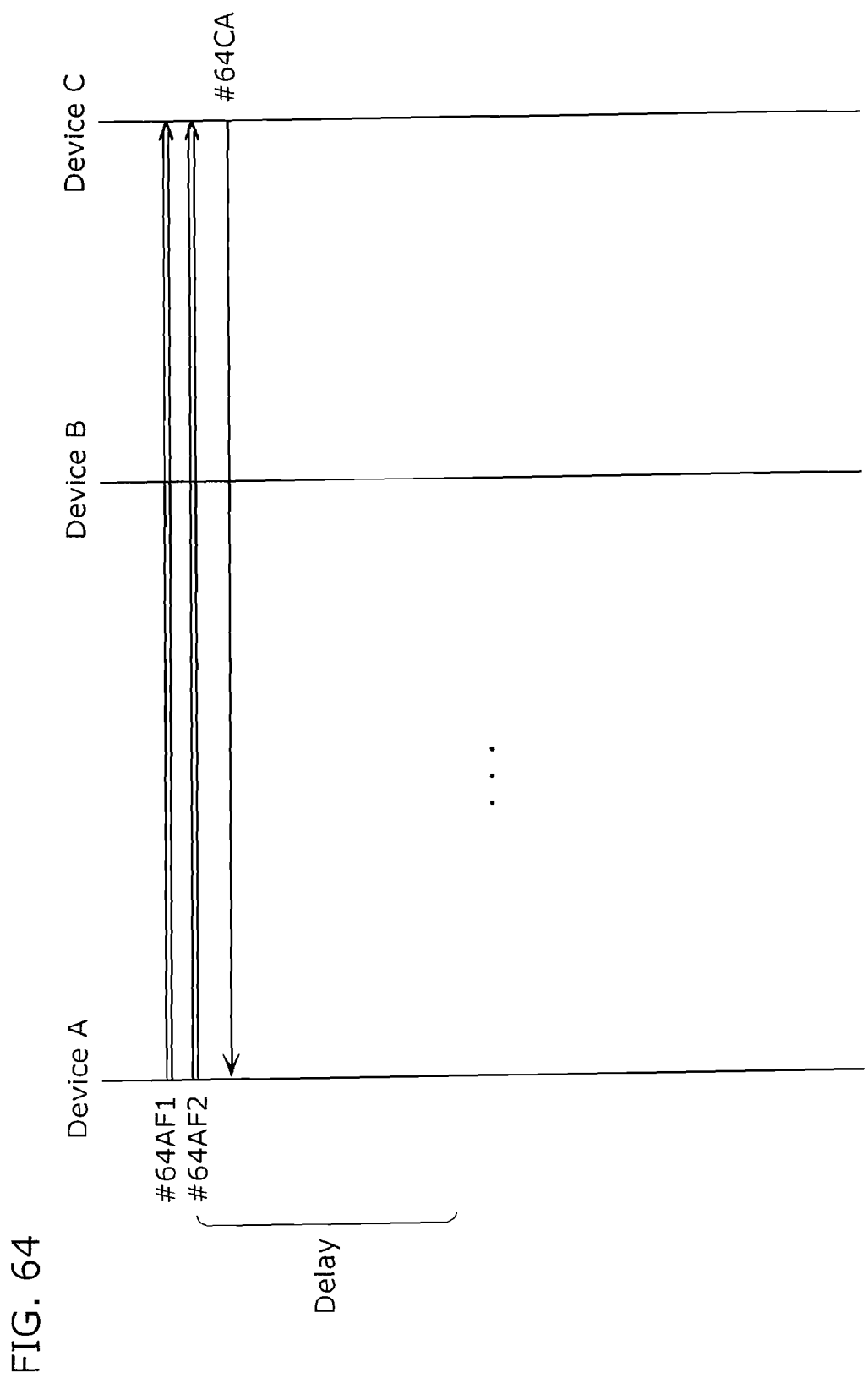
FIG. 64 is a diagram showing a sequence of a communication device according to the ninth embodiment of the present invention.

FIG. 64 is a diagram showing a sequence of a communication device in the present embodiment. As shown in FIG. 64, when duplication detection using a GARP packet and an ARP search packet is performed by the device A6102, the following packet exchange is performed by the device A6102 and the device C6104.

(a) Device A6102 Starts Duplication Detection

For the IP address "192.168.0.200", the device A6102 broadcasts to the network 6101 a GARP packet (#64AF1) and an ARP search packet (#64AF2) for duplication detection.

Note that the order of transmission of the GARP packet (#64AF1) and the ARP search packet (#64AF2) may be reversed.

(b) Operation of Device C6104

The device C6104 receives the GARP packet (#64AF1) and the ARP search packet (#64AF2) transmitted from the device A6102, and detects that the destination IP address of the received GARP packet (#64AF1) is duplicated with the IP address having been set for the device C6104. Thus, the received GARP packet (#64AF1) is discarded. Further, it is detected that the received ARP search packet (#63AF2) has duplication with the IP address having been set for the device C6304. As a result, the device C6304 transmits to the device A6102 a duplication notification ARP packet (#64CA) for notifying that the IP address is duplicated.

(c) Operation of Device A6102 after Transmission of Duplication Notification ARP Packet (#64CA) from Device C6104

The device A6102 receives the duplication notification ARP packet (#64CA) transmitted from the device C6104. When receiving the duplication notification ARP packet (#64CA), the device A6102 that the IP address "192.168.0.200" is present already on the network 6101.

Note that when a duplication notification ARP packet (#64CA) is not received within a predetermined time, the device A6102 recognizes that the IP address "192.168.0.200" is not present on the network 6101.

As described above, in the present embodiment, in a case that the device B6103 and the device C6104 do not necessarily send a response to the GARP packet for duplication detection, duplication detection processing can be performed reliably. Further, even in a case that the device B6103 and the device C6104 do not necessarily response to the search ARP packet for duplication detection, duplication detection processing can be performed reliably.

Tenth Embodiment

Next, the tenth embodiment of the present invention is described below with reference to the drawings.

<Network Configuration>

Figure 65:
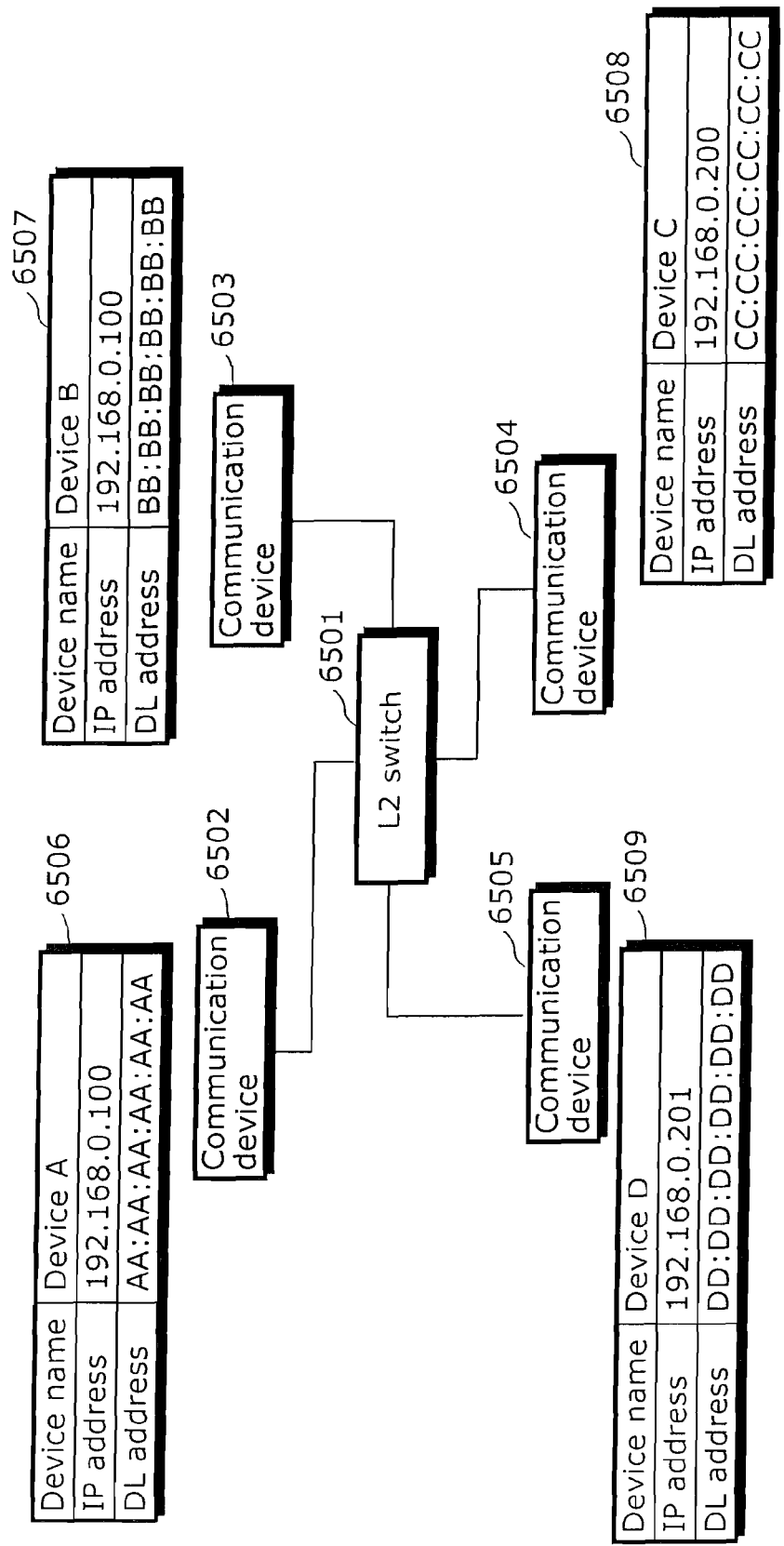
FIG. 65 is a diagram showing a network configuration and an example setting of a communication device according to the tenth embodiment of the present invention.

FIG. 65 is a diagram showing a network configuration and an example setting of a communication device according to the present embodiment. As shown in FIG. 65, a communication device 6502 (referred to as a device A6502, hereinafter), a communication device 6503 (referred to as a WIN6503, hereinafter) a communication device 6504 (referred to as a device C6504, hereinafter) and a communication device 6505 (referred to as a device D6505, hereinafter) are connected to a layer-2 switch 6501 (referred to as an L2 switch 6501, hereinafter).

Note that in the present embodiment, for simplicity of description, explanation is given for the case that the four communication devices are connected directly to the L2 switch 6501. However, even when a plurality of communication devices each corresponding to the WIN6503 and communication devices each corresponding to the device C6504 or the device D6505 are present, the operation is similar. Another layer-2 switch other than the L2 switch 6501 or a repeater hub may be present between the L2 switch 6501 and each communication device. Further, the transmission path between the L2 switch 6501 and each communication device may be a transmission path by cable or wireless.

The device A6502, the WIN6503, the device C6504 and the device D6505 are devices having a communication function of connecting by cable or wireless, and may be, for example, devices provided with an Ethernet (registered trademark) interface, PCs, or home electronic appliance devices capable of network communication.

The device A6502 is a communication device in the present embodiment, and holds a DL address "AA:AA:AA:AA:AA:AA". Then, an IP address "192.168.0.100" is set for it.

The WIN6503 is a communication device provided with the Windows (registered trademark) OS, and holds a DL address "BB:BB:BB:BB:BB:BB". Then, an IP address "192.168.0.100" which overlaps that of the device A6502 is to be set for it. This device has the function of performing duplication detection using GARP before setting the IP address.

A DL address "CC:CC:CC:CC:CC:CC" is assigned to the device C6504. Then, an IP address "192.168.0.200" is set for it. Then, the device C6504 communicates with the device A6502. Note that the device C6504 also may be a communication device in the present embodiment.

A DL address "DD:DD:DD:DD:DD:DD" is assigned to the device D6505. Then, an IP address "192.168.0.200" is set for it. Then, the device D6505 communicates with the device A6502. Note that the device D6505 also may be a communication device in the present embodiment.

<Configuration of Communication Device>

The configuration of the communication device in the present embodiment is similar to that of the third embodiment. Hence, the description is omitted.

<Function Configuration>

The function configuration of the present embodiment is similar to that of the third embodiment. Hence, the description is omitted.

<Detailed Function Configuration>

Detailed function configuration of the communication device in the present embodiment is similar to that of the third embodiment. Hence, the description is omitted.

<Sequence of Duplication Detection Using GARP>

Figure 66:
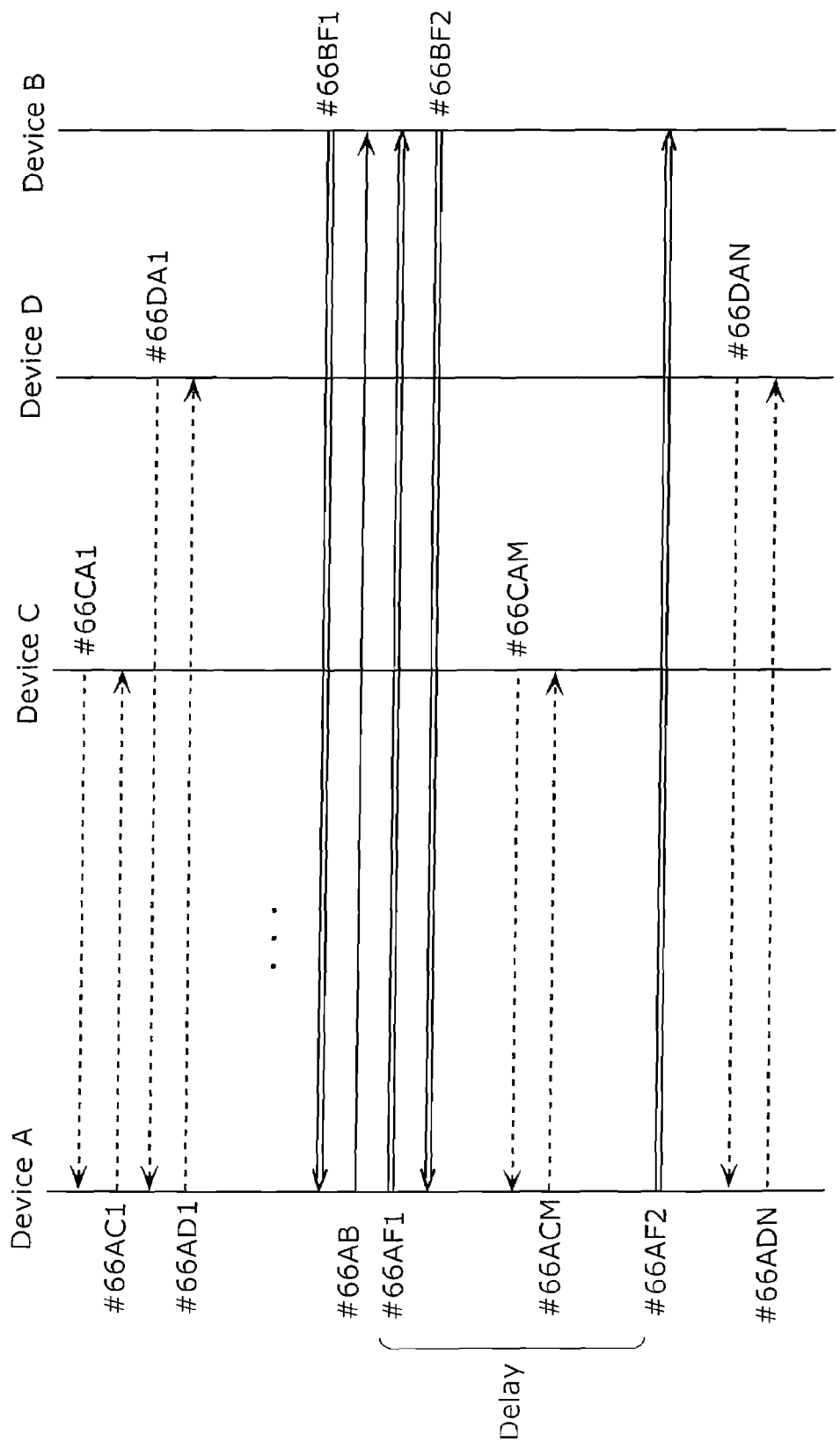
FIG. 66 is a diagram showing a sequence of a communication device according to the tenth embodiment of the present invention.

FIG. 66 is a diagram showing a sequence of a communication device in the present embodiment. As shown in FIG. 66, when duplication detection using GARP is performed by the WIN6503, the following packet exchange is performed by the device A6502, the WIN6503, the device C6504 and the device D6505.

(a) Operation Before Duplication Detection

The device A6502 and the device C6504 communicate with each other (#66AC1, #66CA1). At this time, the situation of the ARP table in the device C6504 is as shown in FIG. 67.

Further, the device A6502 and the device D6505 communicate with each other (#66AC1, #66CA1). At this time, the ARP table in the device D6505 is as shown in FIG. 68. Here, in the ARP table in the device D6505, the time until the update is accepted is controlled such that the ARP table should be prevented from being rewritten frequently by successive ARP packets generated by a DoS attack or the like. In the example of FIG. 68, the entry corresponding to the IP address "192.168.0.100" has been updated sufficiently prior. Thus, the time until the update is accepted is set to be 0 seconds. That is, the device D6505 can be updated immediately when the ARP table need be updated concerning that entry.

Then, the WIN6503 broadcasts the GARP packet for duplication detection (#66BF1) to the communication devices connected to the L2 switch 6501.

(b) Operation of Device C6504

The device C6504 receives the GARP packet (#66BF1) broadcasted from the WIN6503, and analyzes the contents of the received GARP packet (#66BF1) so as to search the ARP table managed by the device C6504 for an entry having duplication with the transmitting source IP address of the received GARP packet (#66BF1).

As a result of the search, in this case, the search hits the entry of the device A6502 with which communication has been performed until that time. Then, the hit entry is overwritten with the information of the received GARP packet (#66BF1). As a result, the ARP table of the device C6504 becomes as shown in FIG. 69.

(c) Operation of Device D6505

The device D6505 receives the GARP packet (#66BF1) broadcasted from the WIN6503, and analyzes the contents of the received GARP packet (#66BF1) so as to search the ARP table managed by the device D6505 for an entry having duplication with the transmitting source IP address of the received GARP packet (#66BF1).

As a result of the search, in this case, the search hits the entry of the device A6502 with which communication has been performed until that time. Further, sufficient time has elapsed since the ARP table was updated, and hence the ARP table can be updated immediately. Thus, the hit entry is overwritten with the information of the received GARP packet (#66BF1). As a result, the ARP table of the device D6505 becomes as shown in FIG. 70. At this time, the time until the update is accepted is initialized and set to be U seconds.

(d) Operation of Device A6502

The device A6502 receives the GARP packet (#66BF1) broadcasted from the WIN6503, and detects that the received GARP packet (#66BF1) has duplication with the IP address having been set for the device A6502.

When detecting duplication of the IP address, the device A6502 transmits to the WIN6503 a duplication notification ARP packet (#66AB) for notifying that the IP address is duplicated. Further, the device A6502 broadcasts the update GARP packet (#66AF1) to the communication devices connected to the L2 switch 6501.

Note that the present sequence has been described for the case of the order of the duplication notification ARP packet (#66AB) and the update GARP packet (#66A1). However, the order may be changed.

Further, the device A6502 broadcasts the update GARP packet (#66AF2), after the elapse of a predetermined time V which is greater than or equal to the predetermined time U.

(e) Operation of WIN6503 after Transmission of Duplication Notification ARP Packet (#66AB) from Device A6502

The WIN6503 receives the duplication notification ARP packet (#66AB) transmitted from the device A6502. On the basis of the received duplication notification ARP packet (#66AB), the WIN6503 recognizes that the IP address "192.168.0.100" used at the time of duplication detection is used on the same network.

Figure 71:
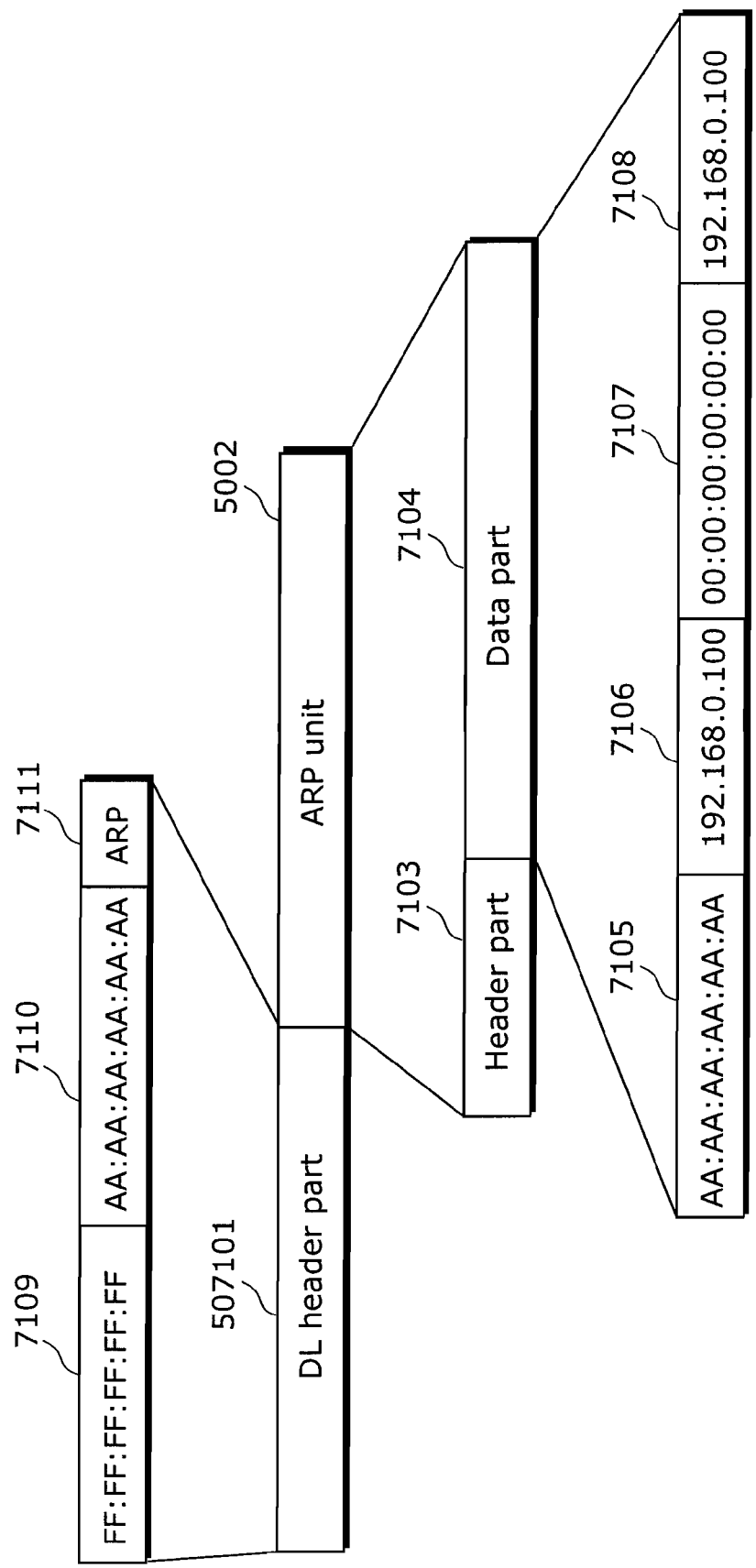
FIG. 71 is a diagram showing a format of a forged GARP packet in the tenth embodiment according to the present invention.

Accordingly, the WIN6503 transmits a fraudulent GARP packet (a forged GARP packet, hereinafter) (#66BF2) in which the WIN6503 serves as if it were the device A6502. Note that in the forged GARP packet, as shown in FIG. 71, the transmitting source DL address 7110 of the DL header part 7101 is set up as "AA:AA:AA:AA:AA:AA", while the transmitting source DL address 7105 of the ARP unit 7102 is set up as "AA:AA:AA:AA:AA:AA".

At this time, the forged GARP packet (#66BF2) in which the DL address of the device A6502 is set up as the transmitting source DL address 7109 of the DL header part 7101 passes through the L2 switch 6501. Accordingly, the L2 switch 6501 recognizes is that a communication device having an assigned DL address of "AA:AA:AA:AA:AA:AA" is connected to the port connected to the WIN6503. This is because on the basis of the transmitting source DL address of the packet that passes through, the L2 switch 6501 learns which communication device is connected to which port.

(f) Operation of Device A6502 after Transmission of Forged GARP Packet (#66BF2) from WIN6503

The device A6502 receives the forged GARP packet (#66BF2) broadcasted from the WIN6503. Then, the device A6502 analyzes the contents of the received forged GARP packet (#66BF2), detects that the DL address having been set for the device A6502 is duplicated with the transmitting source DL address 7105 of the forged GARP packet (#66BF2). As a result, the received forged GARP packet is discarded on the basis of determination as being an ARP packet transmitted from the device A6502.

(g) Operation of Device C6504 after Update GARP Packet (#66AF1) Transmission from Device A6502

The device C6504 receives the update GARP packet (#66AF1) broadcasted from the device A6502. The device C6504 analyzes the contents of the received GARP packet (#66AF1) so as to search the ARP table managed by the device C6504 for an entry having duplication with the transmitting source IP address of the received GARP packet (#66AF1).

As a result of the search, in this case, the search hits the entry of the device A6502 which has been overwritten with the GARP packet (#66BF1) transmitted from the WIN6503 for duplication detection. Then, the hit entry is overwritten with the information of the received update GARP packet (#66AF1). As a result, the ARP table of the device C6504 becomes as shown in FIG. 72. As a result, the ARP table of the device C6504 returns to the state that is prior to the duplication detection performed by the WIN6503.

After that, the device C6504 receives the forged GARP packet (#66BF2) broadcasted from the WIN6503, and analyzes the contents of the received forged GARP packet (#66BF2) so as to search the ARP table managed by the device C6504 for an entry having duplication with the transmitting source IP address of the received forged GARP packet (#66BF2).

As a result of the search, in this case, the search hits the entry of the device A6502 which has been overwritten with the update GARP packet (#66AF1) transmitted from the device A6502. Then, the hit entry is overwritten with the information of the received forged GARP packet (#66BF2). However, since the contents are the same, the ARP table of the device C6504 remains as shown in FIG. 72.

Further, after that, after a predetermined time V has elapsed, the device C6504 receives the update GARP packet (#66AF2) broadcasted from the device A6502, and analyzes the contents of the received update GARP packet (#66AF2) so as to search the ARP table managed by the device C6504 for an entry having duplication with the transmitting source IP address of the received update GARP packet (#66AF2).

As a result of the search, in this case, the search hits the entry of the device A6502 which has been overwritten with the update GARP packet (#66AF1) transmitted from the device A6502. Then, the hit entry is overwritten with the information of the received update GARP packet (#66AF2). As a result, the ARP table of the device C6504 is overwritten again with the update GARP packet (#66AF2). However, since the contents are the same, the ARP table of the device C6504 remains as shown in FIG. 72.

(g) Operation of Device D2405 after Update GARP Packet (#66AF1) Transmission from Device A2402

The device D6505 receives the update GARP packet (#66AF1) broadcasted from the device A6502, and analyzes the contents of the received GARP packet (#66AF1) so as to search the ARP table managed by the device D6505 for an entry having duplication with the transmitting source IP address of the received GARP packet (#66AF1).

As a result of the search, in this case, the search hits the entry corresponding to the device A6502 overwritten with the GARP packet (#66BF1) transmitted for duplication detection from the WIN6503. However, since a predetermined time of U seconds until the update is accepted has not yet elapsed, the hit entry is not overwritten and remains as shown in FIG. 70. At this point, the device D6505 cannot communicate with the device A6502.

After that, the device D6505 receives the forged GARP packet (#66BF2) broadcasted from the WIN6503, and analyzes the contents of the received forged GARP packet (#66BF2) so as to search the ARP table managed by the device D6505 for an entry having duplication with the transmitting source IP address of the received forged GARP packet (#66BF2).

As a result of the search, in this case, the search hits the entry corresponding to the device A6502 overwritten with the GARP packet (#66BF1) transmitted for duplication detection from the WIN6503. However, since a predetermined time of U seconds until the update is accepted has not yet elapsed, the hit entry is not overwritten and remains as shown in FIG. 70. At this point, the device D6505 cannot communicate with the device A6502.

Further, after that, after a predetermined time of V seconds has elapsed, the device D6504 receives the update GARP packet (#66AF2) broadcasted from the device A6502, and analyzes the contents of the received update GARP packet (#66AF2) so as to search the ARP table managed by the device D6505 for an entry having duplication with the transmitting source IP address of the received update GARP packet (#66AF2).

As a result of the search, in this case, the search hits the entry corresponding to the device A6502 which has been overwritten with the GARP packet (#66BF1) transmitted from the WIN6503 for duplication detection. Then, time greater than or equal to a predetermined time of U seconds has elapsed. Thus, as shown in FIG. 73, the time until the update is accepted is 0 seconds. Accordingly, the hit entry is overwritten with the information of the received update GARP packet (#66AF2). As a result, the ARP table of the device D6505 becomes as shown in FIG. 74.

As a result, the ARP table of the device D6505 returns to the state that is prior to the duplication detection performed by the WIN6503.

Note that after a predetermined time of V seconds has elapsed, when the L2 switch 6501 has erroneously learned the correspondence relation between the communication device and its connection port, the corresponding erroneously learned relationship can be corrected with the update GARP packet (#66AF2) transmitted from the device A6502.

(i) Operation after Duplication Detection

As a result of the above-mentioned sequence, the ARP tables of the device C6504 and the device D6505 returns to the state that is prior to the duplication detection of the device WIN6503. Thus, the device A6502, the device C6504 and the device D6505 enter a state in which mutual communication is available (#66CAM, #66ACM, #66DAN, #66ADN) similarly to the state prior to the duplication detection.

(Other Configurations)

Note that the communication device according to the present invention may be provided with a CPU (Central Processing Unit), a system LSI (Large Scale Integration), a RAM (Random Access Memory), a ROM (Read Only Memory), an HDD (Hard Disk Drive), a network interface and the like. Further, the communication device according to the present invention may be provided with a drive device (such as a DVD-RAM, a Blu-ray disk and an SD (Secure Digital) memory card) capable of writing data into a recording medium that is portable. Further, a codec for coding and decoding audio and video may be provided.

Note that the communication device may be a built-in system such as an IP phone, the portable phone, a digital recorder, a digital television set and a game machine. Further, the communication device may be a communication unit such as a router, a multilayer switch, a gateway, a home server and a broadband router.

Further, a program (referred to as a communication program, hereinafter) that controls the communication device may be installed in an HDD or a ROM. Then, the communication program may be executed so that the functions of the communication device may be implemented.

Note that the communication program may be recorded on a recording medium readable to a hardware system such as a computer system and a built-in system. Further, the communication program may be read by another hardware system via a recording medium and then executed. This allows the functions of the communication device to be implemented on another hardware system. Here, recording media readable by a computer system include an optical recording medium (e.g., a CD-ROM), a magnetic recording medium (e.g., a hard disk), a magneto-optical recording medium (e.g., an MO) and a semiconductor memory (e.g., a memory card).

Further, the communication program may be held in a hardware system connected to a network such as the Internet and a local area network. Further, the communication program may be downloaded to another hardware system via a network and then executed. This allows the functions of the communication device to be implemented on another hardware system. Here, such networks include a terrestrial broadcast network, a satellite broadcast network, a cable broadcast network, a PLC (Power Line Communication), a mobile phone network, a cable communication network (e.g., IEEE802.3) and a wireless communication network (e.g., IEEE802.11).

Further, a communication circuit installed in the communication device may implement the functions of the communication device.

Note that the communication circuit may be formed in the form of: a full custom LSI (Large Scale Integration); a semi custom LSI such as an ASIC (Application Specific Integrated Circuit); a programmable logic device such as a FPGA (Field Programmable Gate Array) and a CPLD (Complex Programmable Logic Device); and a dynamic reconfigurable device the circuit configuration of which can be rewritten dynamically.

Further, the design data that forms the functions of the communication device in a communication circuit may be a program (referred to as an HDL program, hereinafter) described in a hardware description language. Further, it may be a net list at a gate level obtained by logic synthesis of the HDL program. Further, it may be macro cell information in which layout information, process conditions and the like are added to the net list at a gate level. Further, it may be mask data in which the size, the timing and the like are set forth. Here, employable hardware description languages include VHDL (Very high speed integrated circuit Hardware Description Language), Verilog-HDL and SystemC and so on.

Further, the design data may be recorded on a recording medium readable to a hardware system such as a computer system and a built-in system. Further, the design data may be read by another hardware system via a recording medium and then executed. Then, the design data read by another hardware system via such a recording medium may be downloaded to a programmable logic device via a download cable.

Alternatively, the design data may be held in a hardware system connected to a network such as the Internet and a local area network. Further, design data may be downloaded to another hardware system via a network and then executed. Then, the design data acquired by another hardware system via such a network may be downloaded to a programmable logic device via a download cable.

Alternatively, the design data may be recorded on a serial ROM in such a manner that the design data can be transferred to an FPGA at the time of power ON. Then, the design data recorded on the serial ROM may be downloaded directly to the FPGA at the time of power ON.

Alternatively, the design data may be generated by a microprocessor at the time of power ON and then downloaded to an FPGA.

INDUSTRIAL APPLICABILITY

The present invention can be utilized in a network where a device is present that performs duplication detection using GARP.

The invention claimed is:

1. A communication device that manages network layer addresses and data link layer addresses in association with each other, said communication device comprising:
   a processor;
   an Address Resolution Protocol (ARP) receiving unit operable to receive ARP packets transmitted by ARP;
   a duplication detecting unit operable to detect, using said processor, a Gratuitous ARP (GARP) packet in which a network layer address of a transmitting source matches a network layer address of said communication device, from among the ARP packets received by said ARP receiving unit;
   a duplication notification generating unit operable to generate an ARP reply packet notifying the transmitting source that the network layer address is duplicated, when the GARP packet is detected by said duplication detecting unit;
   an update GARP generating unit operable to generate an update GARP packet in which the network layer address and the data link layer address of said communication device are set up, when the GARP packet is detected by said duplication detecting unit; and
   an ARP transmitting unit operable to transmit, by ARP, the ARP reply packet generated by said duplication notification generating unit, and to transmit, by GARP, the update GARP packet generated by said update GARP generating unit.

2. The communication device according to claim 1, wherein said update GARP generating unit is operable to immediately generate the update GARP packet and transfer the update GARP packet to said ARP transmitting unit, when the GARP packet is detected by said duplication detecting unit.

3. The communication device according to claim 1, wherein said duplication notification generating unit is operable to generate the ARP reply packet and transfer the ARP reply packet to said ARP transmitting unit, when a duplication detection notification notifying that the network layer address is duplicated is accepted from said duplication detecting unit, said update GARP generating unit is operable to generate the update GARP packet and transfer the update GARP packet to said ARP transmitting unit, when the duplication detection notification is accepted from said duplication detecting unit, and said duplication detecting unit is operable to limit a number of times per time unit of transferring the duplication detection notification to said duplication notification generating unit and said update GARP generating unit, when GARP packets are successively detected from among the ARP packets received by said ARP receiving unit.

4. The communication device according to claim 1, wherein said communication device further comprises a duplication notifying unit operable to transfer, to said duplication detecting unit, an address duplication notification notifying that the network layer address is duplicated, when, after said ARP transmitting unit has transmitted the update GARP packet, said ARP receiving unit receives an ARP reply packet in which the network layer address of the transmitting source matches the network layer address of said communication device, and wherein said duplication notification generating unit is operable to generate the ARP reply packet and transfer the ARP reply packet to said ARP transmitting unit, when a duplication detection notification notifying that the network layer address is duplicated is accepted from said duplication detecting unit, said update GARP generating unit is operable to generate the update GARP packet and transfer the update GARP packet to said ARP transmitting unit, when the duplication detection notification is accepted from said duplication detecting unit, and said duplication detecting unit is operable to stop transfer of the duplication detection notification to said duplication notification generating unit and said update GARP generating unit, when the address duplication notification is accepted from said duplication notifying unit.

5. The communication device according to claim 1, wherein said communication device further comprises:

a duplication monitoring unit operable to output that the network layer address of said communication device is duplicated on the network connected to said communication device, when an address duplication notification notifying that the network layer address is duplicated is accepted; and a duplication notifying unit operable to transfer the address duplication notification to said duplication monitoring unit, when, after said ARP transmitting unit has transmitted the update GARP packet, said ARP receiving unit receives an ARP reply packet in which the network layer address of the transmitting source matches the network layer address of said communication device.

6. The communication device according to claim 5, wherein said duplication notifying unit is operable to include the network address of the transmitting source in such a manner that the data link layer address is included, and to transfer the resulting notification, and said duplication monitoring unit is operable to output the data link layer address of the transmitting source included in the address duplication notification.

7. The communication device according to claim 5, wherein said duplication notifying unit is operable to include the network address of the transmitting source in such a manner that the network layer address is included, and to transfer the resulting notification, and said duplication monitoring unit is operable to output the network layer address of the transmitting source included in the address duplication notification.

8. The communication device according to claim 1, wherein said duplication detecting unit has a GARP counter for counting GARP packets and is operable to: hold the last GARP packet which is a GARP packet received most recently by said ARP receiving unit; increment said GARP counter when the last GARP packet matches a GARP packet received by said ARP receiving unit; clear said GARP counter when the last GARP packet matches the GARP packet received by said ARP receiving unit do not match each other; and stop the transfer of the duplication detection notification to said duplication notification generating unit and said update GARP generating unit, when said GARP counter exceeds a predetermined number if said last GARP packet matches a GARP packet received by said ARP receiving unit.

9. The communication device according to claim 1, wherein said update GARP generating unit is operable to generate a plurality of update GARP packets and transfer the plurality of update GARP packets to said ARP transmitting unit.

10. A communication device that manages network layer addresses and data link layer addresses in association with each other, said communication device comprising:

a processor;

an ARP receiving unit operable to receive an ARP packet transmitted by Address Resolution Protocol (ARP);

a duplication detecting unit operable to detect, using said processor, a Gratuitous ARP (GARP) packet in which a network layer address of a transmitting source matches a network layer address of said communication device, from among ARP packets received by said ARP receiving unit;

a duplication notification generating unit operable to generate an ARP reply packet notifying the transmitting source that the network layer address is duplicated, when the GARP packet is detected by said duplication detecting unit;

an update GARP generating unit operable to generate an update GARP packet in which the network layer address and the data link layer address of said communication device are set up, when the GARP packet is detected by said duplication detecting unit;

an update GARP delaying unit operable to delay, by a predetermined time, transmission of the update GARP packet generated by said update GARP generating unit; and an ARP transmitting unit operable to transmit, by ARP, the ARP reply packet generated by said duplication notification generating unit and transmit, by GARP, the update GARP packet delayed by said update GARP delaying unit.

11. A communication device that manages network layer addresses and data link layer addresses in association with each other, said communication device comprising:

a processor;

an ARP receiving unit operable to receive an ARP packet transmitted by Address Resolution Protocol (ARP);

a duplication detecting unit operable to detect, using said processor, a Gratuitous ARP (GARP) packet in which a network layer address of a transmitting source matches a network layer address of said communication device, from among ARP packets received by said ARP receiving unit;

a duplication notification generating unit operable to generate an ARP reply packet notifying the transmitting source that the network layer address is duplicated, when the GARP packet is detected by said duplication detecting unit;

an update GARP generating unit operable to generate a plurality of update GARP packets in which the network layer address and the data link layer address of said communication device are set up, when the GARP packet is detected by said duplication detecting unit;

an update GARP delaying unit operable to delay, by a predetermined time, at least one of the plurality of update GARP packets generated by said update GARP generating unit; and an ARP transmitting unit operable to transmit, by ARP, the ARP reply packet generated by said duplication notification generating unit and to transmit, by GARP, the update GARP packet delayed by said update GARP delaying unit.

12. The communication device according to claim 11, wherein said communication device further comprises a duplication notifying unit operable to transfer to said duplication detecting unit and said update GARP delaying unit an address duplication notification notifying that the network layer address is duplicated, when, after said ARP transmitting unit has transmitted the update GARP packet, said ARP receiving unit receives a duplication notification ARP packet in which the network layer address of the transmitting source matches the network layer address of said communication device, and wherein said duplication notification generating unit is operable to generate the ARP reply packet and transfer the ARP reply packet to said ARP transmitting unit, when the duplication detection notification is accepted from said duplication detecting unit, said update GARP generating unit is operable to generate a plurality of the update GARP packets and transfer at least one of the plurality of the update GARP packets to said GARP delaying unit, when the duplication detection notification is accepted from said duplication detecting unit, said duplication detecting unit is operable to stop transfer of the duplication detection notification to said duplication notification generating unit and said update GARP generating unit, when the address duplication notification is accepted from said duplication notifying unit, and said update GARP delaying unit is operable to stop the delay, by the predetermined time, of the update GARP packet having already been accepted from said update GARP generating unit and transfer the update GARP packet to said ARP transmitting unit, when the address duplication notification is accepted from said duplication notifying unit.

13. The communication device according to claim 11, wherein said duplication detecting unit is operable to transfer, to said update GARP generating unit and said update GARP delaying unit, a GARP duplication receiving notification notifying that said ARP receiving unit has received a GARP packet in which the network layer address is duplicated with the network layer address of said communication device, when, during the time that said update GARP delaying unit delays, by the predetermined time, the update GARP packet accepted from said update GARP generating unit, said ARP receiving unit receives a GARP packet in which the network layer address of the transmitting source matches the network layer address of said communication device, said update GARP generating unit is operable to stop the transfer, to said update GARP delaying unit, of at least one of the generated update GARP packets, when the GARP duplication receiving notification is accepted from said duplication detecting unit, and said update GARP delaying unit is operable to temporarily stop the transfer of the update GARP packet having already been accepted from said update GARP generating unit to said ARP transmitting unit after a predetermined time delay, and is operable to newly delay the update GARP packet, by the predetermined time, and transfer the update GARP packet to said ARP transmitting unit, when the GARP duplication receiving notification is accepted from said duplication detecting unit.

14. The communication device according to claim 13, wherein said duplication detecting unit is further operable to hold, as a data link address information, the data link layer address of the transmitting source of the GARP packet and transfer the GARP duplication receiving notification to said update GARP generating unit and said update GARP delaying unit only when, during the time that said update GARP delaying unit delays, by the predetermined time, the update GARP packet accepted from said update GARP generating unit, said ARP receiving unit receives a GARP packet in which the network layer address of the transmitting source matches the network layer address of said communication device and the data link layer address of the transmitting source matches the data link address information.

15. The communication device according to claim 11, wherein said duplication detecting unit is further operable to stop the transfer of the duplication detection notification when, during the time that said update GARP delaying unit delays, by the predetermined time, the update GARP packet accepted from said update GARP generating unit, said ARP receiving unit receives a duplication ARP packet in which the network layer address of the transmitting source matches the network layer address of said communication device.

16. The communication device according to claim 1, comprising:

an address duplication searching unit operable to search for duplication of a network layer address by using a network layer address for address duplication search; and a GARP generating unit operable to generate a search GARP packet in which the network layer address for the address duplication search is set up as a network layer address of a transmission destination, wherein said ARP transmitting unit is operable to transmit the search GARP packet generated by said GARP generating unit, and said duplication detecting unit is operable to transfer an address duplication notification notifying that the network layer address is duplicated, when, during the time that said ARP transmitting unit transmits the search GARP packet and that said address duplication searching unit searches for duplication of the network layer address, a duplication ARP packet is received in which the network layer address of the transmission destination matches the network layer address for the address duplication search.

17. The communication device according to claim 16,
wherein said communication device further comprises a restoration GARP generating unit operable to set the data link layer address of the transmitting source of the duplication ARP packet as a data link layer address of the transmitting source, and to generate a restoration GARP packet in which the network layer address for address duplication search is set up as a network layer address of the transmission destination, and wherein said duplication detecting unit is operable to transfer, to said address duplication searching unit, the data link layer address of the transmitting source of the duplication ARP packet in a manner included in the address duplication notification, said address duplication searching unit is operable to transfer, to said restoration GARP generating unit, the data link layer address of the transmitting source of the duplication ARP packet and the network layer address for address duplication search included in the address duplication notification, and said ARP transmitting unit is operable to set the data link layer address of the transmission destination of the restoration GARP packet as a data link layer broadcast address, and to set the data link layer address of the transmitting source of the restoration GARP packet as a data link layer address set in said communication device, so as to transmit the restoration GARP packet.

18. The communication device according to claim 17,
wherein said restoration GARP generating unit is operable to immediately generate a restoration GARP packet and transfer the restoration GARP packet to said ARP transmitting unit, when a restoration GARP generation notification that instructs to generate a restoration GARP packet is accepted from said address duplication searching unit.

19. The communication device according to claim 17,
wherein said communication device further comprises a duplication monitoring unit operable to output that the network layer address of said communication device is duplicated on a network connected to said communication device, when the address duplication notification is accepted from said address duplication searching unit, and wherein said address duplication searching unit is operable to transfer the address duplication notification to said duplication monitoring unit, when a duplication ARP packet in which the network layer address of the transmitting source matches the network layer address of said communication device is received and when the address duplication notification is accepted from said duplication detecting unit.

20. The communication device according to claim 19,
wherein said address duplication searching unit is operable to transfer, to said duplication monitoring unit, the data link layer address of the transmitting source of the duplication ARP packet in a manner included in the address duplication notification, and said duplication monitoring unit is operable to output the data link layer address of the transmitting source of the duplication ARP packet included in the address duplication notification.

21. The communication device according to claim 19,
wherein said address duplication searching unit is operable to transfer, to said duplication monitoring unit, the network layer address of the transmitting source of the duplication ARP packet in a manner included in the address duplication notification, and said duplication monitoring unit is operable to output the network layer address of the transmitting source of the duplication ARP packet included in the address duplication notification.

22. The communication device according to claim 17,
wherein said restoration GARP generating unit is operable to generate a plurality of the restoration GARP packets, when the restoration GARP generation notification is accepted from said address duplication searching unit, and said ARP transmitting unit is operable to transmit the plurality of the restoration GARP packets generated by said restoration GARP generating unit.

23. The communication device according to claim 17,
wherein said communication device further comprises a restoration GARP delaying unit operable to delay, by a predetermined time, a restoration GARP packet accepted from said restoration GARP generating unit, and to transfer the restoration GARP packet to said ARP transmitting unit, and wherein said restoration GARP generating unit is operable to generate a plurality of the restoration GARP packets so as to transfer, to said ARP transmitting unit, at least one of the generated restoration GARP packets, and to transfer to said restoration GARP delaying unit at least one of the generated restoration GARP packets.

24. The communication device according to claim 23,
wherein said address duplication searching unit is operable to stop the transfer of the address duplication notification to said restoration GARP generating unit, when the address duplication notification is accepted and when said restoration GARP delaying unit is delaying, by the predetermined time, the restoration GARP packet having already been accepted from said restoration GARP generating unit.

25. The communication device according to claim 1, comprising:
an address duplication searching unit operable to search for duplication of a network layer address by using a network layer address for address duplication search;
a GARP generating unit operable to generate a search GARP packet in which the network layer address for the address duplication search is set up as a network layer address of a transmission destination; and
an ARP search generating unit operable to generate a search ARP request packet in which the network layer address for the address duplication search is set up as the network layer address of the transmission destination, a network layer address of a transmitting source is unspecified, a data link layer address of the transmission destination is unspecified, and a data link layer address of the transmitting source is the data link layer address of said communication device, wherein said ARP transmitting unit is operable to transmit the search GARP packet generated by said GARP generating unit, and to transmit the search ARP request packet generated by said ARP search generating unit, and said duplication detecting unit is operable to transfer, to said address duplication searching unit, an address duplication notification notifying that the network layer address is duplicated, when, during the time that said address duplication searching unit searches for duplication of the network layer address, said ARP receiving unit receives a duplication ARP packet in which the network layer address of the transmission destination matches the network layer address for the address duplication search.

26. A communication method for managing network layer addresses and data link layer addresses in association with each other, said communication method comprising:
- an ARP receiving step of receiving an ARP packet transmitted by Address Resolution Protocol (ARP);
- a duplication detecting step of detecting a Gratuitous ARP (GARP) packet in which a network layer address of a transmitting source matches a network layer address of a communication device, from among ARP packets received in said ARP receiving step;
- a duplication notification generating step of generating an ARP reply packet for notifying the transmitting source that the network layer address is duplicated, when the GARP packet is detected in said duplication detecting step;
- an update GARP generating step of generating an update GARP packet in which the network layer address and the data link layer address of the communication device are set up, when the GARP packet is detected in said duplication detecting step; and
- an ARP transmitting step of transmitting, by ARP, the ARP reply packet generated in said duplication notification generating step and transmitting, by GARP, the update GARP packet generated in said update GARP generating step.

27. A non-transitory computer readable recording medium having stored thereon communication program that manages network layer addresses and data link layer addresses in association with each other, wherein, when executed, said communication program causes a computer to perform a method comprising:
- an ARP receiving step of receiving an ARP packet transmitted by Address Resolution Protocol (ARP);
- a duplication detecting step of detecting a Gratuitous ARP (GARP) packet in which a network layer address of a transmitting source matches a network layer address of a communication device, from among ARP packets received in said ARP receiving step;
- a duplication notification generating step of generating an ARP reply packet for notifying the transmitting source that the network layer address is duplicated, when the GARP packet is detected in said duplication detecting step;
- an update GARP generating step of generating an update GARP packet in which the network layer address and the data link layer address of the communication device are set up, when the GARP packet is detected in said duplication detecting step; and
- an ARP transmitting step of transmitting, by ARP, the ARP reply packet generated in said duplication notification generating step and transmitting, by GARP, the update GARP packet generated in said update GARP generating step.

* * * * *